US012457436B2

(12) United States Patent
Asakura et al.

(10) Patent No.: US 12,457,436 B2
(45) Date of Patent: Oct. 28, 2025

(54) SOLID-STATE IMAGING ELEMENT, IMAGING DEVICE, AND SOLID-STATE IMAGING ELEMENT CONTROL METHOD

(71) Applicant: Sony Semiconductor Solutions Corporation, Kanagawa (JP)

(72) Inventors: Luonghung Asakura, Kanagawa (JP); Minoru Sakata, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 30 days.

(21) Appl. No.: 18/687,138

(22) PCT Filed: Aug. 23, 2022

(86) PCT No.: PCT/JP2022/031686
§ 371 (c)(1),
(2) Date: Feb. 27, 2024

(87) PCT Pub. No.: WO2023/062947
PCT Pub. Date: Apr. 20, 2023

(65) Prior Publication Data
US 2024/0397239 A1   Nov. 28, 2024

(30) Foreign Application Priority Data
Oct. 15, 2021   (JP) .................................. 2021-169351

(51) Int. Cl.
*H04N 25/78*   (2023.01)
*H04N 25/77*   (2023.01)

(52) U.S. Cl.
CPC ............ *H04N 25/78* (2023.01); *H04N 25/77* (2023.01)

(58) Field of Classification Search
None
See application file for complete search history.

(56) References Cited

U.S. PATENT DOCUMENTS

2009/0009645 A1   1/2009   Schrey
2019/0327432 A1   10/2019  Milkov
(Continued)

FOREIGN PATENT DOCUMENTS

EP   4412238 A1    8/2024
JP   2018-011162 A  1/2018
(Continued)

OTHER PUBLICATIONS

International Search Report (PCT/ISA/210), International Application No. PCT/JP2022/031686, dated Nov. 15, 2022.

*Primary Examiner* — Mark T Monk
(74) *Attorney, Agent, or Firm* — Michael Best & Friedrich LLP

(57) ABSTRACT

Solid-state imaging elements that accommodate expanded dynamic range are disclosed. In one example, a conversion efficiency control transistor controls conversion efficiency during conversion of a charge into a voltage by opening and closing a path between a floating diffusion layer and an additional capacitance. An upstream amplification transistor amplifies the voltage generated from the charge according to the conversion efficiency, and outputs the voltage to a node. Capacitive elements hold the output voltage. A selecting circuit connects any of the capacitive elements to a downstream node. A downstream circuit reads out and outputs the held voltage via the downstream node.

23 Claims, 63 Drawing Sheets

(56) References Cited

U.S. PATENT DOCUMENTS

| | | |
|---|---|---|
| 2020/0154066 A1 | 5/2020 | Johnson |
| 2020/0195863 A1 | 6/2020 | Shim |
| 2021/0203865 A1* | 7/2021 | Manabe ................ H04N 25/59 |
| 2022/0006967 A1 | 1/2022 | Asakura |

FOREIGN PATENT DOCUMENTS

| | | |
|---|---|---|
| JP | 2019057873 A | 4/2019 |
| JP | 2019062400 A | 4/2019 |
| JP | 2021-158313 A | 10/2021 |
| WO | 2020039531 A1 | 2/2020 |
| WO | 2020/095544 A1 | 5/2020 |
| WO | WO-2021185190 A1 | 9/2021 |

* cited by examiner

F I G . 1
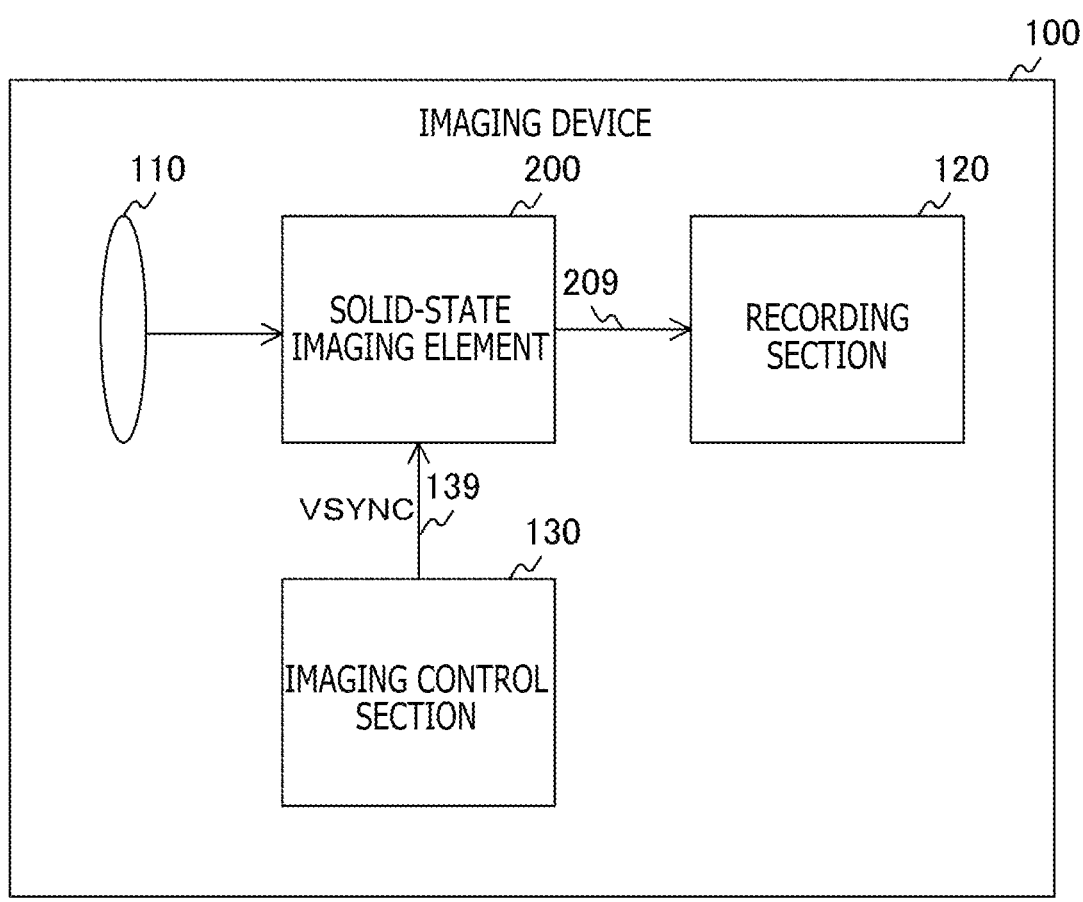

FIG. 9
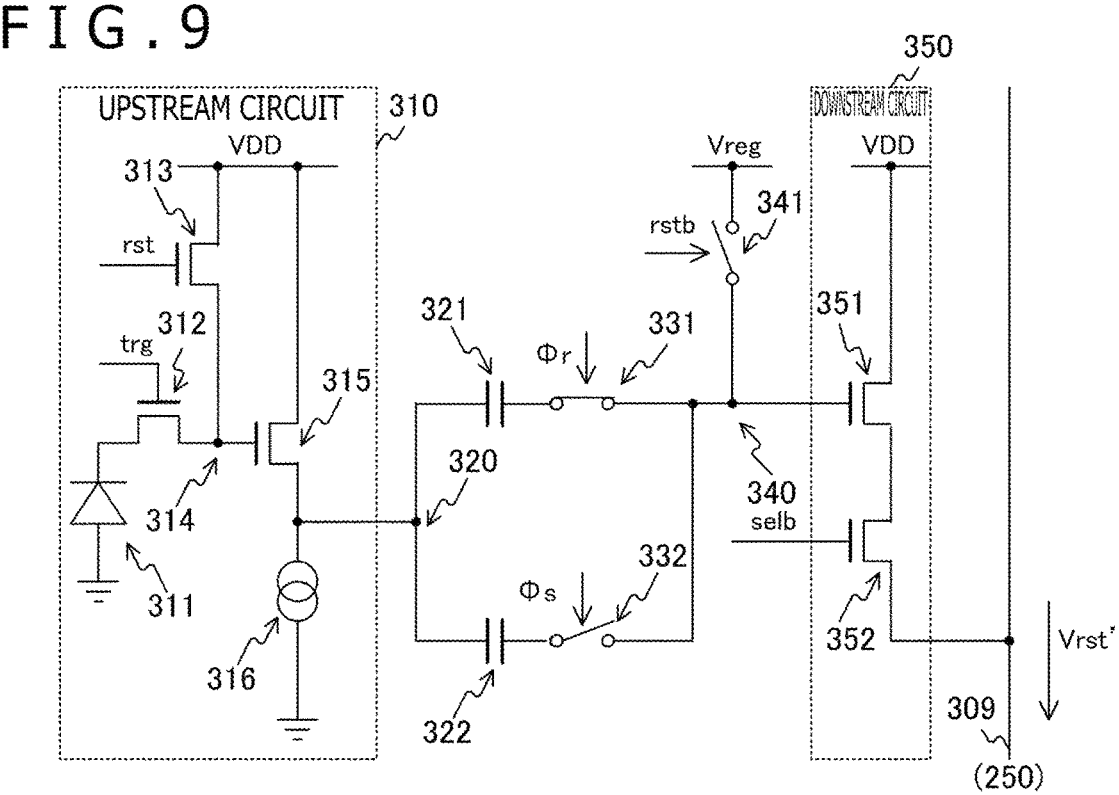
a
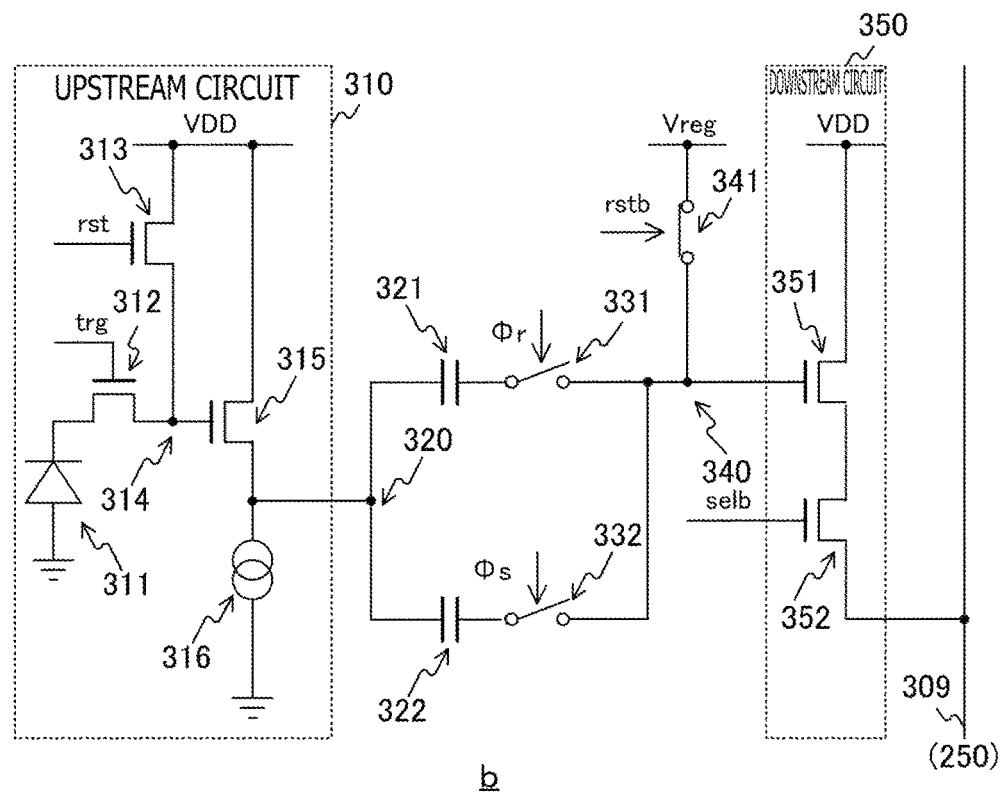
b

FIG. 33
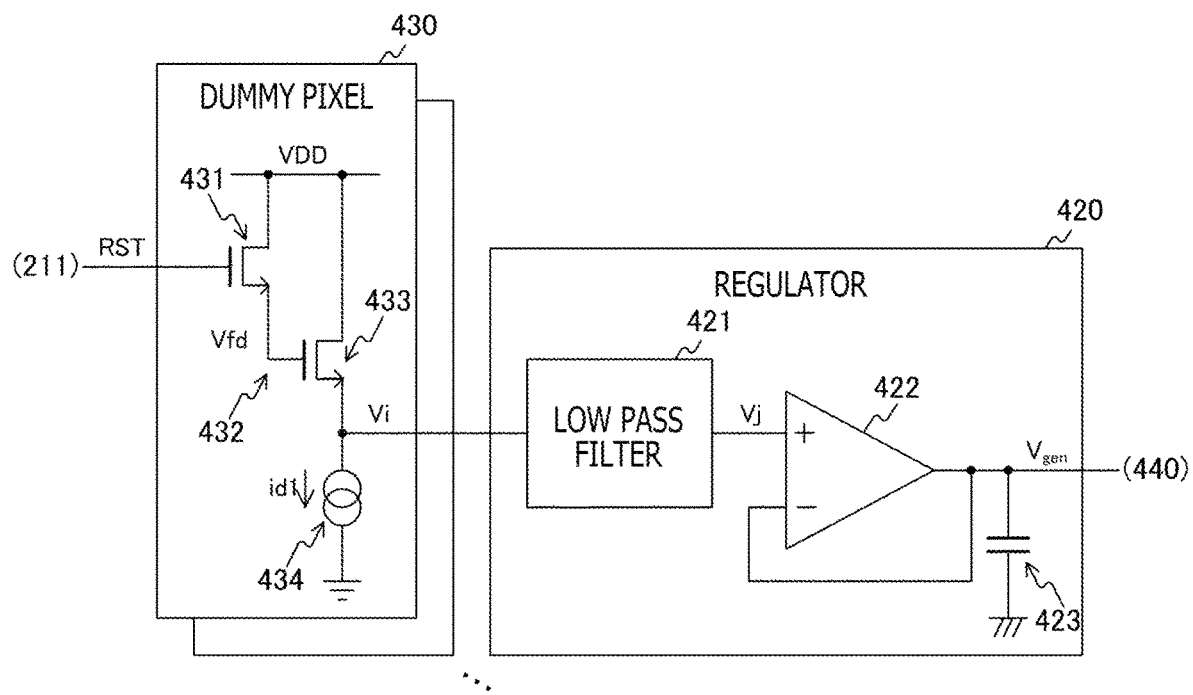
a
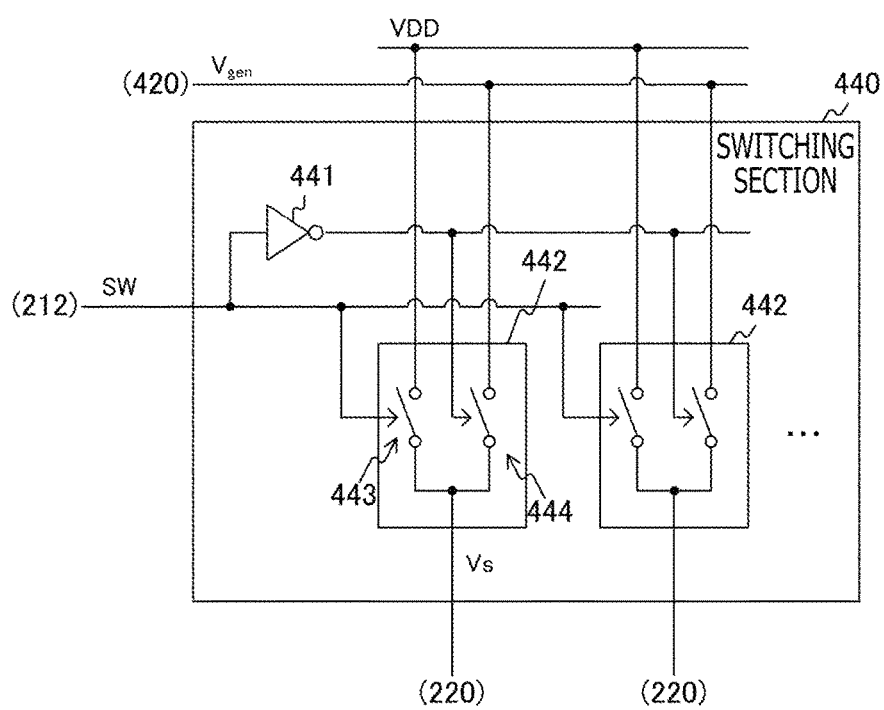
b

FIG.38

| OPERATION | NOISE | RN(μVrms) | | NOTES |
|---|---|---|---|---|
| | | FIRST EMBODIMENT | SEVENTH EMBODIMENT | |
| GLOBAL SHUTTER | PIXEL kTC NOISE | 450 | 450 | SH CAPACITANCE 50 fF |
| SEQUENTIAL READOUT | NOISE OF UPSTREAM SF | 380 | 0 | — |
| | NOISE OF DOWNSTREAM AND SUBSEQUENT SFS | 160 | 160 | INCLUDING ADC NOISE |
| TOTAL | | 610 | 478 | — |

FIG.44

| DRIVE SCHEME | EIGHTH EMBODIMENT (CURRENT DRIVE) | FIRST MODIFICATION EXAMPLE (PRECHARGE DRIVE) | SECOND MODIFICATION EXAMPLE (PRECHARGE + CURRENT DRIVE) |
|---|---|---|---|
| ADVANTAGE | — | LOW NOISE | - SETTLING OF UPSTREAM NODE FROM LOW TO HIGH: SHORT |
| DISADVANTAGE | - VARIATIONS OF CURRENT SOURCE IN THRESHOLD REGION: LARGE<br>- SETTLING OF UPSTREAM NODE FROM HIGH TO LOW: LONG | - UPSTREAM NODE AFTER PRECHARGE IS HiZ, AND TIME IS CONSUMED UNTIL STABILIZATION<br>→ SUSCEPTIBLE TO DISTURBANCE | — | ns
SOLID-STATE IMAGING ELEMENT, IMAGING DEVICE, AND SOLID-STATE IMAGING ELEMENT CONTROL METHOD

TECHNICAL FIELD

The present technology relates to a solid-state imaging element. Specifically, the present technology relates to a solid-state imaging element, an imaging device, and a solid-state imaging element control method that perform column-by-column AD (Analog to Digital) conversion.

BACKGROUND ART

There has been a conventionally-used column ADC (Analog to Digital Converter) scheme in which, in a solid-state imaging element, for the purpose of miniaturizing pixels, an ADC is arranged for each column outside a pixel array section and pixel signals are read out sequentially row by row. There is a proposed solid-state imaging element using this column ADC scheme that switches, between two levels, the conversion efficiency of conversion of a charge to a voltage by opening and closing a path between a floating diffusion layer and an additional capacitance (e.g., refer to PTL 1). In this solid-state imaging element, four signals are sequentially generated in an upstream circuit, four capacitive elements in each pixel are caused to hold the four signals, and a downstream circuit outputs the four signals via four vertical signal lines for each column.

CITATION LIST

Patent Literature

[PTL 1]
JP 2019-062400A

SUMMARY

Technical Problem

The conventional technology described above attempts to expand the dynamic range by switching the conversion efficiency. However, since the solid-state imaging element described above makes it necessary to place four vertical signal lines for each column and arrange an amplification transistor and a selection transistor for each of the vertical signal lines, the number of vertical signal lines to be placed and the number of transistors increase undesirably. Because of this, there is a problem that miniaturization of pixels becomes difficult.

The present technology has been produced in view of such a situation, and an object thereof is to make miniaturization of pixels easier in a solid-state imaging element with an expanded dynamic range.

Solution to Problem

The present technology has been made to solve the problem described above, and a first aspect thereof is a solid-state imaging element including a conversion efficiency control transistor that controls conversion efficiency at a time of conversion of a charge into a voltage by opening and closing a path between a floating diffusion layer and an additional capacitance, an upstream amplification transistor that amplifies the voltage generated from the charge with the conversion efficiency and outputs the voltage to an upstream node, a plurality of capacitive elements that hold the output voltage, a selecting circuit that connects any of the plurality of capacitive elements to a downstream node, and a downstream circuit that reads out and outputs the held voltage via the downstream node, and a control method thereof. This gives an effect that the conversion efficiency is switched and miniaturization of pixels becomes easier.

In addition, in the first aspect, the voltage may be at any of a first reset level, a first signal level, a second reset level, and a second signal level, and the plurality of capacitive elements may include a first capacitive element that holds the first reset level, a second capacitive element that holds the first signal level, a third capacitive element that holds the second reset level, and a fourth capacitive element that holds the second signal level. This gives an effect that the conversion efficiency is switched between two levels.

In addition, in the first aspect, the solid-state imaging element may further include a photoelectric converting element and a discharge transistor that discharges a charge overflowing from the photoelectric converting element. The discharge transistor may be inserted between a connection node between the conversion efficiency control transistor and the additional capacitance and the photoelectric converting element. This gives an effect that potential variations of the floating diffusion layer due to an overflow are suppressed.

In addition, in the first aspect, the conversion efficiency control transistor may include first and second conversion efficiency control transistors inserted between the additional capacitance and the floating diffusion layer, the voltage may be at any of a first reset level, a first signal level, a second reset level, a second signal level, a third reset level, and a third signal level, and the plurality of capacitive elements may include a first capacitive element that holds the first reset level, a second capacitive element that holds the first signal level, a third capacitive element that holds the second reset level, a fourth capacitive element that holds the second signal level, a fifth capacitive element that holds the third reset level, and a sixth capacitive element that holds the third signal level. This gives an effect that the conversion efficiency is switched among three levels.

In addition, in the first aspect, the solid-state imaging element may further include a photoelectric converting element and a discharge transistor that discharges a charge overflowing from the photoelectric converting element. The discharge transistor may be inserted between a connection node between the first conversion efficiency control transistor and the additional capacitance and the photoelectric converting element. This gives an effect that potential variations of the floating diffusion layer due to an overflow are suppressed.

In addition, in the first aspect, the solid-state imaging element may further include a current source transistor that supplies a predetermined current to the upstream amplification transistor. This gives an effect that the upstream amplification transistor is driven.

In addition, in the first aspect, the solid-state imaging element may further include a first switch that opens and closes a path between the upstream node and the upstream amplification transistor, and a second switch that opens and closes a path between the upstream node and a predetermined ground terminal. This gives an effect that noise is reduced.

In addition, in the first aspect, the solid-state imaging element may further include a current source transistor that supplies a predetermined current to the upstream amplification transistor via the first switch. This gives an effect that the upstream amplification transistor is current-driven in an imaging device.

In addition, in the first aspect, the solid-state imaging element may further include a photoelectric converting element, an upstream transfer transistor that transfers a charge from the photoelectric converting element to the floating diffusion layer, and a first reset transistor that initializes the floating diffusion layer. One end of each of the plurality of capacitive elements may share a connection to the upstream node, and the other end of each of the plurality of capacitive elements may be connected to the selecting circuit. This gives an effect that settling of the upstream node becomes faster.

In addition, in the first aspect, the solid-state imaging element may further include a switching section that adjusts a source voltage to be supplied to a source of the upstream amplification transistor, and a current source transistor connected to a drain of the upstream amplification transistor. The current source transistor may transition to an OFF state from an ON state after an end of an exposure period. This gives an effect that an upstream source follower is switched to the OFF state at the time of readout.

In addition, in the first aspect, the switching section may supply, as the source voltage, a predetermined power supply voltage in the exposure period, and supply, as the source voltage, a generation voltage different from the power supply voltage after the end of the exposure period. This gives an effect that the source voltage of the upstream source follower is adjusted.

In addition, in the first aspect, a difference between the power supply voltage and the generation voltage may substantially match a sum of a variation amount caused by a reset feedthrough of the first reset transistor and a gate-source voltage of the upstream amplification transistor. This gives an effect that the photo response non-uniformity is ameliorated.

In addition, in the first aspect, at a predetermined exposure start timing, the upstream transfer transistor may transfer the charge to the floating diffusion layer, and the first reset transistor may initialize the photoelectric converting element along with the floating diffusion layer, and at a predetermined exposure end timing, the upstream transfer transistor may transfer the charge to the floating diffusion layer. This gives an effect that a potential at the time of exposure and a potential at the time of readout are caused to match each other.

In addition, in the first aspect, the solid-state imaging element may further include a digital signal processing section that adds together a pair of consecutive frames. The plurality of capacitive elements may include first and second capacitive elements, the voltage may be at any of a reset level and a signal level. In an exposure period of one of the pair of frames, the selecting circuit may cause one of the first and second capacitive elements to hold the reset level, and thereafter cause the other of the first and second capacitive elements to hold the signal level, and, in an exposure period of the other of the pair of frames, the selecting circuit may cause the other of the first and second capacitive elements to hold the reset level, and thereafter cause the one of the first and second capacitive elements to hold the signal level. This gives an effect that the photo response non-uniformity is ameliorated.

In addition, in the first aspect, the solid-state imaging element may further include an analog-to-digital converter that converts the output voltage to a digital signal. This gives an effect that digital image data is generated.

In addition, in the first aspect, the analog-to-digital converter may include a comparator that compares a level of a vertical signal line which transfers the voltage and a predetermined ramp signal and that outputs a comparison result, and a counter that performs counting with a count over a period until the comparison result is inverted and that outputs the digital signal representing the count. This gives an effect that analog-to-digital conversion is realized with a simple configuration.

In addition, in the first aspect, the comparator may include a comparing section that compares levels of a pair of input terminals and outputs a comparison result, and an input side selector that selects any one of the vertical signal line and a node with a predetermined reference voltage and connects the selected one to one of the pair of input terminals, and the ramp signal may be input to one of the pair of input terminals. This gives an effect that sunspot reduction is suppressed.

In addition, in the first aspect, the solid-state imaging element may further include a control section that determines whether or not illuminance is higher than a predetermined value on the basis of the comparison result and that outputs a determination result, a CDS (Correlated Double Sampling) processing section that executes a correlated double sampling process on the digital signal, and an output side selector that outputs any of the digital signal on which the correlated double sampling process has been executed and a digital signal with a predetermined value, on the basis of the determination result. This gives an effect that sunspot reduction is suppressed.

In addition, in the first aspect, the solid-state imaging element may further include a short circuit transistor that opens and closes a path between the upstream node and an output node of the downstream circuit, and the plurality of capacitive elements may include first and second capacitive elements. This gives an effect that capacitive elements are reduced.

In addition, in the first aspect, the solid-state imaging element may further include a vertical scanning circuit that, immediately before an end of a first exposure period, initializes the floating diffusion layer, causes the first capacitive element to hold the voltage as a first reset level while switching the conversion efficiency control transistor to an opened state, causes a charge to be transferred and the second capacitive element to hold the voltage as a first signal level at the end of the first exposure period while switching the conversion efficiency control transistor to the opened state, and causes a charge to be transferred and the floating diffusion layer to hold the voltage as a second signal level at an end of a second exposure period while switching the conversion efficiency control transistor to a closed state. This gives an effect that all the pixels are exposed with a dual gain.

In addition, in the first aspect, the solid-state imaging element may further include an analog-to-digital converter, and the vertical scanning circuit may switch the short circuit transistor to a closed state in a readout period and cause the second signal level to be output to the analog-to-digital converter, initialize the floating diffusion layer and cause the voltage to be output to the analog-to-digital converter as a second reset level while switching the short circuit transistor to the closed state, and cause the first reset level and the first signal level to be output sequentially to the analog-to-digital converter while switching the short circuit transistor to an opened state. This gives an effect that pixel signals are read out with a dual gain.

In addition, a second aspect of the present technology is an imaging device including a conversion efficiency control transistor that controls conversion efficiency at a time of conversion of a charge into a voltage by opening and closing a path between a floating diffusion layer and an additional capacitance, an upstream amplification transistor that amplifies the voltage generated from the charge with the conversion efficiency and outputs the voltage to an upstream node, a plurality of capacitive elements that hold the output voltage, a selecting circuit that connects any of the plurality of capacitive elements to a downstream node, a downstream circuit that reads out and outputs the voltage held at the plurality of capacitive elements via the downstream node, and a signal processing circuit that processes a signal with the voltage. This gives an effect that, in the imaging device, the conversion efficiency is switched and miniaturization of pixels becomes easier.

BRIEF DESCRIPTION OF DRAWINGS

FIG. 1 is a block diagram depicting a configuration example of an imaging device in a first embodiment of the present technology.

FIG. 9 is a figure depicting examples of a state of the pixel at the time of reset-level readout and a state of the pixel at the time of initialization of a downstream node in the first embodiment of the present technology.

FIG. 33 is a circuit diagram depicting a configuration example of a dummy pixel, a regulator, and a switching section in the seventh embodiment of the present technology.

FIG. 38 is a figure for explaining effects in the seventh embodiment of the present technology.

FIG. 44 is a figure summarizing respective features of drive schemes of an upstream amplification transistor in the embodiments of the present technology.

DESCRIPTION OF EMBODIMENTS

Figure 2:
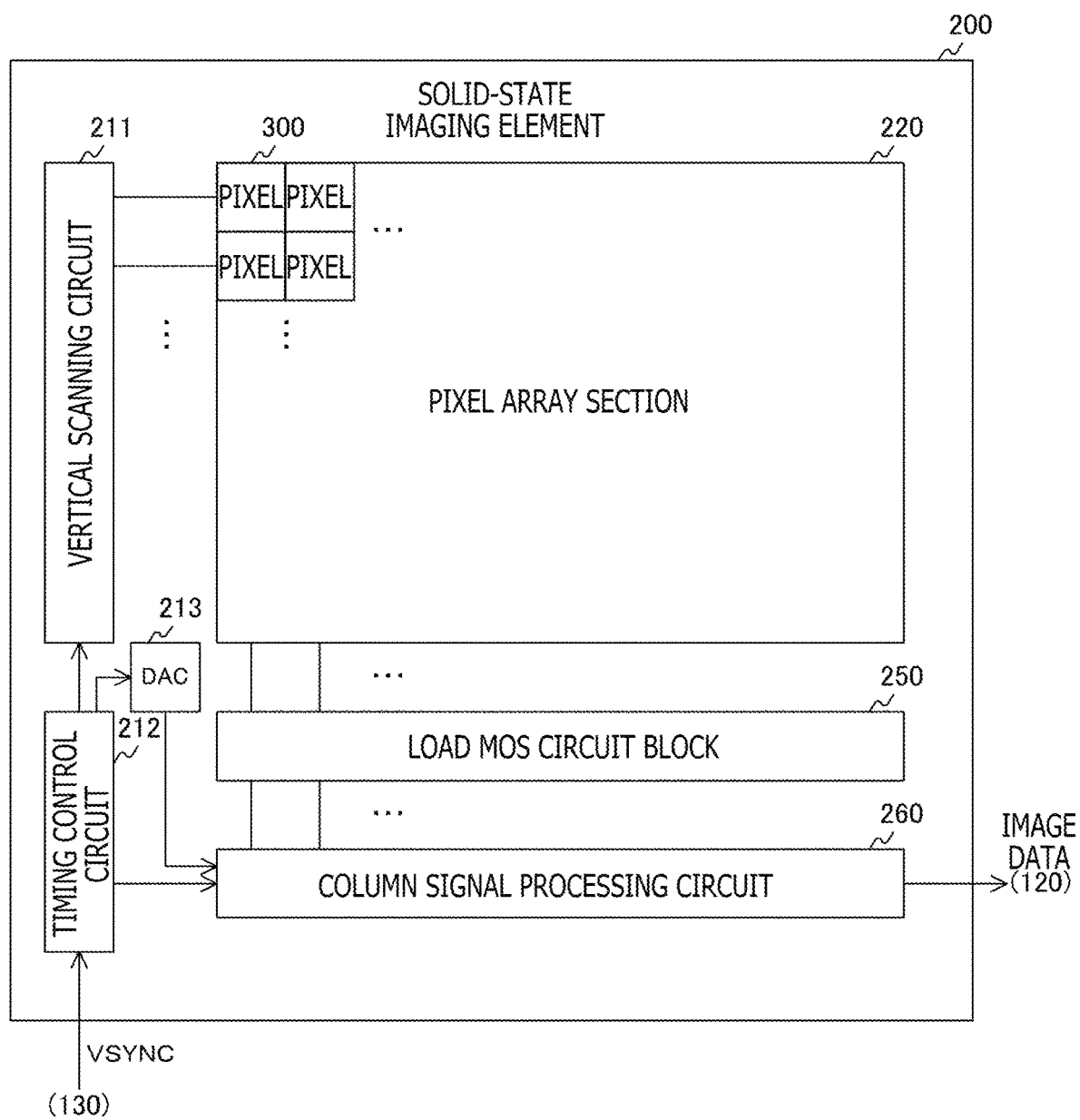
FIG. 2 is a block diagram depicting a configuration example of a solid-state imaging element in the first embodiment of the present technology.

Hereinbelow, modes for carrying out the present technology (hereinafter, referred to as embodiments) are explained. The explanation is given in the following order.

1. First Embodiment (example in which first and second capacitive elements are caused to hold pixel signals)
2. Second Embodiment (example in which discharge transistor is added and first and second capacitive elements are caused to hold pixel signals)
3. Third Embodiment (example in which first and second capacitive elements are caused to hold pixel signals and reset power supply voltage is controlled)
4. Fourth Embodiment (example in which first and second capacitive elements are caused to hold pixel signals and levels to be held are switched from one to another for each frame)
5. Fifth Embodiment (example in which first and second capacitive elements are caused to hold pixel signals and sunspot phenomenon is suppressed)
6. Sixth Embodiment (example in which first and second capacitive elements are caused to hold pixel signals and rolling shutter operation is performed)
7. Seventh Embodiment (example in which first and second capacitive elements are caused to hold pixel signals and upstream source follower is switched to OFF state at time of readout)
8. Eighth Embodiment (example in which plurality of capacitive elements are caused to hold pixel signals with switched conversion efficiency)
9. Ninth Embodiment (example in which discharge transistor is added and plurality of capacitive elements are caused to hold pixel signals with switched conversion efficiency)
10. Tenth Embodiment (example in which plurality of capacitive elements are caused to hold pixel signals with conversion efficiency that is switched among three levels)
11. Eleventh Embodiment (example in which discharge transistor is added and plurality of capacitive elements are caused to hold pixel signals with conversion efficiency that is switched among three levels)
12. Twelfth Embodiment (example in which short circuit transistor is added and capacitive elements are reduced)
13. Examples of Application to Mobile Bodies 1. First Embodiment

[Configuration Example of Imaging Device]

FIG. 1 is a block diagram depicting a configuration example of an imaging device 100 in the first embodiment of the present technology. The imaging device 100 is a device that captures image data, and includes an imaging lens 110, a solid-state imaging element 200, a recording section 120, and an imaging control section 130. It is supposed that the imaging device 100 is a digital camera or an electronic device (a smartphone, a personal computer, etc.) having an imaging function.

The solid-state imaging element 200 is configured to capture image data under the control of the imaging control section 130. The solid-state imaging element 200 supplies the image data to the recording section 120 via a signal line 209.

The imaging lens 110 is configured to condense light and guide the light to the solid-state imaging element 200. The imaging control section 130 is configured to control the solid-state imaging element 200 to capture image data. For example, the imaging control section 130 supplies imaging control signals including a vertical synchronizing signal VSYNC to the solid-state imaging element 200 via a signal line 139. The recording section 120 is configured to record the image data.

Here, the vertical synchronizing signal VSYNC is a signal representing the timing of imaging, and a periodic signal with a predetermined frequency (60 hertz, etc.) is used as the vertical synchronizing signal VSYNC.

Note that the imaging device 100 records the image data, but may transmit the image data to the outside of the imaging device 100. In this case, an external interface for transmitting image data is further provided. Alternatively, the imaging device 100 may further display image data. In this case, a display section is further provided.

[Configuration Example of Solid-State Imaging Element]

FIG. 2 is a block diagram depicting a configuration example of the solid-state imaging element 200 in the first embodiment of the present technology. The solid-state imaging element 200 includes a vertical scanning circuit 211, a pixel array section 220, a timing control circuit 212, a DAC (Digital to Analog Converter) 213, a load MOS circuit block 250, and a column signal processing circuit 260. The pixel array section 220 has a plurality of pixels 300 that are arrayed in a two-dimensional grid. In addition, for example, each circuit in the solid-state imaging element 200 is provided on a single semiconductor chip.

Hereinbelow, a set of pixels 300 arrayed in the horizontal direction is referred to as a "row," and a set of pixels 300 arrayed in a direction perpendicular to rows is referred to as a "column."

The timing control circuit 212 is configured to control respective operation timings of the vertical scanning circuit 211, the DAC 213, and the column signal processing circuit 260 in synchronization with the vertical synchronizing signal VSYNC from the imaging control section 130.

The DAC 213 is configured to generate a sawtooth-wave-patterned ramp signal by DA (Digital to Analog) conversion. The DAC 213 supplies the generated ramp signal to the column signal processing circuit 260.

The vertical scanning circuit 211 is configured to sequentially select and drive rows and cause analog pixel signals to be output. Each pixel 300 is configured to photoelectrically convert incident light and generate an analog pixel signal. The pixel 300 supplies the pixel signal to the column signal processing circuit 260 via the load MOS circuit block 250.

For each column, the load MOS circuit block 250 is provided with a MOS transistor that supplies a predetermined current.

The column signal processing circuit 260 is configured to execute signal processing such as an AD conversion process or CDS processing on pixel signals for each column. The column signal processing circuit 260 supplies, to the recording section 120, image data including signals that have been subjected to the processing. Note that the column signal processing circuit 260 is an example of a signal processing circuit described in claims.

[Configuration Example of Pixel]

Figure 3:
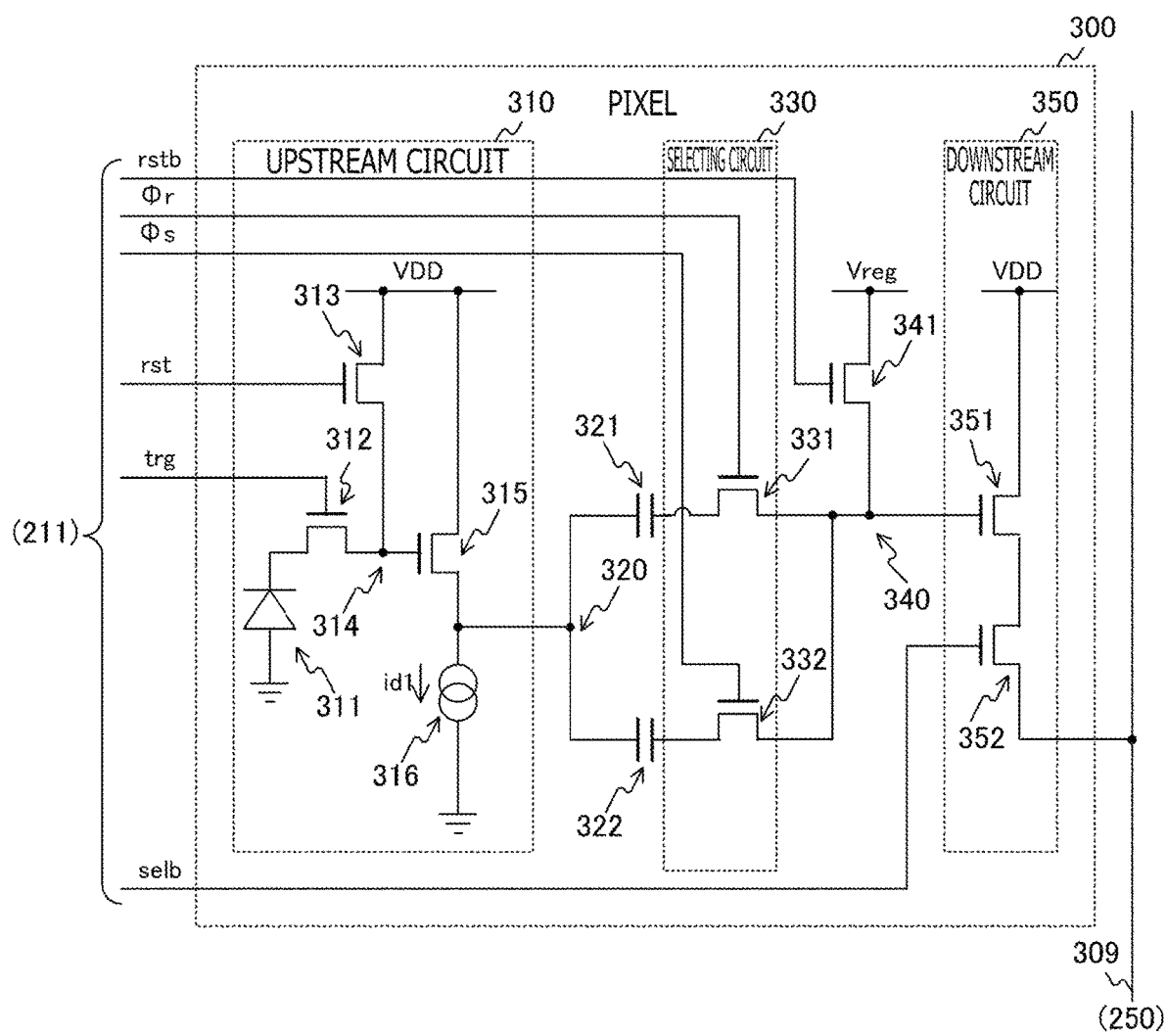
FIG. 3 is a circuit diagram depicting a configuration example of a pixel in the first embodiment of the present technology.

FIG. 3 is a circuit diagram depicting a configuration example of the pixel 300 in the first embodiment of the present technology. The pixel 300 includes an upstream circuit 310, capacitive elements 321 and 322, a selecting circuit 330, a downstream reset transistor 341, and a downstream circuit 350.

The upstream circuit 310 includes a photoelectric converting element 311, a transfer transistor 312, an FD (Floating Diffusion) reset transistor 313, an FD 314, an upstream amplification transistor 315, and a current source transistor 316.

The photoelectric converting element 311 is configured to generate a charge by photoelectric conversion. The transfer transistor 312 is configured to transfer the charge from the photoelectric converting element 311 to the FD 314 according to a transfer signal trg from the vertical scanning circuit 211.

The FD reset transistor 313 is configured to extract the charge from the FD 314 and initialize the FD 314 according to an FD reset signal rst from the vertical scanning circuit 211. The FD 314 is configured to accumulate a charge and generate a voltage according to the electric charge amount. The upstream amplification transistor 315 is configured to amplify the level of the voltage of the FD 314 and output the voltage to an upstream node 320. Note that the FD reset transistor 313 is an example of a first reset transistor described in claims. In addition, the upstream amplification transistor 315 is an example of a first amplification transistor described in claims.

In addition, sources of the FD reset transistor 313 and the upstream amplification transistor 315 are connected to a power supply voltage VDD. The current source transistor 316 is connected to a drain of the upstream amplification transistor 315. Under the control of the vertical scanning circuit 211, the current source transistor 316 supplies a current id1.

One end of each of the capacitive elements 321 and 322 shares a connection to the upstream node 320, and the other end of each of the capacitive elements 321 and 322 is connected to the selecting circuit 330. Note that the capacitive elements 321 and 322 are examples of first and second capacitive elements described in claims.

The selecting circuit 330 includes a selection transistor 331 and a selection transistor 332. The selection transistor 331 is configured to open and close a path between the capacitive element 321 and a downstream node 340 according to a selection signal Φr from the vertical scanning circuit 211. The selection transistor 332 is configured to open and close a path between a capacitive element 322 and the downstream node 340 according to a selection signal Φs from the vertical scanning circuit 211.

The downstream reset transistor 341 is configured to initialize the level of the downstream node 340 to a predetermined potential Vreg according to a downstream reset signal rstb from the vertical scanning circuit 211. The potential Vreg is set to a potential different from a power supply potential VDD (e.g., a potential lower than VDD).

The downstream circuit 350 includes a downstream amplification transistor 351 and a downstream selection transistor 352. The downstream amplification transistor 351 is configured to amplify the level of the downstream node

340. The downstream selection transistor 352 is configured to output, to a vertical signal line 309 and as a pixel signal, a signal at a level amplified by the downstream amplification transistor 351, according to a downstream selection signal selb from the vertical scanning circuit 211.

Note that, for example, nMOS (n-channel Metal Oxide Semiconductor) transistors are used as various types of transistors (the transfer transistor 312, etc.) in the pixel 300.

The vertical scanning circuit 211 supplies the high-level FD reset signal rst and transfer signal trg to all the pixels at the start of exposure. As a result, the photoelectric converting element 311 is initialized. Hereinbelow, this control is referred to as "PD resetting."

Further, immediately before the end of exposure, the vertical scanning circuit 211 supplies the high-level FD reset signal rst over a pulse period while switching the downstream reset signal rstb and the selection signal Φr to the high levels for all the pixels. As a result, the FD 314 is initialized, and a level according to the level of the FD 314 at that time is held at the capacitive element 321. This control is referred to as "FD resetting" hereinbelow.

The level of the FD 314 at the time of FD resetting and a level (the hold level of the capacitive element 321 and the level of the vertical signal line 309) corresponding to the level of the FD 314 at the time of FD resetting are collectively referred to as a "P phase" or a "reset level" hereinbelow.

At the end of exposure, the vertical scanning circuit 211 supplies the high-level transfer signal trg over a pulse period while switching the downstream reset signal rstb and the selection signal Φs to the high levels for all the pixels. As a result, a signal charge according to an exposure amount is transferred to the FD 314, and a level according to the level of the FD 314 at that time is held at the capacitive element 322.

The level of the FD 314 at the time of signal charge transfer and a level (the hold level of the capacitive element 322 and the level of the vertical signal line 309) corresponding to the level of the FD 314 at the time of signal charge transfer are collectively referred to as a "D phase" or a "signal level" hereinbelow.

The exposure control in which exposure is started and ended simultaneously for all the pixels as described above is called a global shutter scheme. With this exposure control, the upstream circuit 310 of each of all the pixels sequentially generates a reset level and a signal level. The reset level is held at the capacitive element 321, and the signal level is held at the capacitive element 322.

After the end of exposure, the vertical scanning circuit 211 sequentially selects rows, and causes reset levels and signal levels of a selected row to be sequentially output. When the reset levels are to be caused to be output, the vertical scanning circuit 211 supplies the high-level selection signal Φr over a predetermined period while switching the FD reset signal rst and the downstream selection signal selb for the selected row to the high levels. As a result, the capacitive elements 321 are connected to the downstream nodes 340, and the reset levels are read out.

After the reset-level readout, the vertical scanning circuit 211 supplies the high-level downstream reset signal rstb over a pulse period while keeping the FD reset signal rst and the downstream selection signal selb for the selected row at the high levels. As a result, the levels of the downstream nodes 340 are initialized. At this time, both the selection transistors 331 and the selection transistors 332 are in the opened state, and the capacitive elements 321 and 322 are disconnected from the downstream nodes 340.

After the initialization of the downstream nodes 340, the vertical scanning circuit 211 supplies the high-level selection signal Φs over a predetermined period while keeping the FD reset signal rst and the downstream selection signal selb for the selected row at the high levels. As a result, the capacitive elements 322 are connected to the downstream nodes 340, and the signal levels are read out.

With the readout control described above, the selecting circuits 330 in the selected row sequentially perform control of connecting the capacitive elements 321 to the downstream nodes 340, control of disconnecting the capacitive elements 321 and 322 from the downstream nodes 340, and control of connecting the capacitive elements 322 to the downstream nodes 340. In addition, when the capacitive elements 321 and 322 are disconnected from the downstream nodes 340, the downstream reset transistors 341 in the selected row initialize the levels of the downstream nodes 340. In addition, the downstream circuits 350 in the selected row sequentially read out the reset levels and the signal levels from the capacitive elements 321 and 322 via the downstream nodes 340, and output the reset levels and the signal levels to the vertical signal lines 309.

[Configuration Example of Column Signal Processing Circuit]

Figure 4:
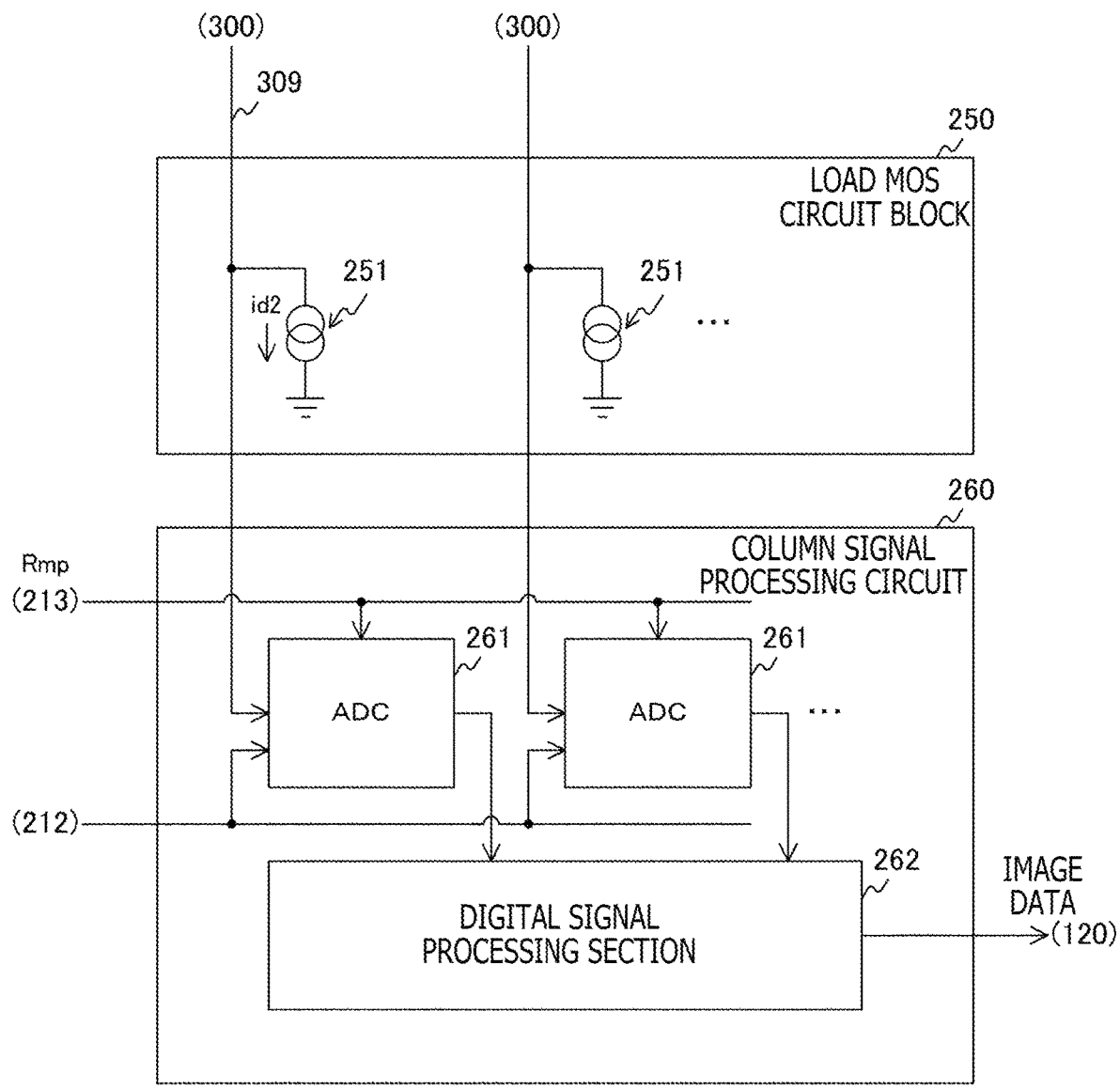
FIG. 4 is a block diagram depicting configuration examples of a column signal processing circuit and a load MOS circuit block in the first embodiment of the present technology.

FIG. 4 is a block diagram depicting configuration examples of the load MOS circuit block 250 and the column signal processing circuit 260 in the first embodiment of the present technology.

In the load MOS circuit block 250, a vertical signal line 309 is placed for each column. Supposing that the number of columns is I (I is an integer), I vertical signal lines 309 are placed. In addition, each of the vertical signal lines 309 is connected with a load MOS transistor 251 that supplies a predetermined current id2.

In the column signal processing circuit 260, a plurality of ADCs 261 and a digital signal processing section 262 are arranged. An ADC 261 is arranged for each column. Supposing that the number of columns is I, I ADCs 261 are arranged.

Each ADC 261 is configured to convert an analog pixel signal from the corresponding column to a digital signal by using a ramp signal Rmp from the DAC 213. The ADC 261 supplies the digital signal to the digital signal processing section 262. For example, as the ADC 261, a single-slope-type ADC including a comparator and a counter is arranged.

The digital signal processing section 262 is configured to perform predetermined signal processing such as CDS processing on each of digital signals of each column. The digital signal processing section 262 supplies, to the recording section 120, image data including digital signals that have been subjected to the processing.

[Operation Example of Solid-State Imaging Element]

Figure 5:
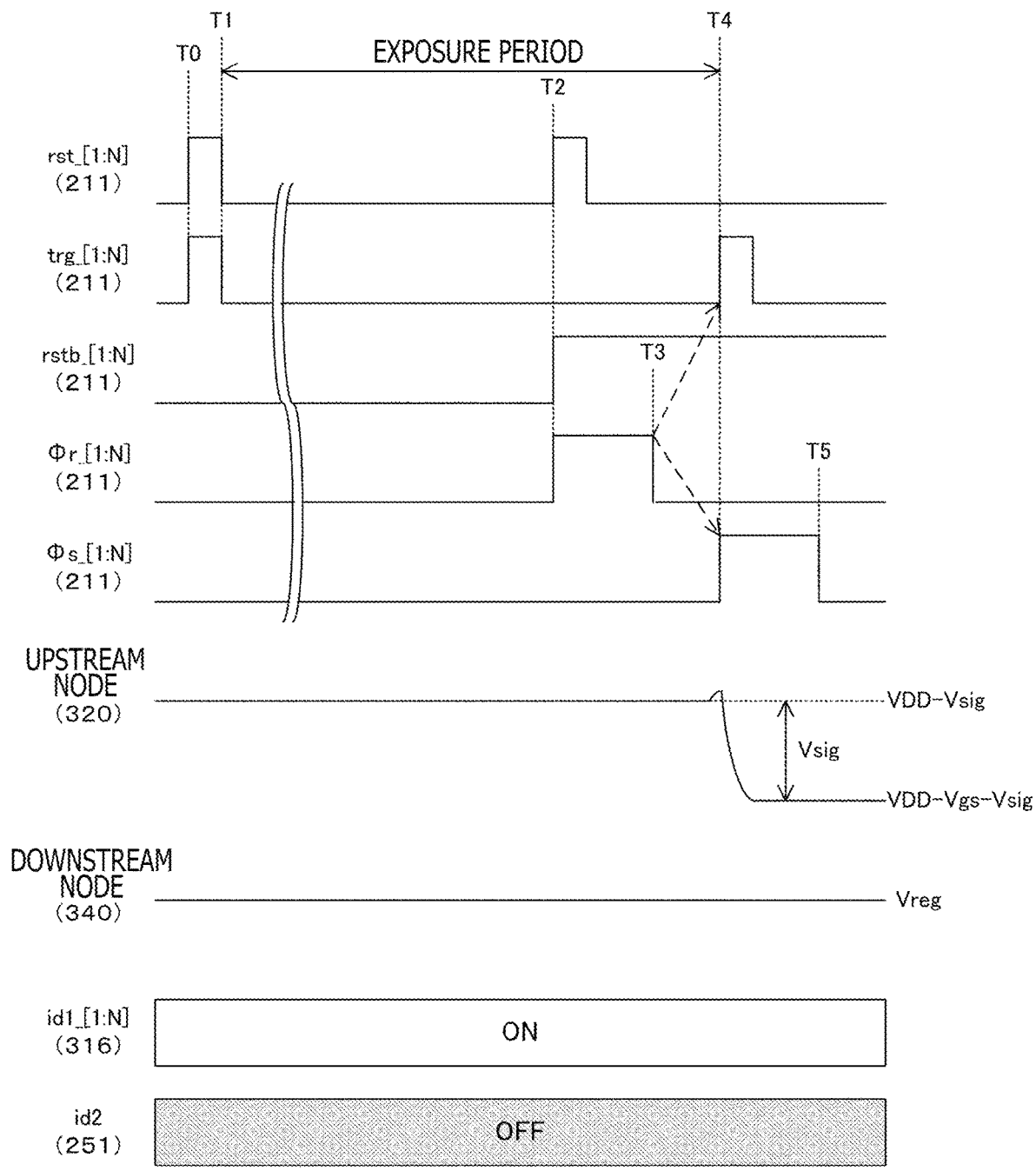
FIG. 5 is a timing chart depicting an example of a global shutter operation in the first embodiment of the present technology.

FIG. 5 is a timing chart depicting an example of a global shutter operation in the first embodiment of the present technology. From timing T0 immediately before the start of exposure to timing T1 after a lapse of a pulse period, the vertical scanning circuit 211 supplies the high-level FD reset signal rst and transfer signal trg to all the rows (i.e., all the pixels). As a result, all the pixels are PD-reset, and exposure is started simultaneously in all the rows.

Here, rst_[n] and trg_[n] in the figure represent signals to pixels in the n-th row in N rows. N is an integer representing the number of all the rows, and n is an integer from 1 to N.

Then, at timing T2 which is immediately before the end of the exposure period, the vertical scanning circuit 211 supplies the high-level FD reset signal rst over a pulse period while switching the downstream reset signal rstb and the selection signal Φr for all the pixels to the high levels. As a result, all the pixels are FD-reset, and the reset levels are sample-held. Here, rstb_[n] and Φr_[n] in the figure represent signals to pixels in the n-th row.

At timing T3 after timing T2, the vertical scanning circuit 211 switches the selection signal Φr back to the low level.

At timing T4 at the end of exposure, the vertical scanning circuit 211 supplies the high-level transfer signal trg over a pulse period while switching the downstream reset signal rstb and the selection signal Φs to the high levels for all the pixels. As a result, the signal levels are sample-held. In addition, the levels of the upstream nodes 320 lower from reset levels (VDD-Vsig) to signal levels (VDD-Vgs-Vsig). Here, VDD is a power supply voltage, and Vsig is a net signal level obtained with CDS processing. Vgs is the gate-source voltage of the upstream amplification transistors 315. In addition, Φs_[n] in the figure represents a signal to pixels in the n-th row.

At timing T5 after timing T4, the vertical scanning circuit 211 switches the selection signal Φs back to the low level.

In addition, the vertical scanning circuit 211 controls the current source transistors 316 of all the rows (all the pixels) to supply the current id1. Here, id1 [n] in the figure represents currents of pixels in the n-th row. Since an IR drop increases when a current id becomes a large current, the current id1 needs to be in the order of several nano-amperes (nA) to several dozen nano-amperes (nA). On the other hand, the load MOS transistors 251 in all the columns are in the OFF state, and the current id2 is not supplied to the vertical signal lines 309.

Figure 6:
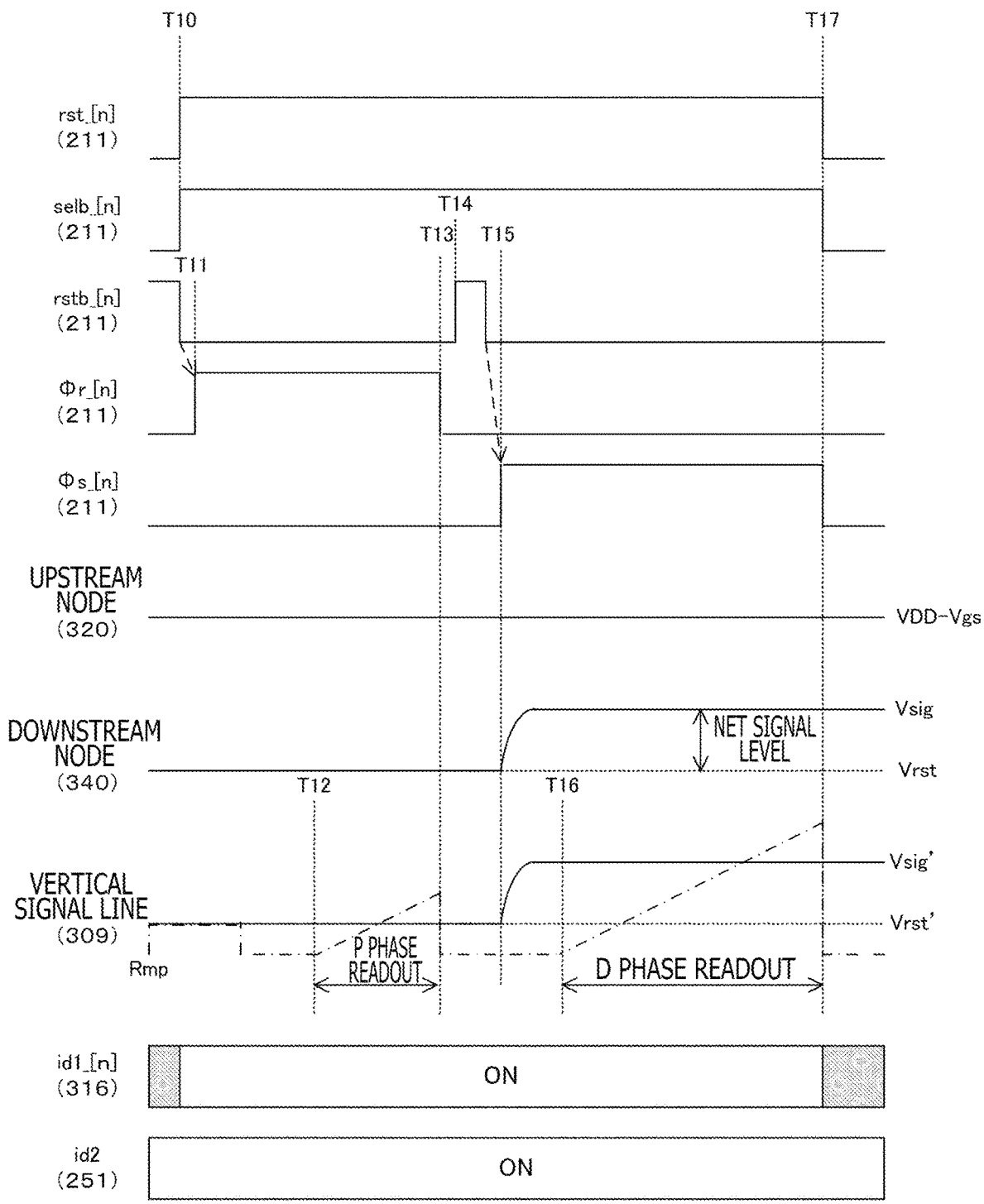
FIG. 6 is a timing chart depicting an example of a readout operation in the first embodiment of the present technology.

FIG. 6 is a timing chart depicting an example of a readout operation in the first embodiment of the present technology. In the readout period of the n-th row from timing T10 to timing T17, the vertical scanning circuit 211 switches the FD reset signals rst and the downstream selection signals selb for the n-th row to the high levels. In addition, in the readout period, the downstream reset signal rstb for all the rows is controlled to be at the low level. Here, selb [n] in the figure represents a signal to pixels in the n-th row.

Over the period from timing T11 immediately after timing T10 to timing T13, the vertical scanning circuit 211 supplies the high-level selection signal Φr to the n-th row. The potential of the downstream node 340 becomes a reset level Vrst.

The DAC 213 gradually raises the ramp signal Rmp over the period from timing T12 after timing T11 to timing T13. The ADC 261 compares the ramp signal Rmp and a level Vrst' of the vertical signal line 309, and performs counting with a count until the comparison result is inverted. As a result, the P-phase level (reset level) is read out.

The vertical scanning circuit 211 supplies the high-level downstream reset signal rstb to the n-th row over the pulse period from timing T14 immediately after timing T13. As a result, when there is a parasitic capacitance in the downstream node 340, it is possible to erase the history of a previous signal held at the parasitic capacitance.

The vertical scanning circuit 211 supplies the high-level selection signal Φs to the n-th row over the period from timing T15 immediately after the initialization of the downstream node 340 to timing T17. The potential of the downstream node 340 becomes a signal level Vsig. Although the signal level is lower than the reset level at the time of exposure, the signal level is higher than the reset level at the time of readout since the downstream node 340 is used as a reference node. The difference between the reset level Vrst and the signal level Vsig corresponds to a net signal level from which reset noise or offset noise of FDs has been removed.

The DAC 213 gradually raises the ramp signal Rmp over the period from timing T16 after timing T15 to timing T17. The ADC 261 compares the ramp signal Rmp and the level Vrst' of the vertical signal line 309, and performs counting with a count until the comparison result is inverted. As a result, the D-phase level (signal level) is read out.

In addition, the vertical scanning circuit 211 controls the current source transistors 316 in the n-th row which are the subject of readout to supply the current id1 over the period from timing T10 to timing T17. In addition, the timing control circuit 212 controls the load MOS transistors 251 in all the columns to supply the current id2 in a readout period of all the rows.

Figure 7:
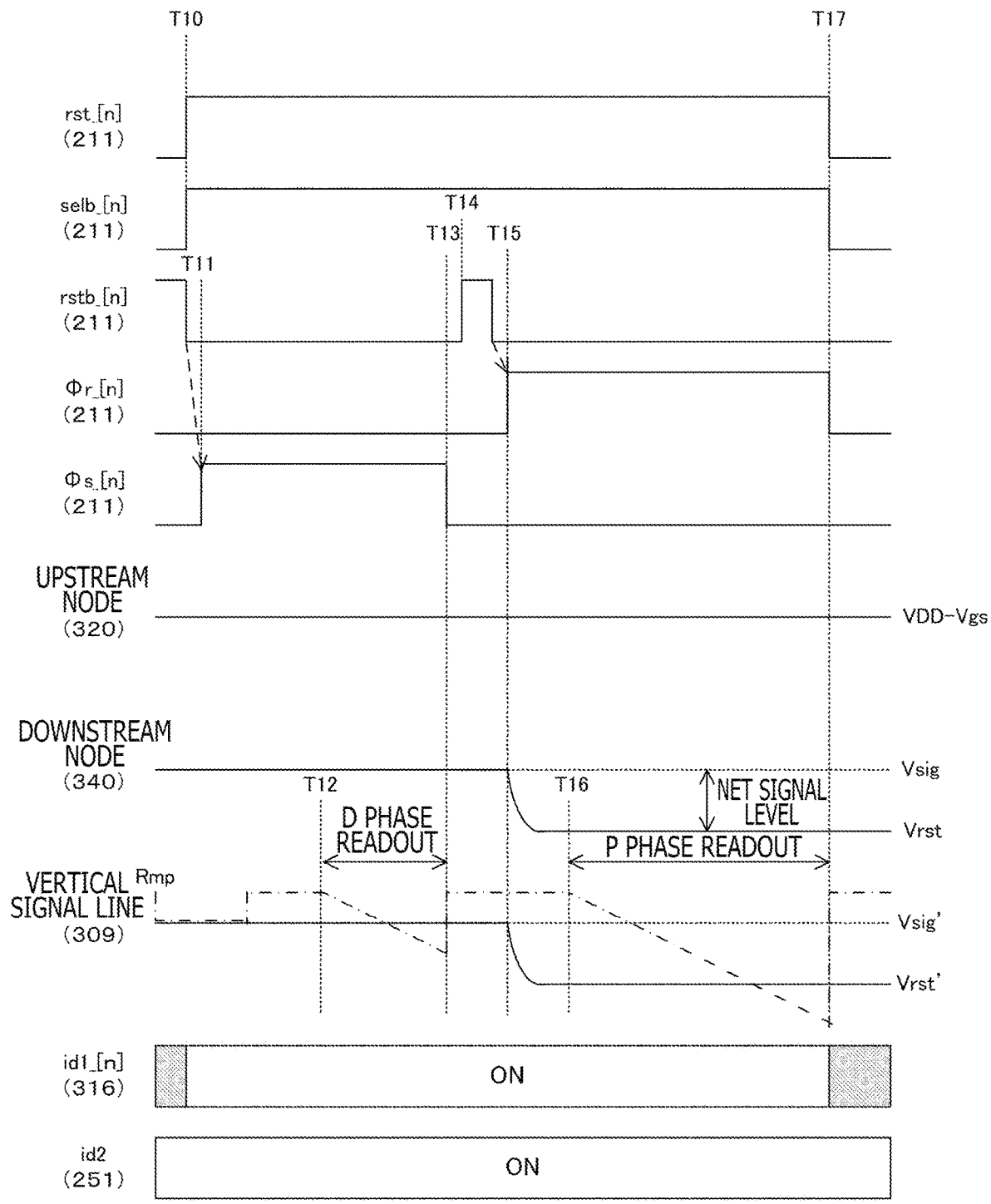
FIG. 7 is a timing chart depicting another example of the readout operation in the first embodiment of the present technology.

Note that, whereas the solid-state imaging element 200 reads out signal levels after reset levels, the order of readout is not limited to this order. As illustrated in FIG. 7, the solid-state imaging element 200 can also read out reset levels after signal levels. In this case, as illustrated in the figure, the vertical scanning circuit 211 supplies the high-level selection signal Φr after the high-level selection signal Φs. In addition, in this case, the inclination of the slope of the ramp signal needs to be made opposite.

Figure 8:
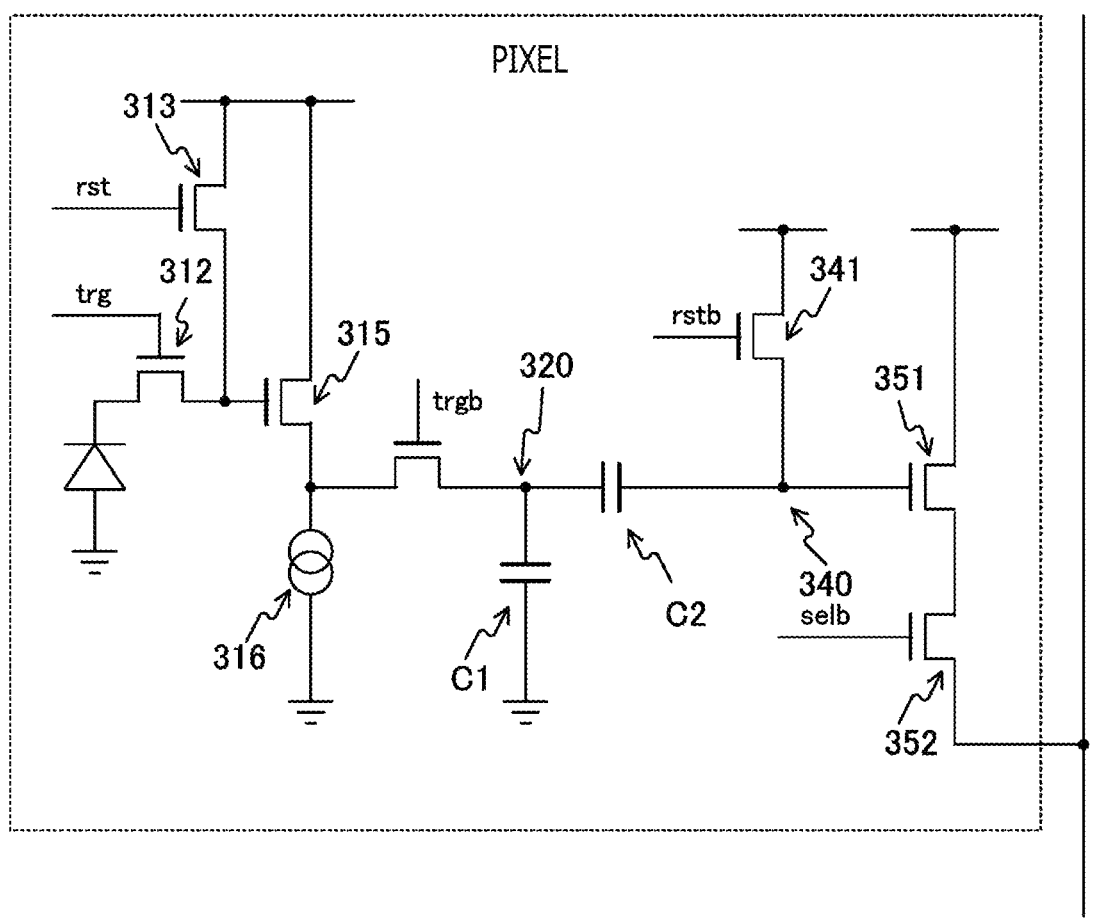
FIG. 8 is a circuit diagram depicting a configuration example of a pixel in a first comparative example.

FIG. 8 is a circuit diagram depicting a configuration example of a pixel in a first comparative example. In the first comparative example, the selecting circuit 330 is not provided, but a transfer transistor is inserted between the upstream node 320 and the upstream circuit. In addition, instead of the capacitive elements 321 and 322, capacitances C1 and C2 are inserted. The capacitance C1 is inserted between the upstream node 320 and a ground terminal, and the capacitance C2 is inserted between the upstream node 320 and the downstream node 340.

For example, pixel exposure control and readout control in the first comparative example are described in FIG. 5.5.2 of NPL 1. In the first comparative example, supposing that the capacitance value of each of the capacitances C1 and C2 is C, a level Vn of kTC noise at the times of exposure and readout is represented by the following formula.

$$Vn = (3*kT/C)^{1/2} \qquad \text{Formula 1}$$

In the formula above, k is the Boltzmann constant which is expressed in the unit of joule per kelvin (J/K), for example. T is an absolute temperature which is expressed in the unit of kelvin (K), for example. In addition, Vn is expressed in the unit of volt (V), for example, and C is expressed in the unit of farad (F), for example.

FIG. 9 is a figure depicting examples of a state of the pixel at the time of reset-level readout and a state of the pixel at the time of initialization of the downstream node in the first embodiment of the present technology. "a" in the figure depicts a state of the pixel 300 at the time of reset-level readout, and "b" in the figure depicts a state of the pixel 300 at the time of initialization of the downstream node 340. In addition, in the figure, the selection transistor 331, the selection transistor 332, and the downstream reset transistor 341 are represented by graphic symbols of switches for convenience of explanation.

As illustrated in "a" in the figure, the vertical scanning circuit 211 switches the selection transistor 331 to the closed state, and switches the selection transistor 332 and the downstream reset transistor 341 to the opened state. As a result, the reset level is read out via the downstream circuit 350.

After the reset-level readout, as illustrated in "b" in the figure, the vertical scanning circuit 211 switches the selection transistors 331 and the selection transistor 332 to the opened state, and switches the downstream reset transistor 341 to the closed state. As a result, the capacitive elements 321 and 322 are disconnected from the downstream node 340, and the level of the downstream node 340 is initialized.

It is supposed that the capacitance value of a parasitic capacitance Cp of the downstream node 340 in a state where the downstream node 340 is disconnected from the capacitive elements 321 and 322 as described above is very small as compared with the capacitive elements 321 and 322. For example, supposing that the parasitic capacitance Cp is several femtofarads (fF), the capacitive elements 321 and 322 are in the order of several dozen femtofarads.

Figure 10:
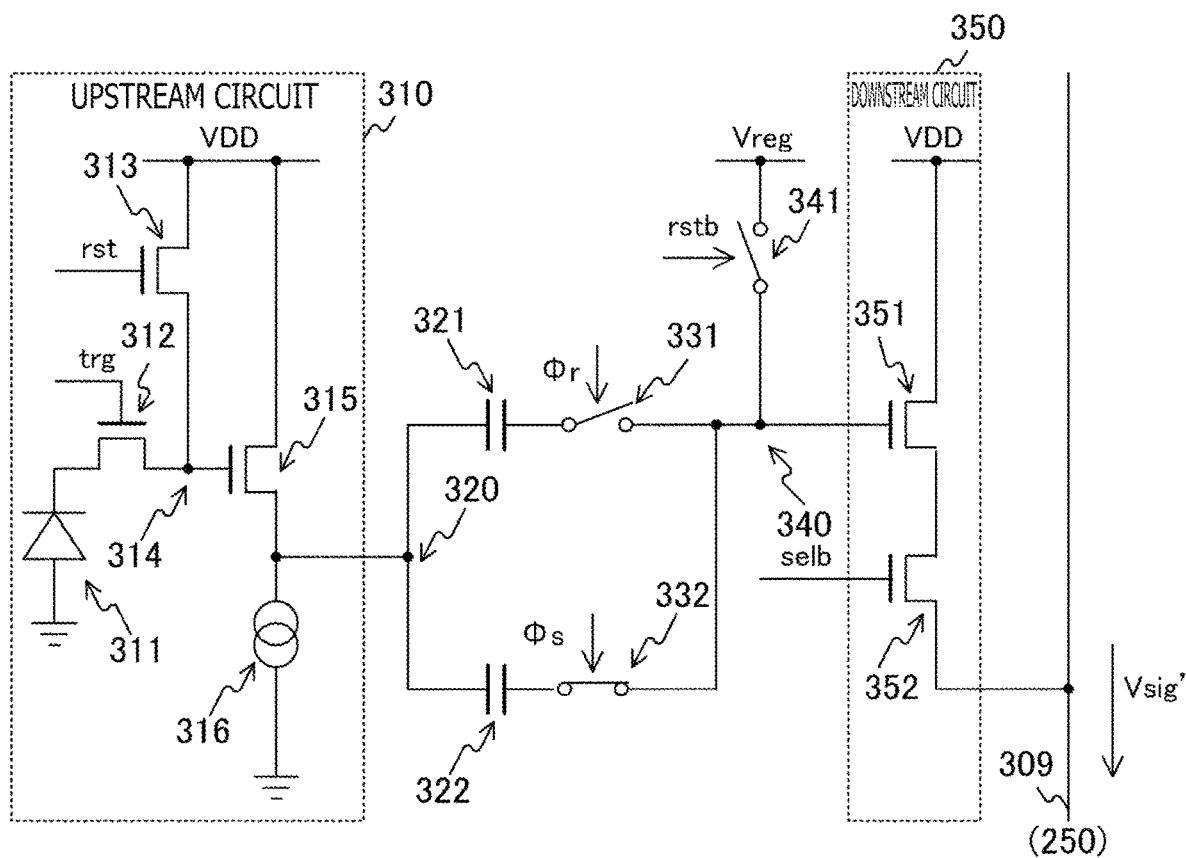
FIG. 10 is a figure depicting an example of a state of the pixel at the time of signal-level readout in the first embodiment of the present technology.

FIG. 10 is a figure depicting an example of a state of the pixel 300 at the time of signal-level readout in the first embodiment of the present technology.

After the initialization of the downstream node 340, the vertical scanning circuit 211 switches the selection transistor 332 to the closed state, and switches the selection transistor 331 and the downstream reset transistor 341 to the opened state. As a result, the signal level is read out via the downstream circuit 350.

Here, kTC noise at the time of exposure of the pixel 300 is examined. At the time of exposure, kTC noise occurs in each of sampling of the reset level and sampling of the signal level immediately before the end of exposure. Supposing that the capacitance value of each of the capacitive elements 321 and 322 is C, the level Vn of the kTC noise at the time of exposure is represented by the following formula.

$$Vn = (2*kT/C)^{1/2} \qquad \text{Formula 2}$$

In addition, since the downstream reset transistor 341 is being driven at the time of readout as illustrated in FIG. 9 and FIG. 10, kTC noise occurs at that time. However, the capacitive elements 321 and 322 are disconnected at the time of driving of the downstream reset transistor 341, and the parasitic capacitance Cp at that time is small. Because of this, kTC noise at the time of readout is negligible as compared with kTC noise at the time of exposure. Accordingly, kTC noise at the times of exposure and readout is represented by Formula 2.

According to Formula 1 and Formula 2, kTC noise of the pixel 300 in which the capacitances are disconnected at the time of readout is smaller than in the first comparative example in which the capacitances cannot be disconnected at the time of readout. As a result, the image quality of image data can be improved.

Figure 11:
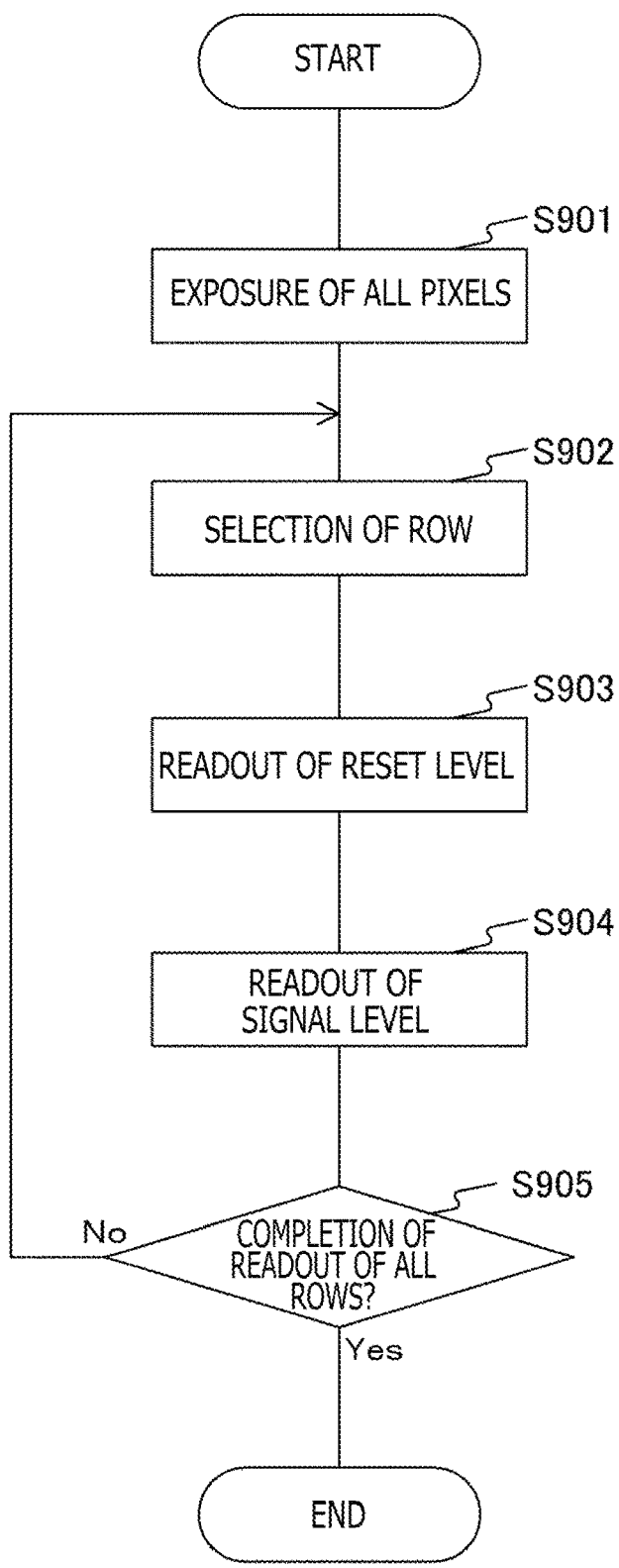
FIG. 11 is a flowchart depicting an example of an operation of the solid-state imaging element in the first embodiment of the present technology.

FIG. 11 is a flowchart depicting an example of an operation of the solid-state imaging element 200 in the first embodiment of the present technology. For example, this operation is started when a predetermined application for capturing image data is executed.

The vertical scanning circuit 211 performs exposure of all the pixels (step S901). Then, the vertical scanning circuit 211 selects a row to read out (step S902). The column signal processing circuit 260 performs reset-level readout of the selected row (step S903), and next performs signal-level readout (step S904).

The solid-state imaging element 200 determines whether or not readout of all the rows has been completed (step S905). In a case where readout of all the rows has not been completed (step S905: No), the solid-state imaging element 200 repeats step S902 and the subsequent steps. On the other hand, in a case where readout of all the rows has been completed (step S905: Yes), the solid-state imaging element 200 executes CDS processing or the like, and ends the operation for imaging. In a case where a plurality of pieces of image data are to be captured consecutively, steps S901 to S905 are executed repeatedly in synchronization with vertical synchronizing signals.

In such a manner, in the first embodiment of the present technology, the downstream reset transistor 341 initializes the downstream node 340 when the selecting circuit 330 disconnects the capacitive elements 321 and 322 from the downstream node 340. Since the capacitive elements 321 and 322 are disconnected, the level of reset noise due to driving of the capacitive elements 321 and 322 becomes a level according to a parasitic capacitance smaller than their capacitances. Due to this noise reduction, the image quality of image data can be improved.

First Modification Example

Whereas signals are read out while the upstream circuit 310 is kept connected to the upstream node 320 in the first embodiment described above, it is impossible with this configuration to block noise from the upstream node 320 at the time of readout. The pixels 300 in the first modification example of the first embodiment are different from those in the first embodiment in that a transistor is inserted between the upstream circuit 310 and the upstream node 320.

Figure 12:
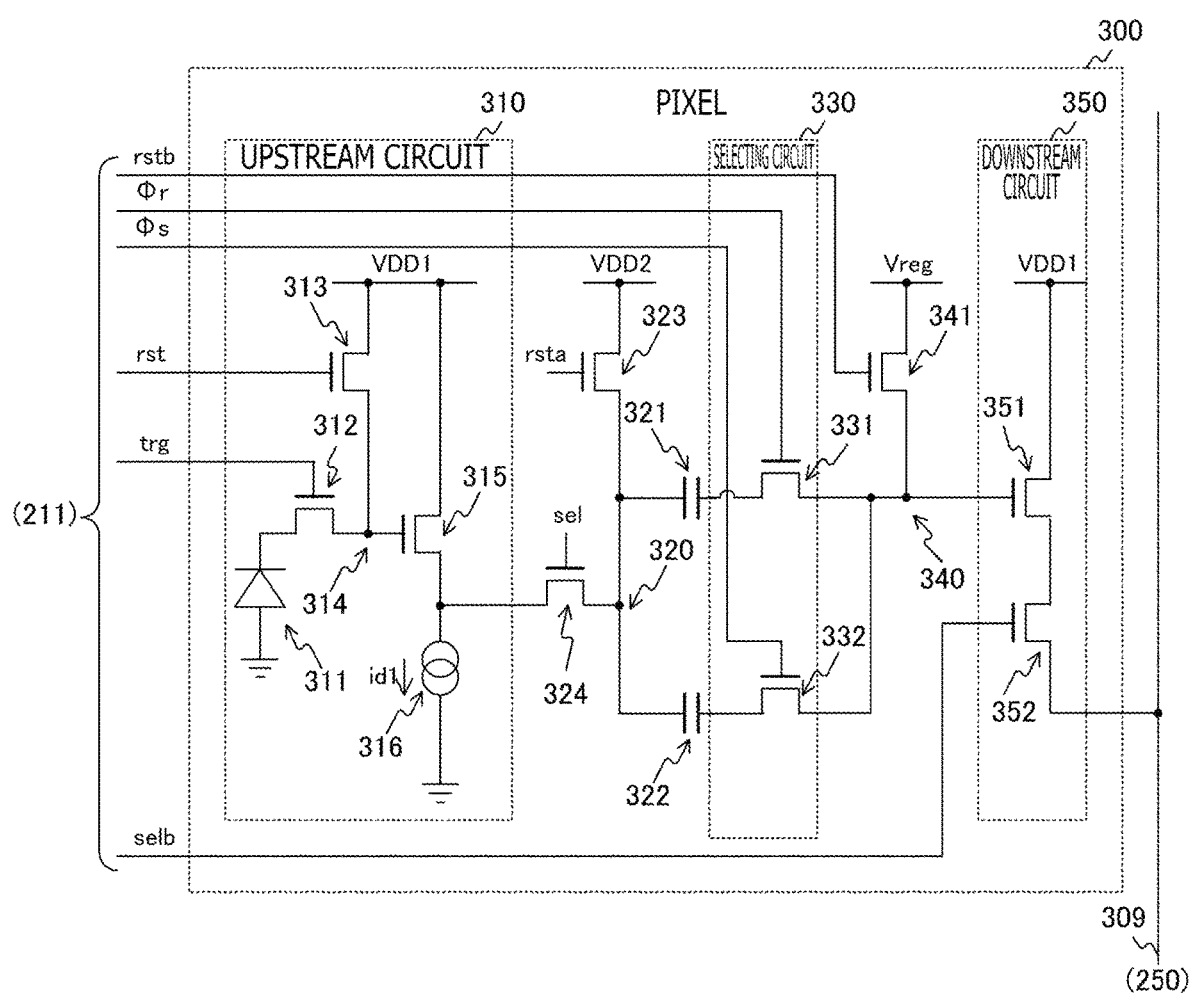
FIG. 12 is a circuit diagram depicting a configuration example of the pixel in a first modification example of the first embodiment of the present technology.

FIG. 12 is a circuit diagram depicting a configuration example of the pixel 300 in the first modification example of the first embodiment of the present technology. The pixels 300 in the first modification example of the first embodiment are different from those in the first embodiment in that each pixel 300 further includes an upstream reset transistor 323 and an upstream selection transistor 324. In addition, it is supposed that the power supply voltage of the upstream circuit 310 and the downstream circuit 350 in the first modification example of the first embodiment is VDD1.

The upstream reset transistor 323 is configured to initialize the level of the upstream node 320 by using a power supply voltage VDD2. It is desirable that this power supply voltage VDD2 be set to a value that satisfies the following formula.

$$VDD2 = VDD1 - Vgs \qquad \text{Formula 3}$$

In the formula above, Vgs is the gate-source voltage of the upstream amplification transistors 315.

By setting the power supply voltage VDD2 to a value that satisfies Formula 3, potential variations between the upstream node 320 and the downstream node 340 in a case of a dark environment can be reduced. As a result, the photo response non-uniformity (PRTJ) can be ameliorated.

The upstream selection transistor 324 is configured to open and close a path between the upstream circuit 310 and the upstream node 320 according to an upstream selection signal sel from the vertical scanning circuit 211.

Figure 13:
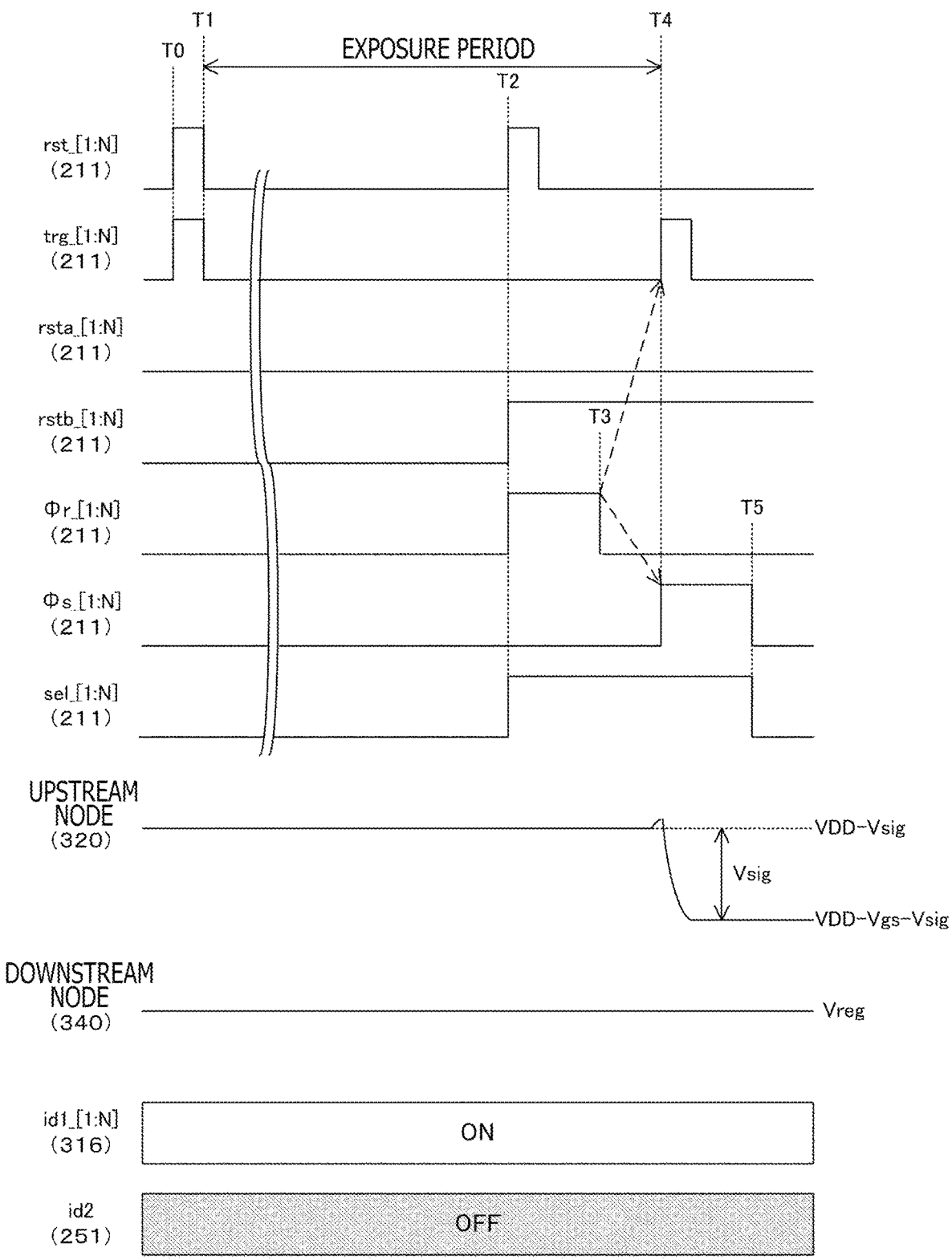
FIG. 13 is a timing chart depicting an example of the global shutter operation in the first modification example of the first embodiment of the present technology.

FIG. 13 is a timing chart depicting an example of the global shutter operation in the first modification example of the first embodiment of the present technology. The timing chart in the first modification example of the first embodiment is different from that in the first embodiment in that the vertical scanning circuit 211 further supplies an upstream reset signal rsta and the upstream selection signal sel. In the figure, rsta_[n] and sel_[n] represent signals to pixels in the n-th row.

The vertical scanning circuit 211 supplies the high-level upstream selection signal sel to all the pixels from timing T2 immediately before the end of exposure to timing T5. The upstream reset signal rsta is controlled to be at the low level.

Figure 14:
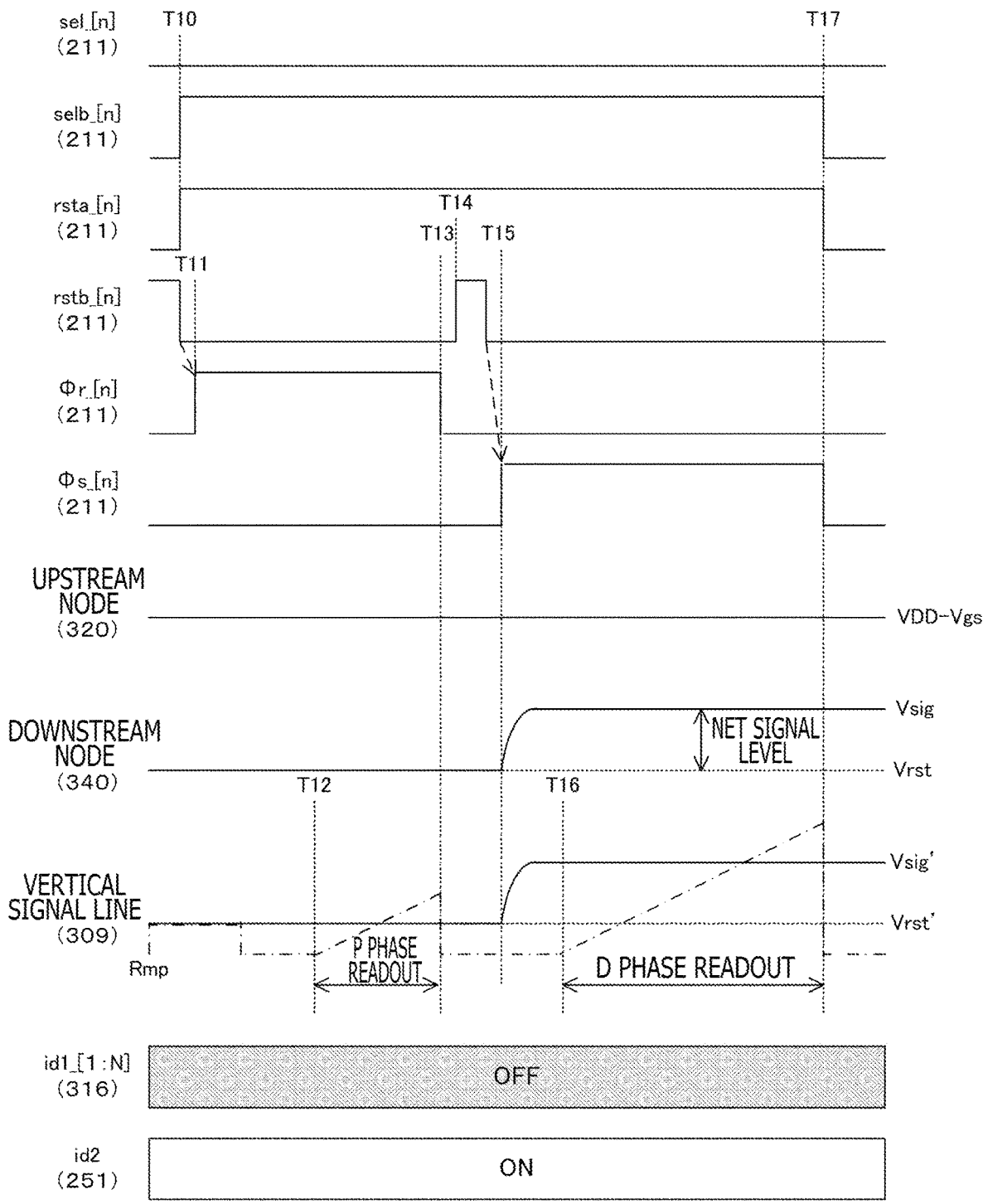
FIG. 14 is a timing chart depicting an example of the readout operation in the first modification example of the first embodiment of the present technology.

FIG. 14 is a timing chart depicting an example of the readout operation in the first modification example of the first embodiment of the present technology. At the time of readout of each row, the upstream selection signal sel is controlled to be at the low level. With this control, the upstream selection transistor 324 transitions to the opened state, and the upstream node 320 is disconnected from the upstream circuit 310. As a result, at the time of readout, noise from the upstream node 320 can be blocked.

In addition, in the readout period of the n-th row from timing T10 to timing T17, the vertical scanning circuit 211 supplies the high-level upstream reset signal rsta to the n-th row.

In addition, at the time of readout, the vertical scanning circuit 211 controls the current source transistor 316 of every pixel to stop the supply of the current id1. The current id2 is supplied as in the first embodiment. In such a manner, as compared with the first embodiment, control of the current id1 is simplified.

Since the upstream selection transistor 324 transitions to the opened state and the upstream circuit 310 is disconnected from the upstream node 320 at the time of readout according to the first modification example of the first embodiment of the present technology as described above, noise from the upstream circuit 310 can be blocked.

Second Modification Example

Whereas circuits in the solid-state imaging element 200 are provided on a single semiconductor chip in the first embodiment described above, there is a risk with this configuration that elements cannot be contained in the semiconductor chip when pixels 300 are miniaturized. The solid-state imaging element 200 in the second modification example of the first embodiment is different from that in the first embodiment in that circuits in the solid-state imaging element 200 are dispersedly arranged on two semiconductor chips.

Figure 15:
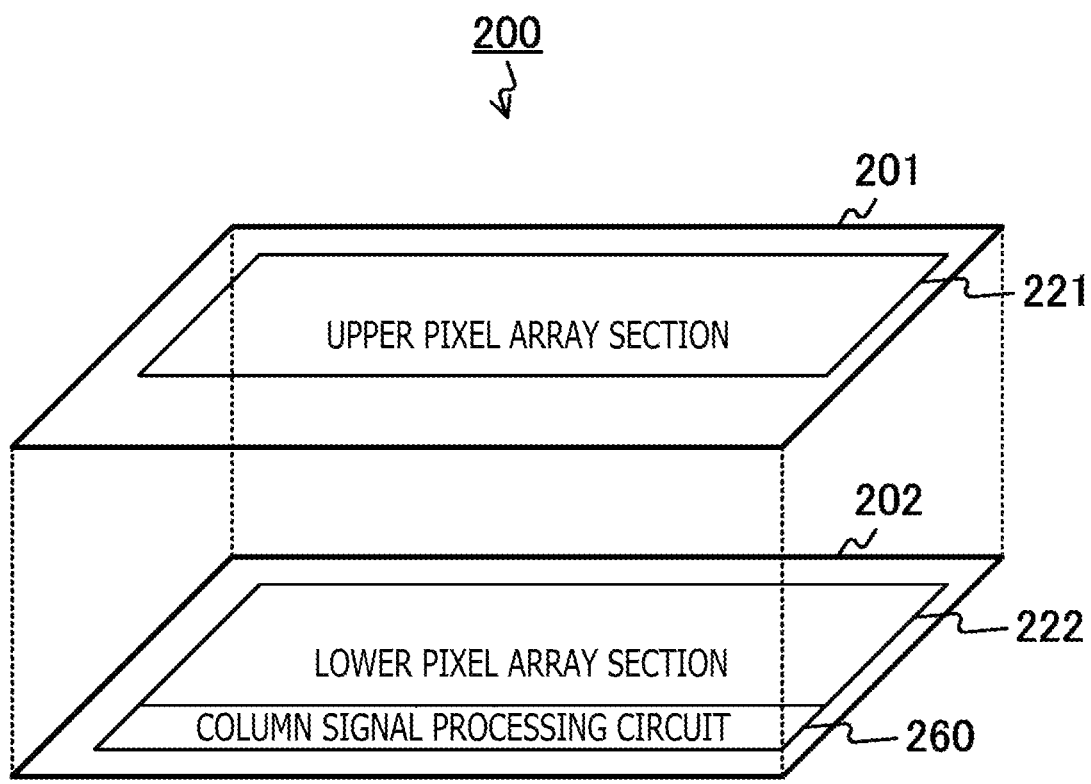
FIG. 15 is a figure depicting an example of a stacked structure of the solid-state imaging element in a second modification example of the first embodiment of the present technology.

FIG. 15 is a figure depicting an example of a stacked structure of the solid-state imaging element 200 in the second modification example of the first embodiment of the present technology. The solid-state imaging element 200 in the second modification example of the first embodiment includes a lower pixel chip 202 and an upper pixel chip 201 stacked on the lower pixel chip 202. For example, these chips are electrically connected to each other by Cu—Cu junctions. Note that they can also be connected to each other by vias or bumps, other than Cu—Cu junctions.

An upper pixel array section 221 is arranged on the upper pixel chip 201. A lower pixel array section 222 and the column signal processing circuit 260 are arranged on the lower pixel chip 202. A part of each pixel in the pixel array section 220 is arranged on the upper pixel array section 221, and the rest is arranged on the lower pixel array section 222.

In addition, the vertical scanning circuit 211, the timing control circuit 212, the DAC 213, and the load MOS circuit block 250 are also arranged on the lower pixel chip 202. These circuits are omitted in the figure.

In addition, for example, the upper pixel chip 201 is manufactured by a process dedicated for pixels, and, for example, the lower pixel chip 202 is manufactured by a CMOS (Complementary MOS) process.

Figure 16:
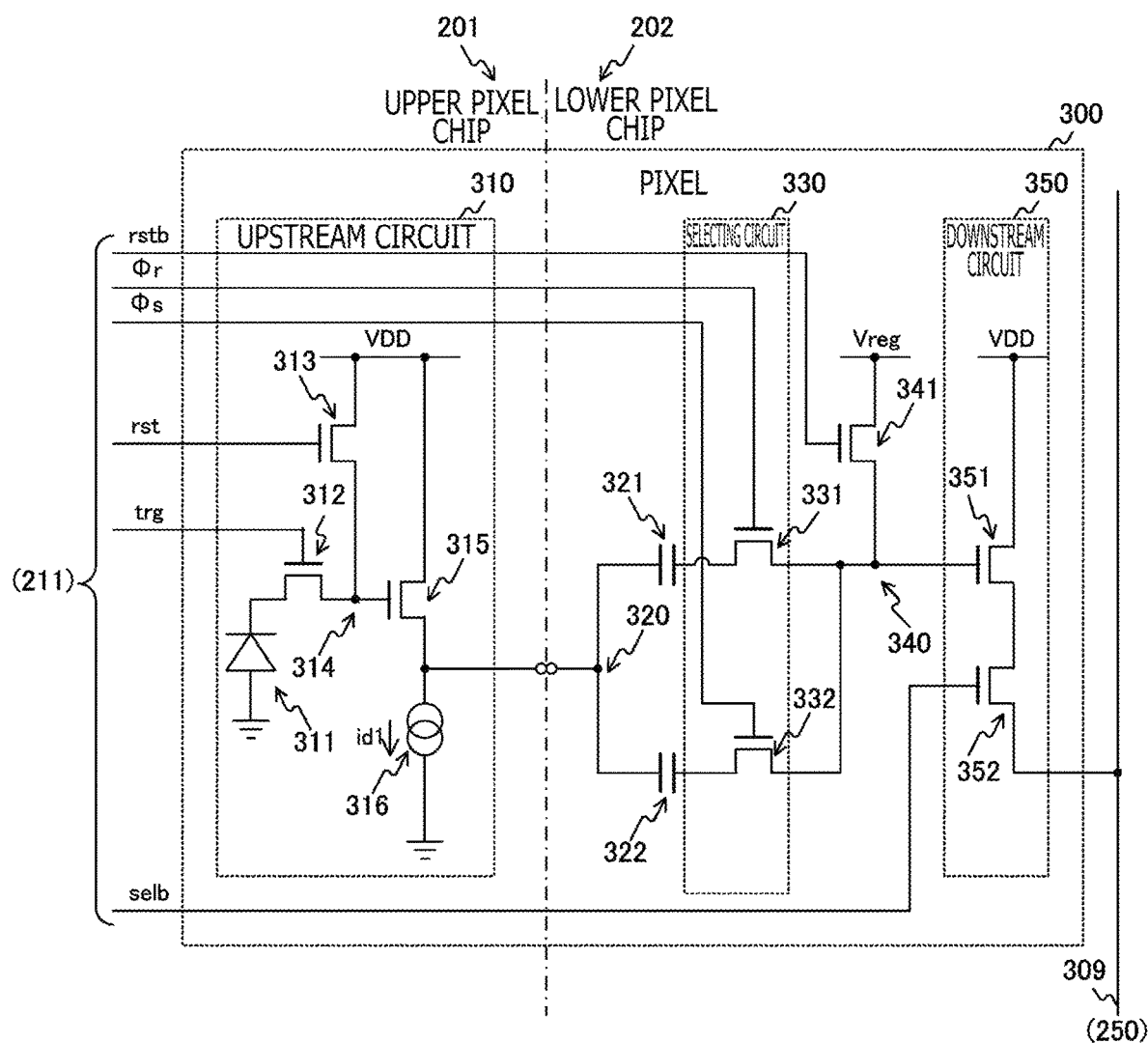
FIG. 16 is a circuit diagram depicting a configuration example of the pixel in the second modification example of the first embodiment of the present technology.

FIG. 16 is a circuit diagram depicting a configuration example of the pixel 300 in the second modification example of the first embodiment of the present technology. In the pixel 300, the upstream circuit 310 is arranged on the upper pixel chip 201, and other circuits or elements (the capacitive elements 321 and 322, etc.) are arranged on the lower pixel chip 202. Note that, in addition, the current source transistor 316 can also be arranged on the lower pixel chip 202. By dispersedly arranging elements in the pixel 300 on the stacked upper pixel chip 201 and lower pixel chip 202 as illustrated in the figure, the pixel area size can be reduced, and miniaturization of pixels becomes easier.

Since circuits and elements in the pixels 300 are dispersedly arranged on the two semiconductor chips according to the second modification example of the first embodiment of the present technology as described above, miniaturization of pixels becomes easier.

Third Modification Example

In the second modification example of the first embodiment described above, a part of each pixel 300 and peripheral circuits (the column signal processing circuit 260, etc.) are provided on the lower pixel chip 202 on the lower side. However, there is a risk with this configuration that the arrangement area size of circuits and elements on the side of the lower pixel chip 202 becomes greater than the upper pixel chip 201 by an amount corresponding to the peripheral circuits and a wasted space where there are no circuits or elements is generated on the upper pixel chip 201. The solid-state imaging element 200 in the third modification example of the first embodiment is different from that in the second modification example of the first embodiment in that circuits in the solid-state imaging element 200 are dispersedly arranged on three semiconductor chips.

Figure 17:
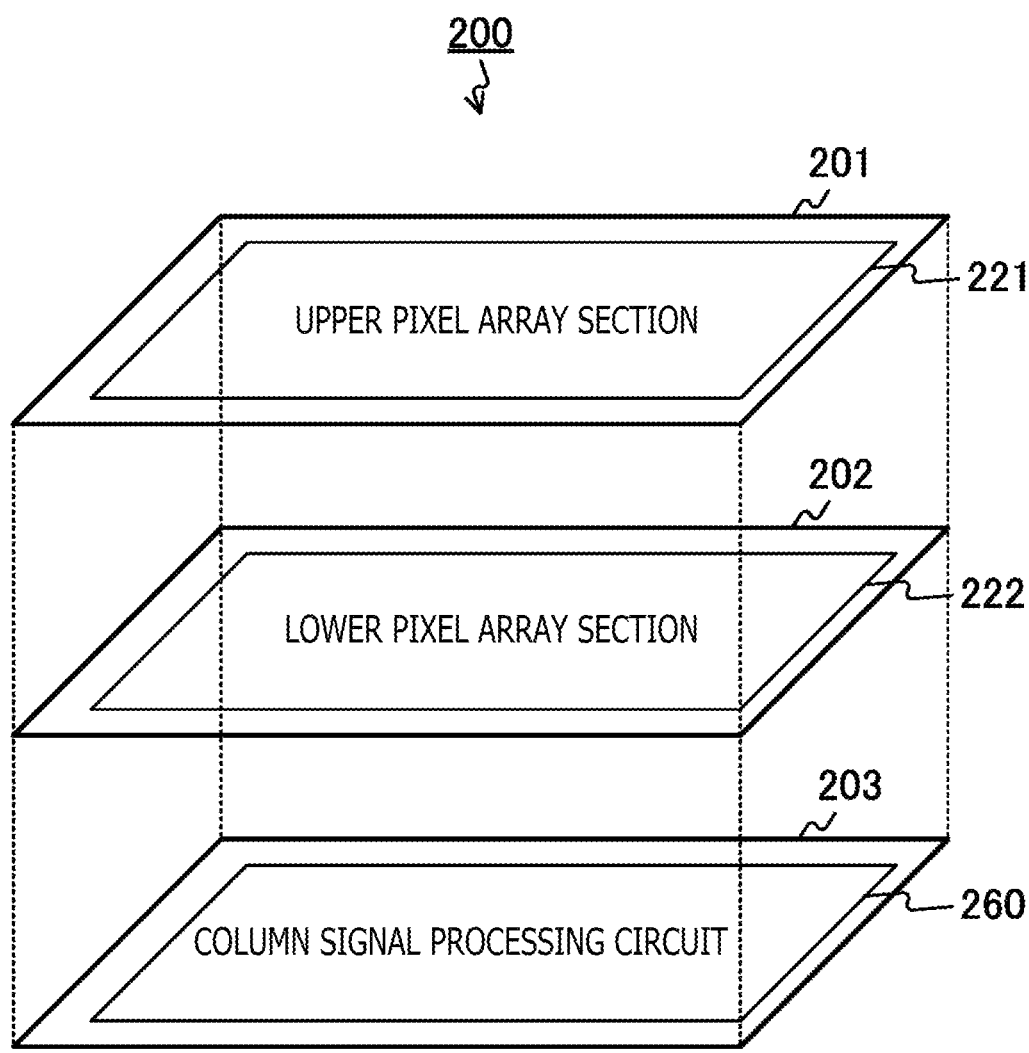
FIG. 17 is a figure depicting an example of the stacked structure of the solid-state imaging element in a third modification example of the first embodiment of the present technology.

FIG. 17 is a figure depicting an example of the stacked structure of the solid-state imaging element 200 in the third modification example of the first embodiment of the present technology. The solid-state imaging element 200 in the third modification example of the first embodiment includes the upper pixel chip 201, the lower pixel chip 202, and a circuit chip 203. For example, these chips are stacked one on another, and are electrically connected to one another by Cu—Cu junctions. Note that they can also be connected to one another by vias or bumps, other than Cu—Cu junctions.

The upper pixel array section 221 is arranged on the upper pixel chip 201. The lower pixel array section 222 is arranged on the lower pixel chip 202. A part of each pixel in the pixel array section 220 is arranged on the upper pixel array section 221, and the rest is arranged on the lower pixel array section 222.

In addition, the column signal processing circuit 260, the vertical scanning circuit 211, the timing control circuit 212, the DAC 213, and the load MOS circuit block 250 are arranged on the circuit chip 203. Circuits other than the column signal processing circuit 260 are omitted in the figure.

By adopting a three-layer configuration as illustrated in the figure, it is possible to reduce a wasted space and further miniaturize pixels as compared with the two-layer configuration. In addition, the lower pixel chip 202 on the second layer can be manufactured by a process dedicated for capacitances or switches.

Since circuits in the solid-state imaging element 200 are dispersedly arranged on the three semiconductor chips in the third modification example of the first embodiment of the present technology as described above, pixels can be miniaturized further as compared with the case where the circuits are dispersedly arranged on the two semiconductor chips.

2. Second Embodiment

Whereas reset levels are sample-held in exposure periods in the first embodiment described above, it is impossible with this configuration to make exposure periods shorter than reset-level sample-hold periods. The solid-state imaging element 200 in the second embodiment is different from that in the first embodiment in that exposure periods are made shorter by adding transistors to discharge charges from the photoelectric converting elements.

Figure 18:
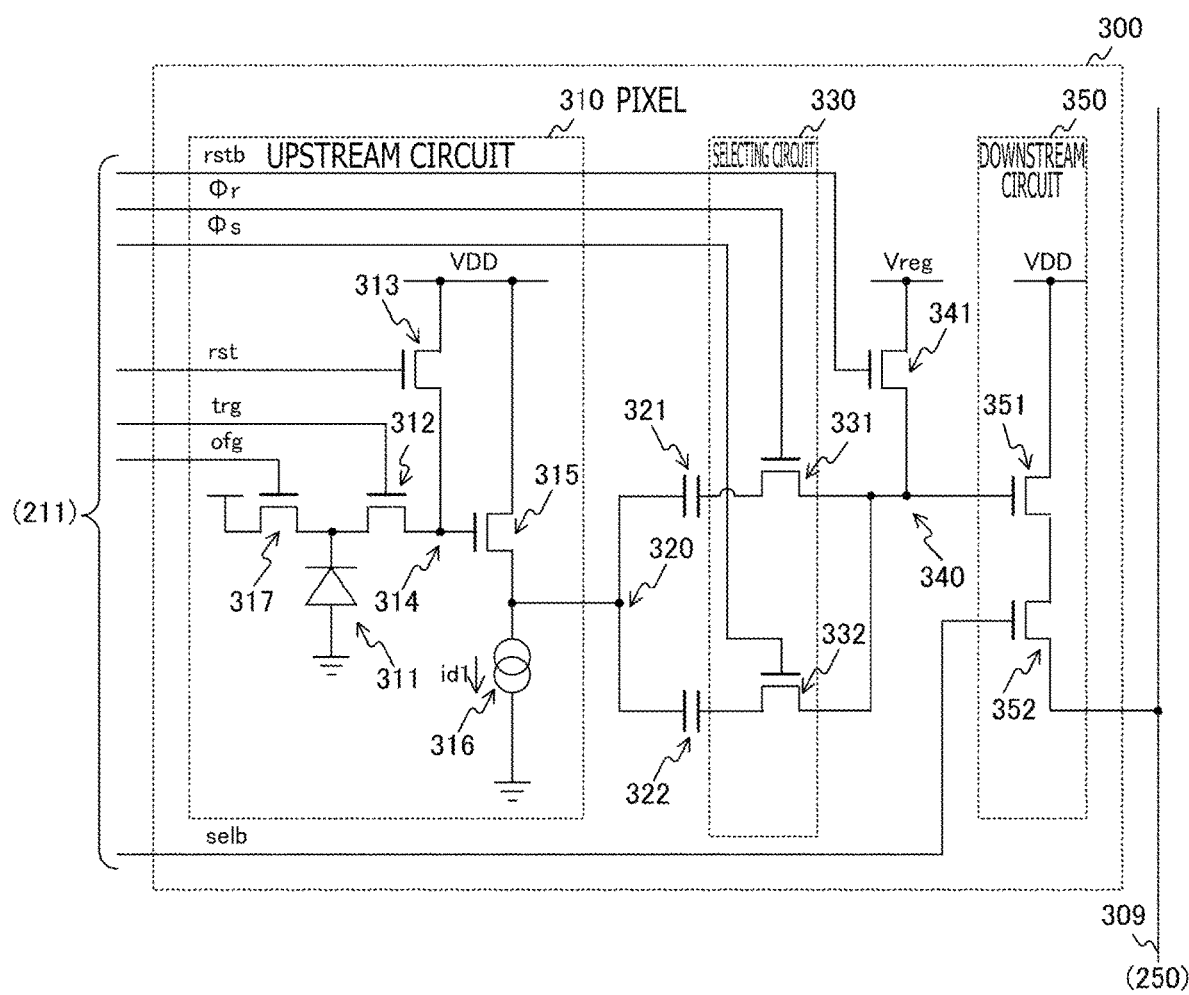
FIG. 18 is a circuit diagram depicting a configuration example of the pixel in a second embodiment of the present technology.

FIG. 18 is a circuit diagram depicting a configuration example of the pixel 300 in the second embodiment of the present technology. The pixels 300 in the second embodiment are different from those in the first embodiment in that each pixel 300 further includes a discharge transistor 317 in the upstream circuit 310.

The discharge transistor 317 is configured to function as an overflow drain that discharges a charge from the photoelectric converting element 311 according to a discharge signal ofg from the vertical scanning circuit 211. For example, an nMOS transistor is used as the discharge transistor 317.

With the configuration not provided with the discharge transistor 317 as in the first embodiment, in all the pixels, blooming may occur when charges are transferred from the photoelectric converting elements 311 to the FDs 314. Then, at the time of FD resetting, the potentials of the FDs 314 and the upstream nodes 320 fall. Following these falls of the potentials, charge and discharge currents of the capacitive elements 321 and 322 keep being generated, and IR drops of a power supply and a ground change from the steady state in which no blooming occurs, undesirably.

On the other hand, at the time of sample-holding of the signal levels of all the pixels, charges in the photoelectric converting elements 311 become empty after signal charge transfer; accordingly blooming no longer occurs, and IR drops of the power supply and the ground become the steady state in which no blooming occurs. Due to the difference between the IR drops at the time of sample-holding of the reset levels and the signal levels, streaking noise is generated.

To cope with this, charges of the photoelectric converting elements 311 are discharged toward the side of the overflow drains in the second embodiment in which the discharge transistors 317 are provided. Because of this, the IR drops at the time of sample-holding of the reset levels and the signal levels become approximately the same, and streaking noise can be suppressed.

Figure 19:
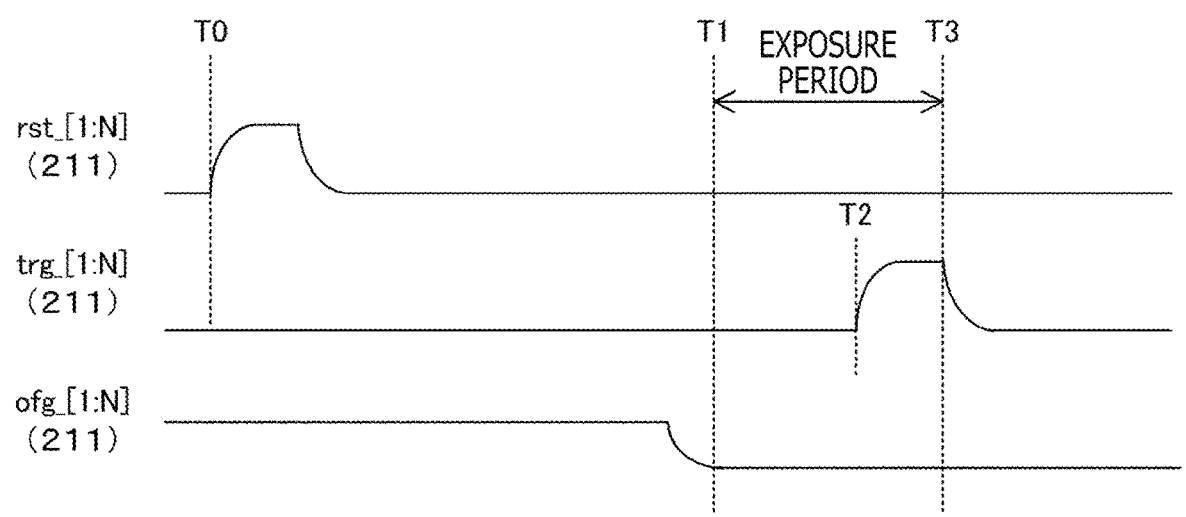
FIG. 19 is a timing chart depicting an example of the global shutter operation in the second embodiment of the present technology.

FIG. 19 is a timing chart depicting an example of the global shutter operation in the second embodiment of the present technology. At timing T0 before the timing at the start of exposure, the vertical scanning circuit 211 supplies the high-level FD reset signal rst to all the pixels over a pulse period while switching the discharge signal ofg for all the pixels to the high level. As a result, PD resetting and FD resetting are performed for all the pixels. In addition, the reset levels are sample-held. Here, ofg_[n] in the figure represents a signal to pixels in the n-th row in the N rows.

Then, at timing T1 at the start of exposure, the vertical scanning circuit 211 switches the discharge signal ofg for all the pixels back to the low level. Then, over the period from timing T2 immediately before the end of exposure to T3 at the end of exposure, the vertical scanning circuit 211 supplies the high-level transfer signal trg to all the pixels. As a result, the signal levels are sample-held.

In the configuration not provided with the discharge transistor 317 as in the first embodiment, both the transfer transistor 312 and the FD reset transistor 313 have to be switched to the ON state at the start of exposure (i.e., at the time of PD resetting). In this control, the FD 314 also has to be reset simultaneously at the time of PD resetting. Because of this, it is necessary to perform FD resetting in an exposure period again and sample-hold the reset level, and exposure periods cannot be made shorter than reset-level sample-hold periods. At the time when the reset levels of all the pixels are sample-held, a certain amount of waiting time is necessary until voltages and currents become stationary, and, for example, a sample-hold period of several microseconds (µs) to several dozen microseconds (µs) is necessary.

In contrast to this, in the second embodiment in which the discharge transistors 317 are provided, PD resetting and FD resetting can be performed separately. Owing to this, as illustrated in the figure, FD resetting can be performed and the reset levels can be sample-held before PD resetting is terminated (the start of exposure). As a result, exposure periods can be made shorter than reset-level sample-hold periods.

Note that the first to third modification examples of the first embodiment can also be applied to the second embodiment.

Since the discharge transistors 317 that discharge charges from the photoelectric converting elements 311 are provided according to the second embodiment of the present technology as described above, FD resetting can be performed and the reset levels can be sample-held before the start of exposure. As a result, exposure periods can be made shorter than reset-level sample-hold periods.

3. Third Embodiment

Whereas the FD 314 is initialized by use of the power supply voltage VDD in the first embodiment described above, there is a risk with this configuration that the photo response non-uniformity (PRNU) worsens due to variations of the capacitive elements 321 and 322 or due to a parasitic capacitance. The solid-state imaging element 200 in the third embodiment is different from that in the first embodiment in that the PRNU is ameliorated by lowering the power supply of the FD reset transistor 313 at the time of readout.

Figure 20:
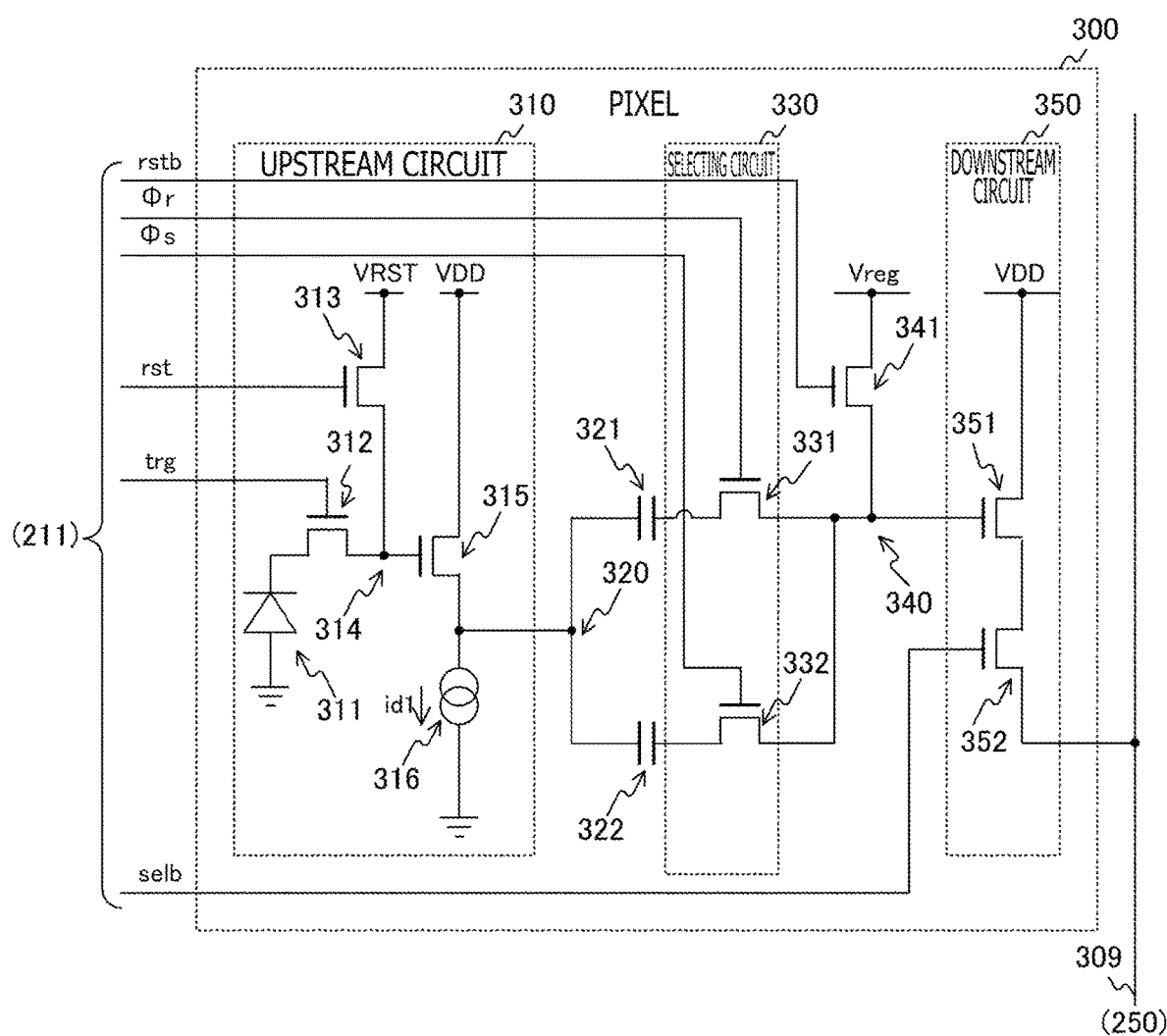
FIG. 20 is a circuit diagram depicting a configuration example of the pixel in a third embodiment of the present technology.

FIG. 20 is a circuit diagram depicting a configuration example of the pixel 300 in the third embodiment of the present technology. The pixels 300 in the third embodiment are different from those in the first embodiment in that the power supply of the FD reset transistor 313 is separated from the power supply voltage VDD of each pixel 300.

A drain of the FD reset transistor 313 in the third embodiment is connected to a reset power supply voltage VRST. For example, the reset power supply voltage VRST is controlled by the timing control circuit 212.

Figure 21:
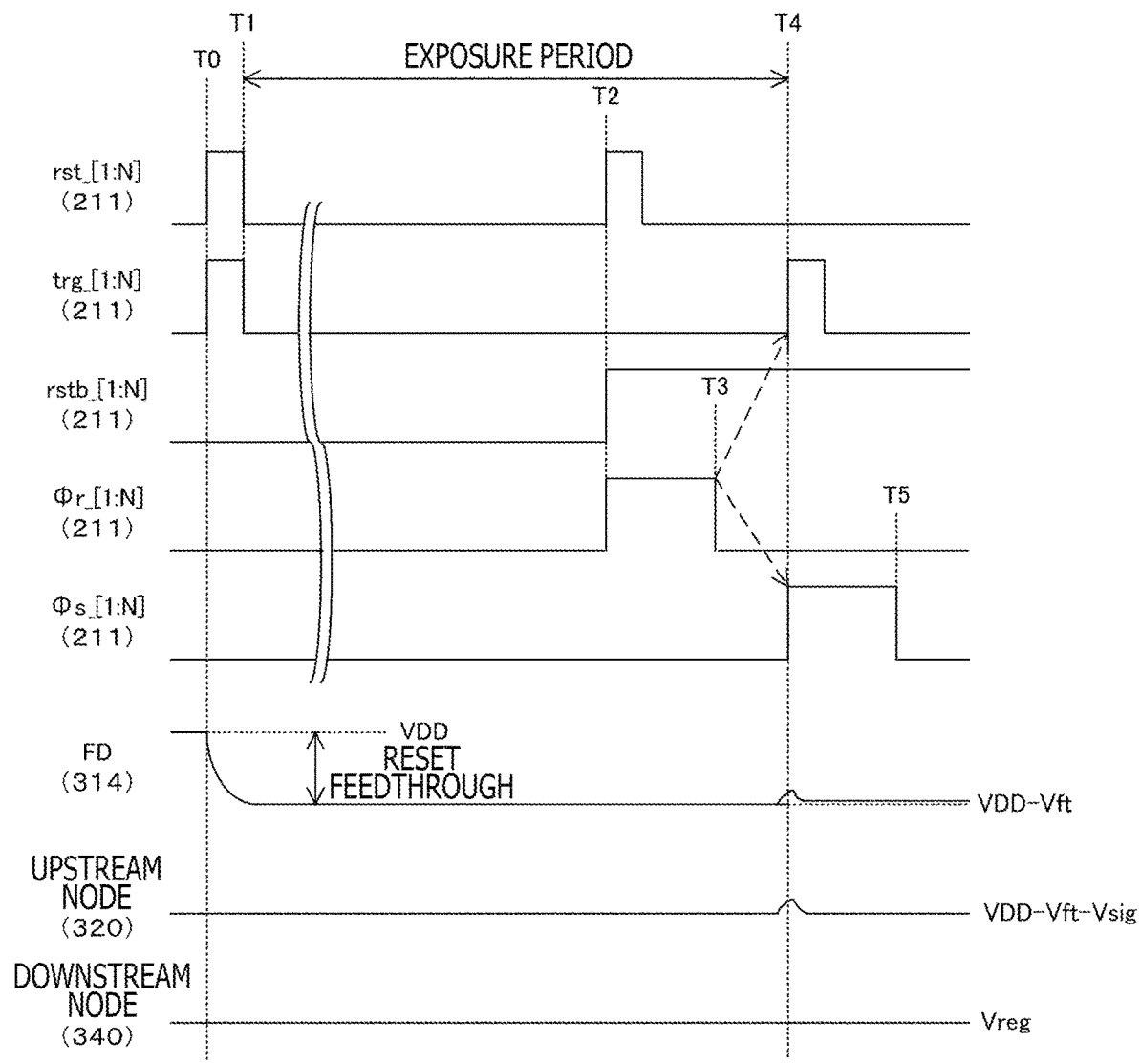
FIG. 21 is a figure for explaining a reset feedthrough in the third embodiment of the present technology.
Figure 22:
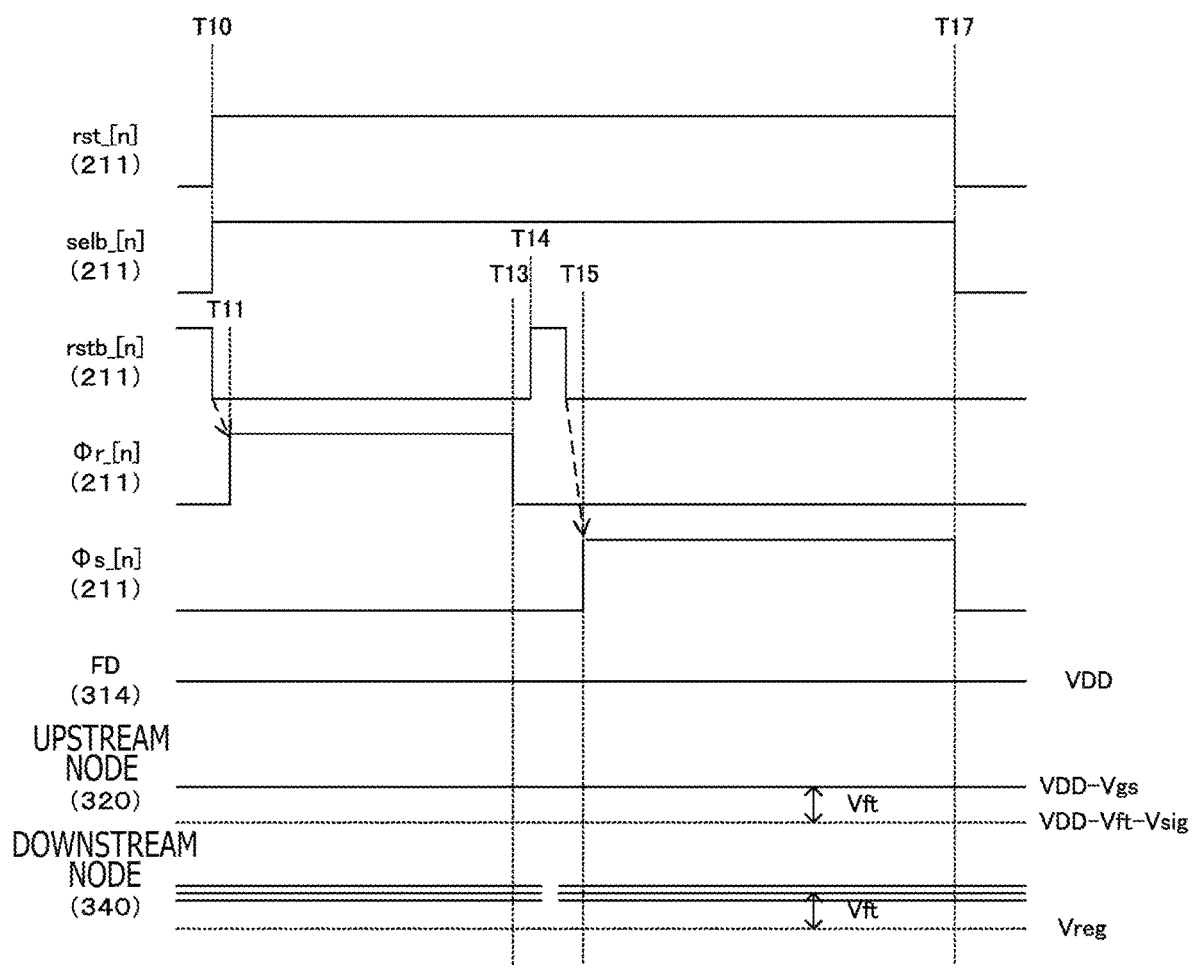
FIG. 22 is a figure for explaining variations of levels caused by the reset feedthrough in the third embodiment of the present technology.

Here, with reference to FIG. 21 and FIG. 22, worsening of the PRNU in the pixel 300 in the first embodiment is considered. In the first embodiment, as illustrated in FIG. 21, at timing T0 immediately before the start of exposure, the potential of the FD 314 falls due to a reset feedthrough of the FD reset transistor 313. It is supposed that this variation amount is Vft.

Since the power supply voltage of the FD reset transistor 313 is VDD in the first embodiment, at timing T0, the potential of the FD 314 varies from VDD to VDD-Vft. In addition, the potential of the upstream node 320 at the time of exposure becomes VDD-Vft-Vsig.

In addition, in the first embodiment, as illustrated in FIG. 22, the FD reset transistor 313 transitions to the ON state at the time of readout, and the FD 314 is fixed to the power supply voltage VDD. Due to the variation amount Vft of the FD 314, the potentials of the upstream node 320 and the downstream node 340 at the time of readout are shifted higher by approximately Vft. Note that, due to variations of the capacitance values of the capacitive elements 321 and 322 or due to a parasitic capacitance, shifted voltage amounts vary pixel by pixel, and this becomes the root cause of the worsening of the PRNU.

The shift amount of the downstream node 340 in a case where the shift amount of the upstream node 320 is Vft is represented by the following formula, for example.

$$\{(Cs + \delta Cs)/(Cs + \delta Cs + Cp)\} * Vft \quad \text{Formula 4}$$

In the formula above, Cs is the capacitance value of the capacitive element 322 on the signal-level side, and δCs is a variation of Cs. Cp is the capacitance value of a parasitic capacitance of the downstream node 340.

Formula 4 can approximate to the following formula.

$$\{1 - (\delta Cs/Cs) * (Cp/Cs)\} * Vft \quad \text{Formula 5}$$

From Formula 5, variations of the downstream node 340 can be represented b the following formula.

$$\{(\delta Cs/Cs) * (Cp/Cs)\} * Vft \quad \text{Formula 6}$$

Supposing that (δCs/Cs) is $10^{-2}$, (Cp/Cs) is $10^{-1}$, and Vft is 400 millivolts (mV), the PRNU is 400 μVrms according to Formula 6, and has a relatively large value.

In particular, when the kTC noise at the time of sample-holding of the input-referred capacitance is to be reduced, the charge voltage conversion efficiency of the FD 314 needs to be increased. The capacitance of the FD 314 has to be reduced to increase the charge voltage conversion efficiency, but the variation amount Vft increases as the capacitance of the FD 314 is reduced, and can be several hundred millivolts (mV). In this case, according to Formula 6, the influence of the PRNU can be too significant to be ignored.

Figure 23:
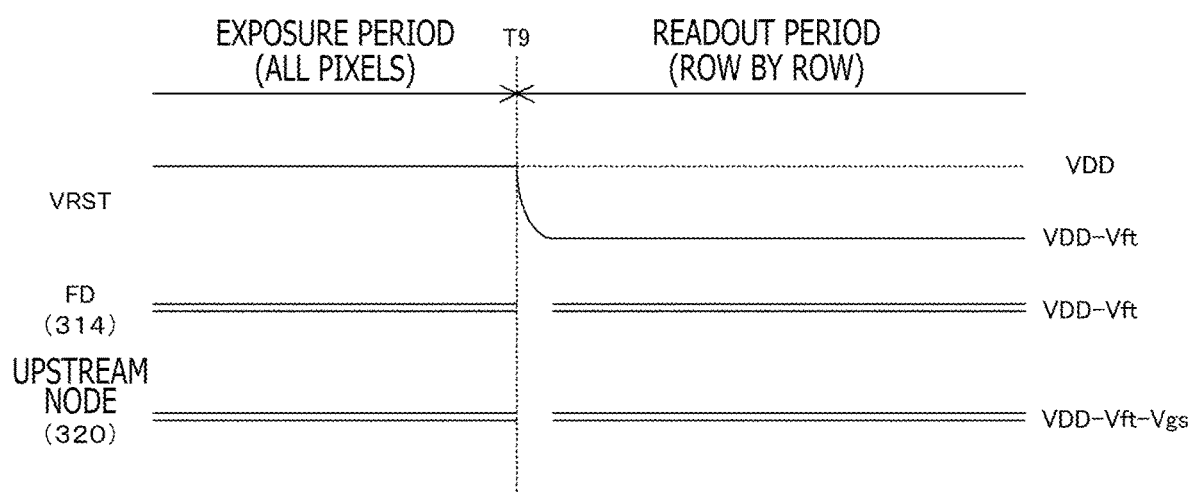
FIG. 23 is a timing chart depicting an example of voltage control in the third embodiment of the present technology.

FIG. 23 is a timing chart depicting an example of voltage control in the third embodiment of the present technology.

In the row-by-row readout period at and after timing T9, the timing control circuit 212 controls the reset power supply voltage VRST such that it has a value different from that in an exposure period.

For example, in the exposure period, the timing control circuit 212 switches the reset power supply voltage VRST to the same value as the power supply voltage VDD. On the other hand, in the readout period, the timing control circuit 212 lowers the reset power supply voltage VRST to VDD-Vft. That is, in the readout period, the timing control circuit 212 lowers the reset power supply voltage VRST by an amount substantially matching the variation amount Vft caused by a reset feedthrough. With this control, it is possible to cause reset levels of the FD 314 at the time of exposure and at the time of readout to match each other.

With the control of the reset power supply voltage VRST, as illustrated in the figure, it is possible to reduce voltage variation amounts of the FD 314 and the upstream node 320. This can suppress worsening of the PRNU caused by variations of the capacitive elements 321 and 322 and a parasitic capacitance.

Note that the first to third modification examples of the first embodiment or the second embodiment can also be applied to the third embodiment.

Since the timing control circuit 212 lowers the reset power supply voltage VRST by the variation amount Vft caused by a reset feedthrough, at the time of readout, according to the third embodiment of the present technology as described above, it is possible to cause reset levels at the time of exposure and at the time of readout to match each other. As a result, worsening of the photo response non-uniformity (PRNU) can be suppressed.

4. Fourth Embodiment

Whereas signal levels are read out subsequently to reset levels for each frame in the first embodiment described above, there is a risk with this configuration that the photo response non-uniformity (PRNU) worsens due to variations of the capacitive elements 321 and 322 or a parasitic capacitance. The solid-state imaging element 200 in the fourth embodiment is different from that in the first embodiment in that the PRNU is ameliorated by switching a level to be held at the capacitive element 321 and a level to be held at the capacitive element 322 with each other for each frame.

The solid-state imaging element 200 in the fourth embodiment consecutively captures images of a plurality of frames in synchronization with vertical synchronizing signals. Frames at odd-numbered positions are referred to as "odd-numbered frames," and frames at even-numbered positions are referred to as "even-numbered frames."

Figure 24:
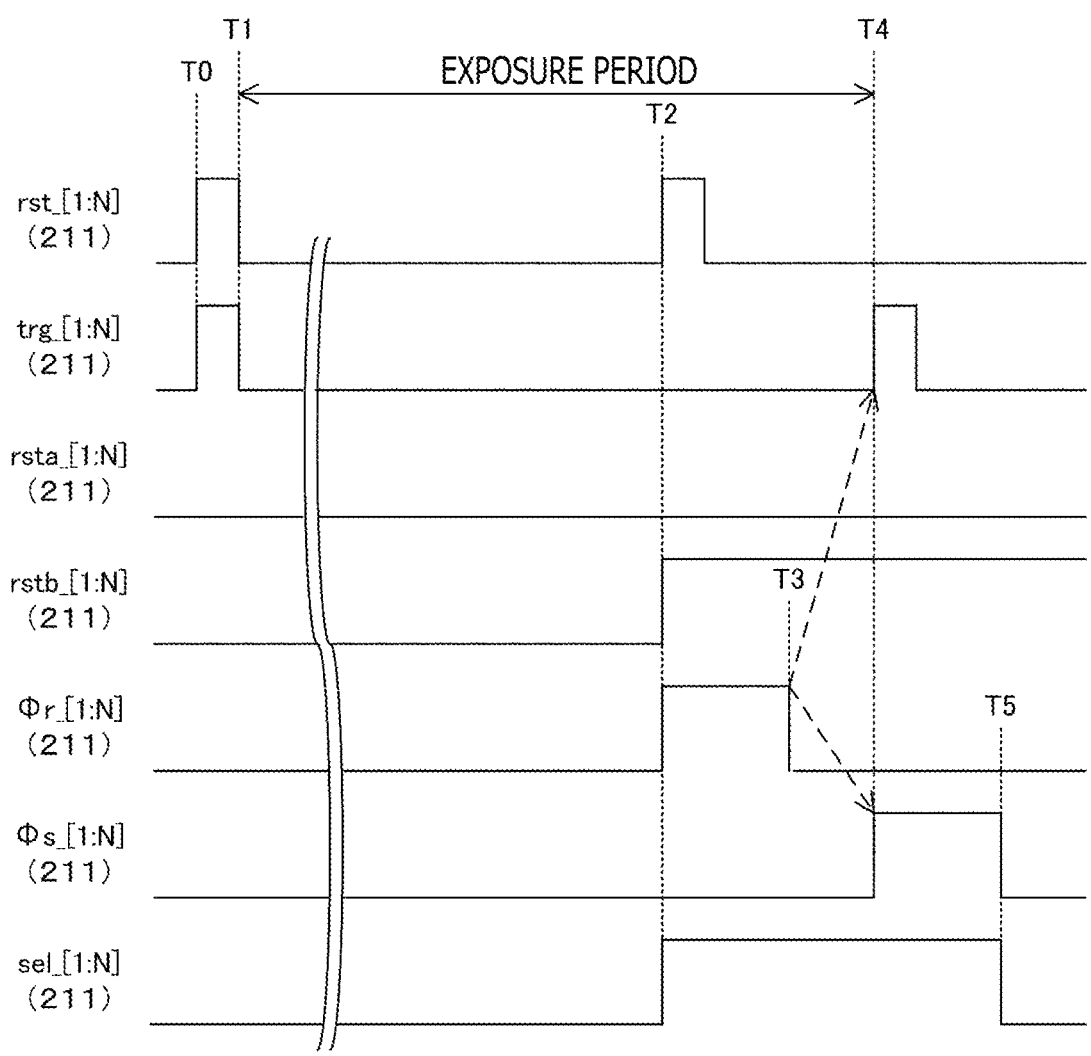
FIG. 24 is a timing chart depicting an example of the global shutter operation on an odd-numbered frame in a fourth embodiment of the present technology.

FIG. 24 is a timing chart depicting an example of the global shutter operation on an odd-numbered frame in the fourth embodiment. In an exposure period of the odd-numbered frame, by switching the selection signal Φs to the high level subsequently to the selection signal Φr, the upstream circuits 310 in the solid-state imaging element 200 cause the capacitive elements 321 to hold reset levels, and next cause the capacitive elements 322 to hold signal levels.

Figure 25:
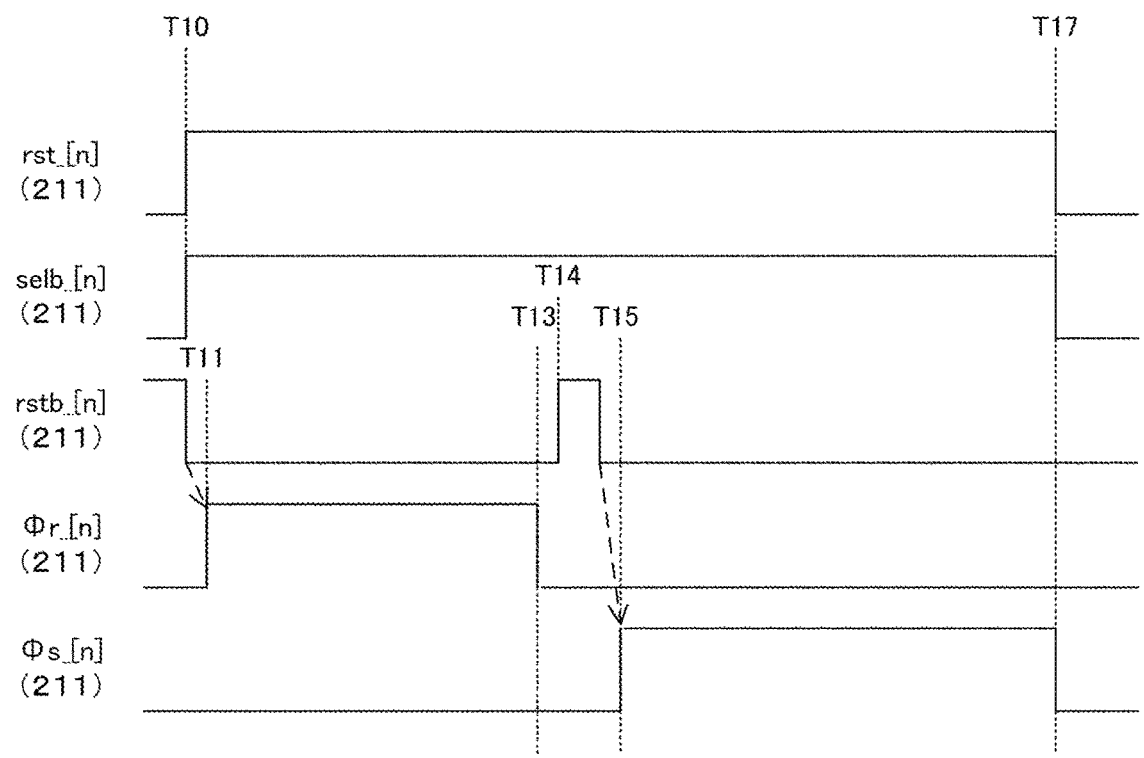
FIG. 25 is a timing chart depicting an example of the readout operation on an odd-numbered frame in the fourth embodiment of the present technology.

FIG. 25 is a timing chart depicting an example of the readout operation on an odd-numbered frame in the fourth embodiment of the present technology. In the readout period of the odd-numbered frame, by switching the selection signal Φs to the high level subsequently to the selection signal Φr, the downstream circuits 350 in the solid-state imaging element 200 read out the signal levels subsequently to the reset levels.

Figure 26:
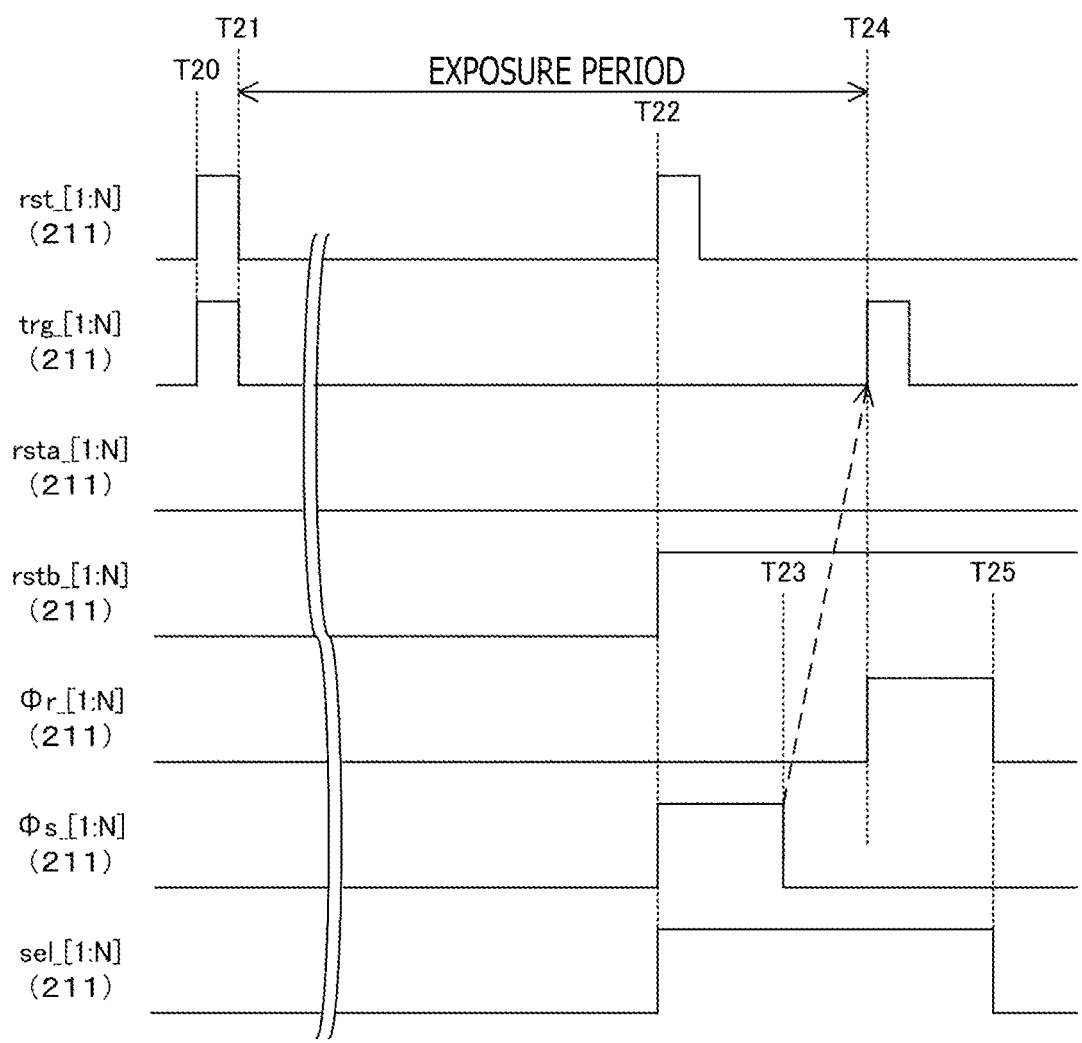
FIG. 26 is a timing chart depicting an example of the global shutter operation on an even-numbered frame in the fourth embodiment of the present technology.

FIG. 26 is a timing chart depicting an example of the global shutter operation on an even-numbered frame in the fourth embodiment. In an exposure period of the even-numbered frame, by switching the selection signal Φr to the high level subsequently to the selection signal Φs, the upstream circuits 310 in the solid-state imaging element 200 cause the capacitive elements 322 to hold reset levels, and next cause the capacitive elements 321 to hold signal levels.

Figure 27:
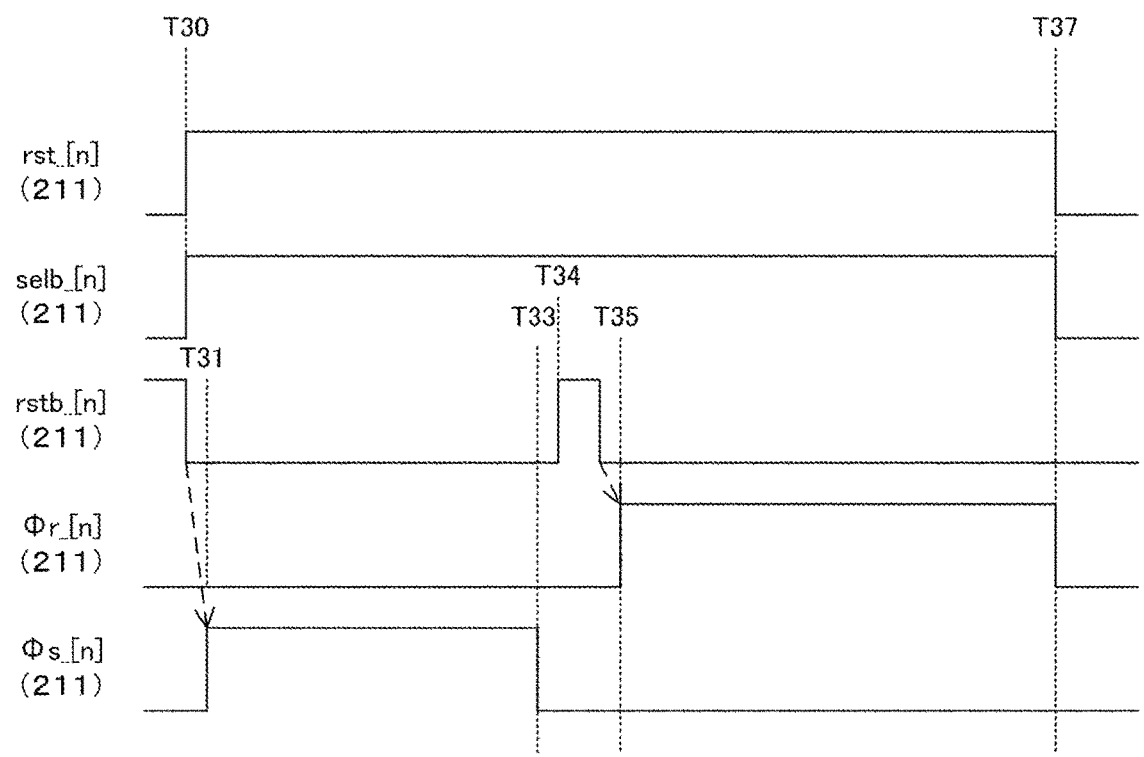
FIG. 27 is a timing chart depicting an example of the readout operation on an even-numbered frame in the fourth embodiment of the present technology.

FIG. 27 is a timing chart depicting an example of the readout operation on an even-numbered frame in the fourth embodiment of the present technology. In the readout period of the even-numbered frame, by switching the selection signal Φr to the high level subsequently to the selection signal Φs, the downstream circuits 350 in the solid-state imaging element 200 read out the signal levels subsequently to the reset levels.

As illustrated in FIG. 24 and FIG. 26, opposite levels are held at the capacitive elements 321 and 322 for the even-numbered frame and for the odd-numbered frame. As a result, polarities of the PRNU also become opposite for the even-numbered frame and for odd-numbered frame. The downstream column signal processing circuit 260 determines the arithmetic mean of the odd-numbered frame and the even-numbered frame. As a result, the PRNU with the opposite polarities can cancel out each other.

This control is control effective for imaging of videos or addition of frames. In addition, this does not require addition of elements to the pixels 300, and can be realized only by a change of the drive scheme.

Note that the first to third modification examples of the first embodiment or the second or third embodiment can also be applied to the fourth embodiment.

Since levels to be held at the capacitive elements 321 and levels to be held at the capacitive elements 322 are made opposite for an odd-numbered frame and for an even-numbered frame in the fourth embodiment of the present technology as described above, polarities of the PRNU can be made opposite for the odd-numbered frame and for the even-numbered frame. By the column signal processing circuit 260 adding these odd-numbered frame and even-numbered frame, worsening of the PRNU can be suppressed.

5. Fifth Embodiment

In the first embodiment described above, the column signal processing circuit 260 determines the differences between reset levels and signal levels for each column. However, there is a risk with this configuration that, when light with very high illuminance enters the pixels, charges overflow from the photoelectric converting elements 311, which undesirably causes the sunspot phenomenon in which the luminance lowers and blackening occurs. The solid-state imaging element 200 in the fifth embodiment is different from that in the first embodiment in that it is determined for each pixel whether or not the sunspot phenomenon has occurred.

Figure 28:
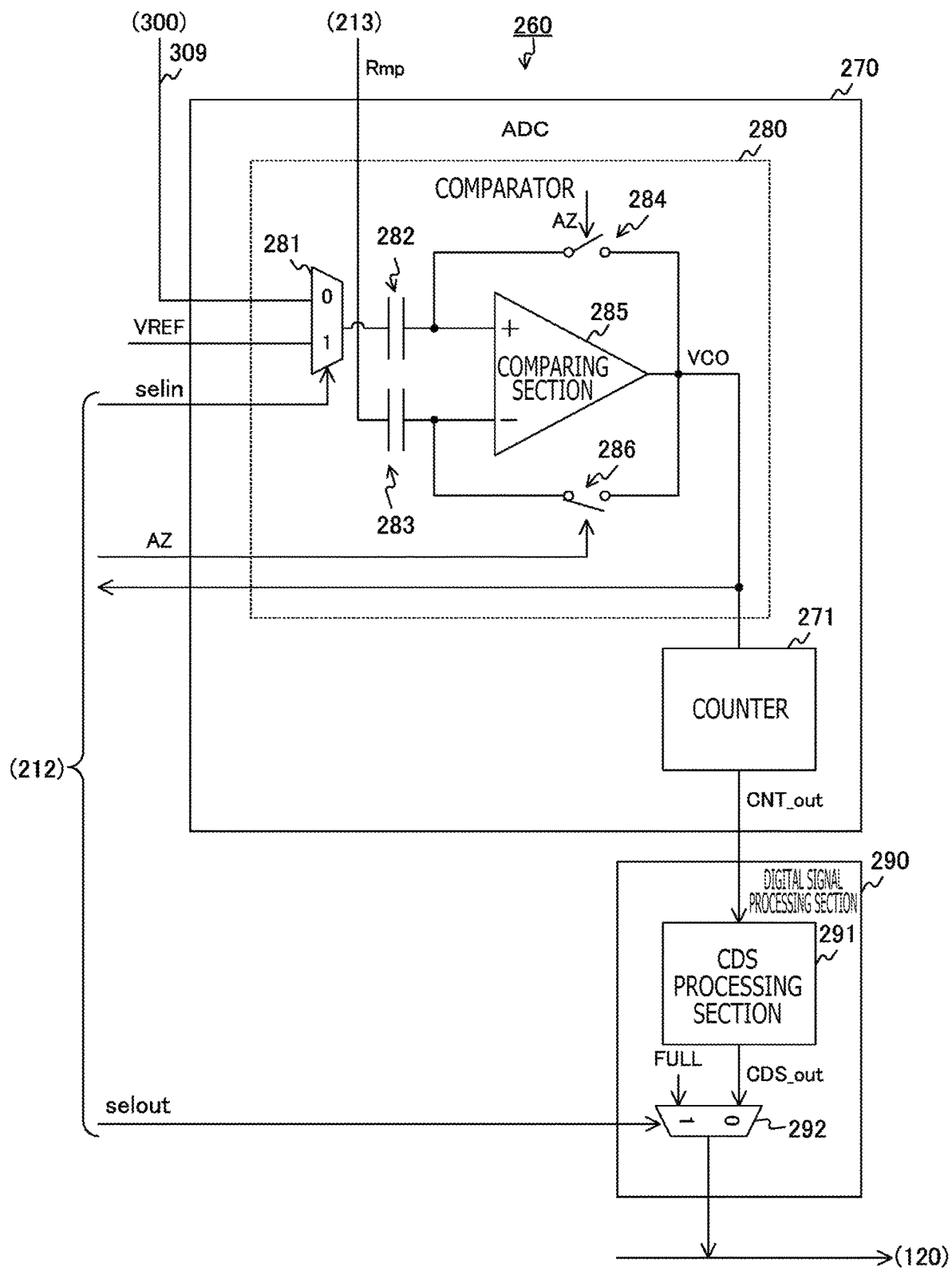
FIG. 28 is a circuit diagram depicting a configuration example of the column signal processing circuit in a fifth embodiment of the present technology.

FIG. 28 is a circuit diagram depicting a configuration example of the column signal processing circuit 260 in the fifth embodiment of the present technology. A plurality of ADCs 270 and a digital signal processing section 290 are arranged in the column signal processing circuit 260 in the fifth embodiment. In addition, a plurality of CDS processing sections 291 and a plurality of selectors 292 are arranged in the digital signal processing section 290. An ADC 270, a CDS processing section 291, and a selector 292 are provided for each column.

In addition, each ADC 270 includes a comparator 280 and a counter 271. The comparator 280 is configured to compare the level of the vertical signal line 309 and the ramp signal Rmp from the DAC 213 and output a comparison result VCO. The comparison result VCO is supplied to the counter 271 and the timing control circuit 212. The comparator 280 includes a selector 281, capacitive elements 282 and 283, auto zero switches 284 and 286, and a comparing section 285.

The selector 281 is configured to connect, with a non-inversion input terminal (+) of the comparing section 285, any of the vertical signal line 309 of the corresponding column and a node with a predetermined reference voltage VREF via the capacitive element 282 according to an input side selection signal selin. The input side selection signal selin is supplied from the timing control circuit 212. Note that the selector 281 is an example of an input side selector described in claims.

The comparing section 285 is configured to compare the respective levels of the non-inversion input terminal (+) and an inversion input terminal (−) and output the comparison result VCO to the counter 271. The inversion input terminal (−) receives input of the ramp signal Rmp via a capacitive element 283.

The auto zero switch 284 is configured to short-circuit the non-inversion input terminal (+) and the output terminal of the comparison result VCO according to an auto zero signal Az from the timing control circuit 212. The auto zero switch 286 is configured to short-circuit the inversion input terminal (−) and the output terminal of the comparison result VCO according to the auto zero signal Az.

The counter 271 is configured to perform counting with a count until the comparison result VCO is inverted and output, to the CDS processing section 291, a digital signal CNT_out representing the count.

The CDS processing section 291 is configured to perform CDS processing on the digital signal CNT_out. The CDS processing section 291 calculates the difference between the digital signal CNT_out corresponding to the reset level and the digital signal CNT_out corresponding to the signal level, and outputs the difference as CDS_out to the selector 292.

The selector 292 is configured to output, as pixel data of the corresponding column, any of the digital signal CDS_out that has been subjected to the CDS processing and a full-code digital signal FULL according to an output side selection signal selout from the timing control circuit 212. Note that the selector 292 is an example of an output side selector described in claims.

Figure 29:
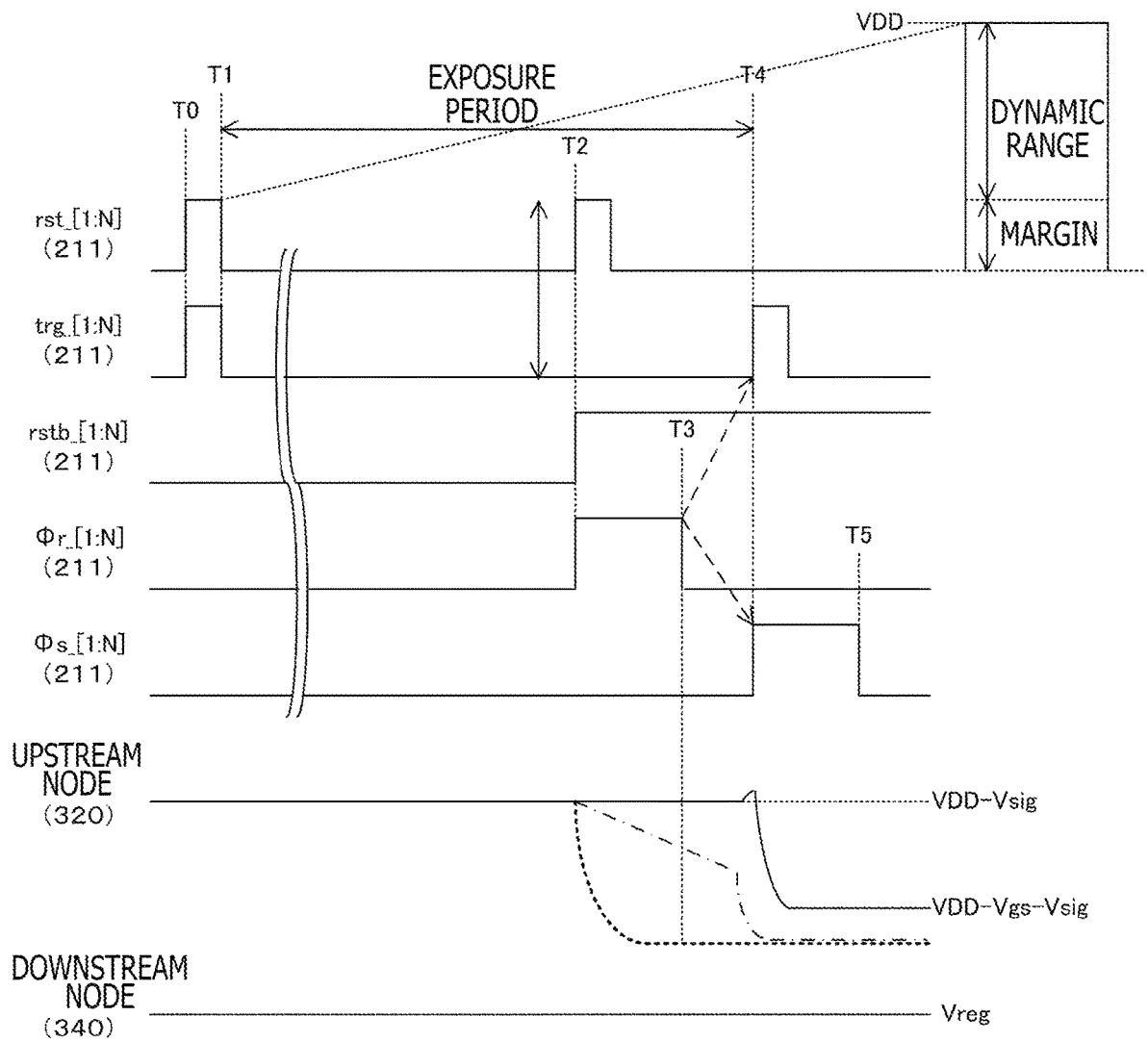
FIG. 29 is a timing chart depicting an example of the global shutter operation in the fifth embodiment of the present technology.

FIG. 29 is a timing chart depicting an example of the global shutter operation in the fifth embodiment of the present technology. The transistor control method at the time of global shutter in the fifth embodiment is similar to that in the first embodiment.

Here, it is supposed that light with very high illuminance has entered the pixel 300. In this case, the charge of the photoelectric converting element 311 becomes full, the charge overflows from the photoelectric converting element 311 to the FD 314, and the potential of the FD 314 that has been subjected to FD resetting lowers. A dash-dotted line in the figure represents a potential variation of the FD 314 at the time when sunlight which is weak to the extent that the amount of an overflowing electric charge becomes relatively small has entered. A dotted line in the figure represents a potential variation of the FD 314 at the time when sunlight which is intense to the extent that the amount of an overflowing electric charge becomes relatively large has entered.

At the time when the weak sunlight has entered, the reset level lowers at timing T3 when FD resetting is completed, but the level has not fully lowered at the moment.

In contrast, at the time when the intense sunlight has entered, the reset level fully lowers undesirably at the time point of timing T3. In this case, since the signal level becomes the same as the reset level and their electric potential difference is "zero," a digital signal that has been subjected to CDS processing becomes one with blackening as in a case of a dark environment undesirably. A phenomenon in which light with very high illuminance such as sunlight has entered but, despite this, the pixel blackens in such a manner is called the sunspot phenomenon or blooming.

In addition, if the level of the FD 314 of a pixel in which the sunspot phenomenon has occurred lowers excessively, it becomes impossible to ensure the operating point of the upstream circuit 310, and the current id1 of the current source transistor 316 varies. Since the current source transistor 316 of each pixel shares a connection to a power supply or a ground, when a current in a pixel has varied, a variation of the IR drop of the pixel influences the sample levels of other pixels undesirably. The pixel in which the sunspot phenomenon has occurred becomes an aggressor, and the pixels whose sample levels have varied due to the pixel become victims. As a result, streaking noise is generated.

Note that, in a case where the discharge transistors 317 are provided as in the second embodiment, an overflow charge is discharged to the side of the discharge transistor 317 in a pixel having a sunspot (blooming), and accordingly, the sunspot phenomenon is unlikely to occur. Note that, even if the discharge transistors 317 are provided, there is a possibility that charges partially flow to the FDs 314, and there is a possibility that it cannot be an eradicative measure against the sunspot phenomenon. Further, there are also disadvantages that, due to the addition of the discharge transistors 317, the ratio of effective area size/electric charge amount of each pixel lowers undesirably. Because of this, it is desirable that the sunspot phenomenon be suppressed without using the discharge transistors 317.

There are two possible methods of suppressing the sunspot phenomenon without using discharge transistors 317. The first method is to adjust the clip levels of the FDs 314. The second method is to determine whether or not the sunspot phenomenon has occurred at the time of readout, and output is replaced with a full code at the time when the sunspot phenomenon has occurred.

As for the first method, the high level of the FD reset signal rst in the figure (i.e., a gate of the FD reset transistor 313) is the power supply voltage VDD, and the low level corresponds to the clip level of the FD 314. In the first embodiment, the difference between the high level and the low level (i.e., the amplitude) is set to a value corresponding to the dynamic range. In contrast to this, in the fifth embodiment, the difference is adjusted to a value obtained by further adding a margin to the value. Here, the value corresponding to the dynamic range corresponds to the difference between the power supply voltage VDD and the potential of the FD 314 at the time when the digital signal becomes a full code.

By lowering the gate voltage of the FD reset transistor 313 at the time of the OFF state (the low level of the FD reset signal rst), it is possible to prevent a situation where there is not an operating point of the upstream amplification transistor 315 due to lowering of the FD 314 by blooming.

Note that the dynamic range changes depending on the analog gain of an ADC. When the analog gain is low, a large dynamic range is necessary; on the contrary, when the analog gain is high, a small dynamic range is sufficient. Because of this, the gate voltage of the FD reset transistor 313 at the time of the OFF state can also be changed depending on the analog gain.

Figure 30:
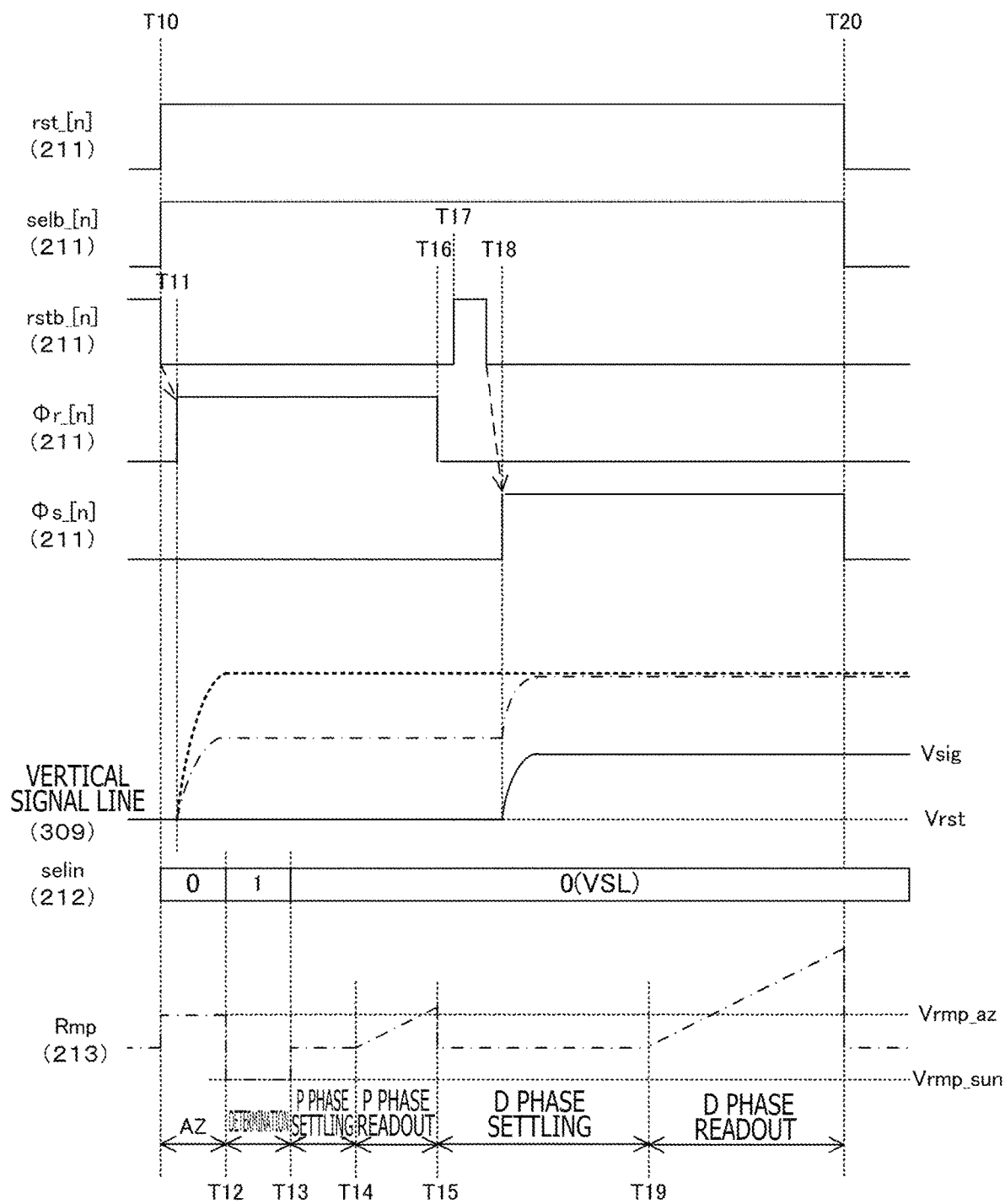
FIG. 30 is a timing chart depicting an example of the readout operation in the fifth embodiment of the present technology.

FIG. 30 is a timing chart depicting an example of the readout operation in the fifth embodiment of the present technology. When the selection signal Φr is switched to the high level at timing T11 immediately after timing T10 at the start of readout, the potential of the vertical signal line 309 of a pixel where sunlight has entered varies. A dash-dotted line in the figure represents a potential variation of the vertical signal line 309 at the time when weak sunlight has entered. A dotted line in the figure represents a potential variation of the vertical signal line 309 at the time when intense sunlight has entered.

In an auto zero period from timing T10 to timing T12, for example, the timing control circuit 212 supplies the input side selection signal selin of "zero," and makes the comparing section 285 connected to the vertical signal line 309. In this auto zero period, the timing control circuit 212 performs auto zero by using the auto zero signal Az.

As for the second method, in a determination period from timing T12 to timing T13, for example, the timing control circuit 212 supplies the input side selection signal selin of "1." Due to this input side selection signal selin, the comparing section 285 is disconnected from the vertical signal line 309, and is connected with a node with the reference voltage VREF. This reference voltage VREF is set to an expected value of the level of the vertical signal line 309 when blooming has not occurred. For example, supposing that the gate-source voltage of the downstream amplification transistor 351 is Vgs2, Vrst corresponds to Vreg-Vgs2. In addition, in the determination period, the DAC 213 lowers the level of the ramp signal Rmp from Vrmp_az to Vrmp_sun.

In addition, in a case where blooming has not occurred in the determination period, Vrst of the reset level of the vertical signal line 309 is almost the same as the reference voltage VREF, and differs little from that at the time when the potential of the inversion input terminal (+) of the comparing section 285 is auto zero. Meanwhile, since the level of the non-inversion input terminal (−) has lowered from Vrmp_az to Vrmp_sun, the comparison result VCO switches to the high level.

On the other hand, in a case where blooming has occurred, the reset level Vrst becomes sufficiently higher than the reference voltage VREF, and the comparison result VCO switches to the low level when the following formula is satisfied.

$$Vrst - VREF > Vrmp\_az - Vrmp\_sun \qquad \text{Formula 7}$$

That is, the timing control circuit 212 can determine whether or not blooming has occurred, according to whether or not the comparison result VCO switches to the low level in the determination period.

Note that, in order to prevent the occurrence of an erroneous determination due to variations of the threshold voltage of the downstream amplification transistor 351, the IR drop difference of Vreg in a surface, or the like, it is necessary to ensure that there is a margin which is large to some extent for determination of Sun (the right-hand side of Formula 7).

At and after timing T13 after a lapse of the determination period, the timing control circuit 212 makes the comparing section 285 connected to the vertical signal line 309. In addition, after a lapse of the P phase settling period from timing T13 to timing T14, the P phase is read out in the period of timing T14 to timing T15. After a lapse of the D phase settling period from timing T15 to timing T19, the D phase is read out in the period from the timing T19 to timing T20.

In a case where it is determined that blooming has not occurred in the determination period, the timing control circuit 212 controls the selector 292 by using the output side selection signal selout, to output the digital signal CDS_out that has been subjected to CDS processing, as it is.

On the other hand, in a case where it is determined that blooming has occurred in the determination period, the timing control circuit 212 controls the selector 292 by using the output side selection signal selout, to cause a full code FULL to be output instead of the digital signal CDS_out that has been subjected to CDS processing. As a result, the sunspot phenomenon can be suppressed.

Note that the first to third modification examples of the first embodiment or the second to fourth embodiments can also be applied to the fifth embodiment.

Since, according to the fifth embodiment of the present technology, as described above, the timing control circuit 212 determines, on the basis of the comparison result VCO, whether or not the sunspot phenomenon has occurred and causes a full code to be output when the sunspot phenomenon has occurred, the sunspot phenomenon can be suppressed.

6. Sixth Embodiment

The vertical scanning circuit 211 performs control of causing all the rows (all the pixels) to be exposed simultaneously (i.e., the global shutter operation) in the first embodiment described above. However, in a case where the simultaneity of exposure is unnecessary and noise needs to be reduced, such as at the time of a test and at the time when analysis is performed, it is desirable to perform a rolling shutter operation. The solid-state imaging element 200 in the sixth embodiment is different from that in the first embodiment in that a rolling shutter operation is performed at the time of a test or the like.

Figure 31:
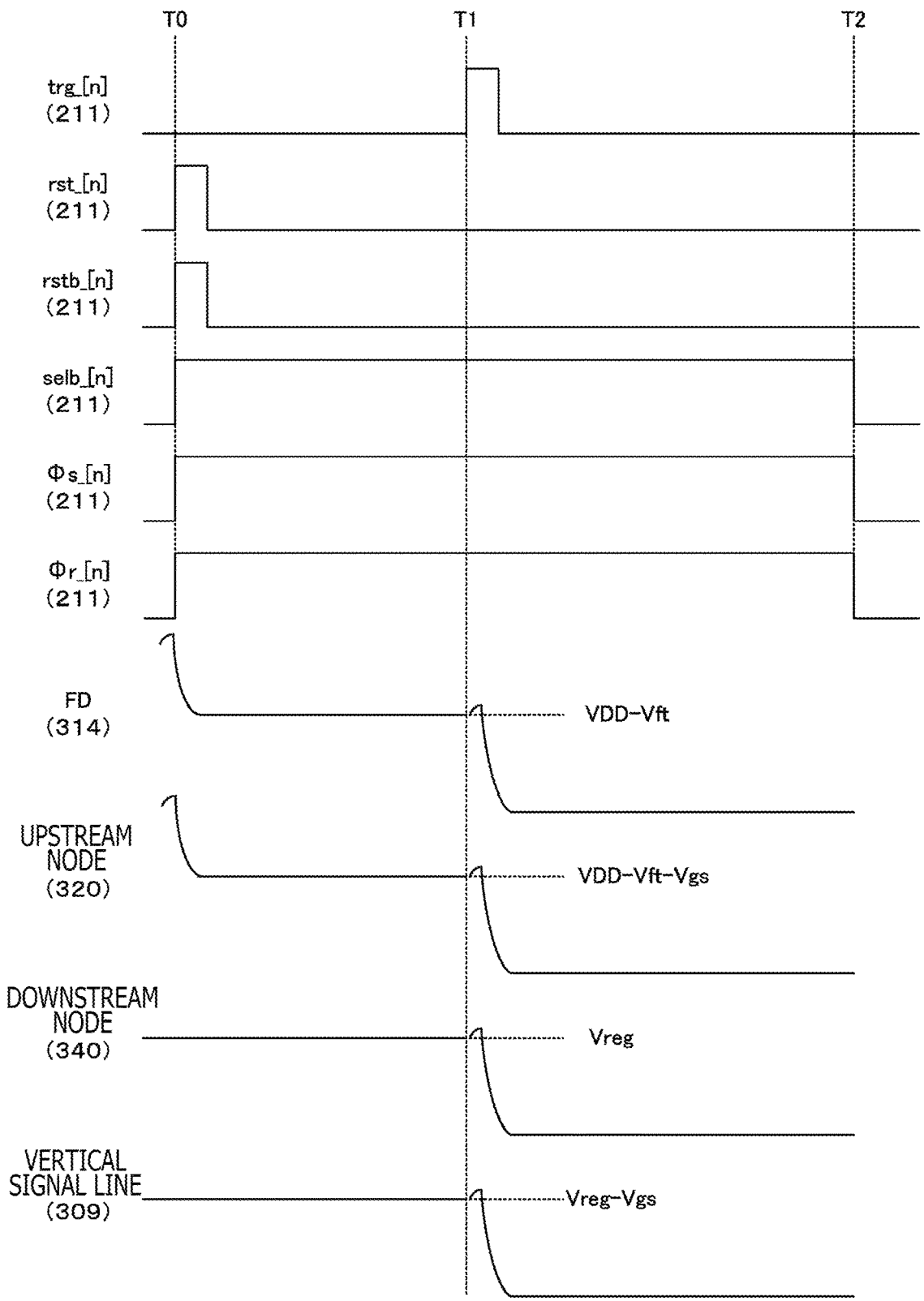
FIG. 31 is a timing chart depicting an example of a rolling shutter operation in a sixth embodiment of the present technology.

FIG. 31 is a timing chart depicting an example of the rolling shutter operation in the sixth embodiment of the present technology. The vertical scanning circuit 211 performs control of sequentially selecting a plurality of rows and causing exposure to be started. The figure depicts exposure control of the n-th row.

In the period from timing T0 to timing T2, the vertical scanning circuit 211 supplies the high-level downstream selection signal selb, selection signal Φr, and selection signal Φs to the n-th row. In addition, at timing T0 at the start of exposure, the vertical scanning circuit 211 supplies the high-level FD reset signal rst and downstream reset signal rstb to the n-th row over a pulse period. At timing T1 at the end of exposure, the vertical scanning circuit 211 supplies the transfer signal trg to the n-th row. With the rolling shutter operation in the figure, the solid-state imaging element 200 can generate image data with less noise.

Note that the solid-state imaging element 200 in the sixth embodiment performs the global shutter operation as in the first embodiment at the time of normal imaging.

In addition, the first to third modification examples of the first embodiment or the second to fifth embodiments can also be applied to the sixth embodiment.

Since the vertical scanning circuit 211 performs control of sequentially selecting a plurality of rows and causing exposure to be started for the selected rows (i.e., the rolling shutter operation) according to the sixth embodiment of the present technology as described above, image data with less noise can be generated.

7. Seventh Embodiment

In the first embodiment described above, the sources of the upstream source followers (the upstream amplification transistor 315 and the current source transistor 316) are connected to the power supply voltage VDD, and readout is performed row by row in a state where the source followers are in the ON state. However, there is a risk with this drive method that circuit noise of the upstream source followers at the time of row-by-row readout is propagated downstream and random noise increases. The solid-state imaging element 200 in the seventh embodiment is different from that in the first embodiment in that noise is reduced by switching the upstream source followers to the OFF state at the time of readout.

Figure 32:
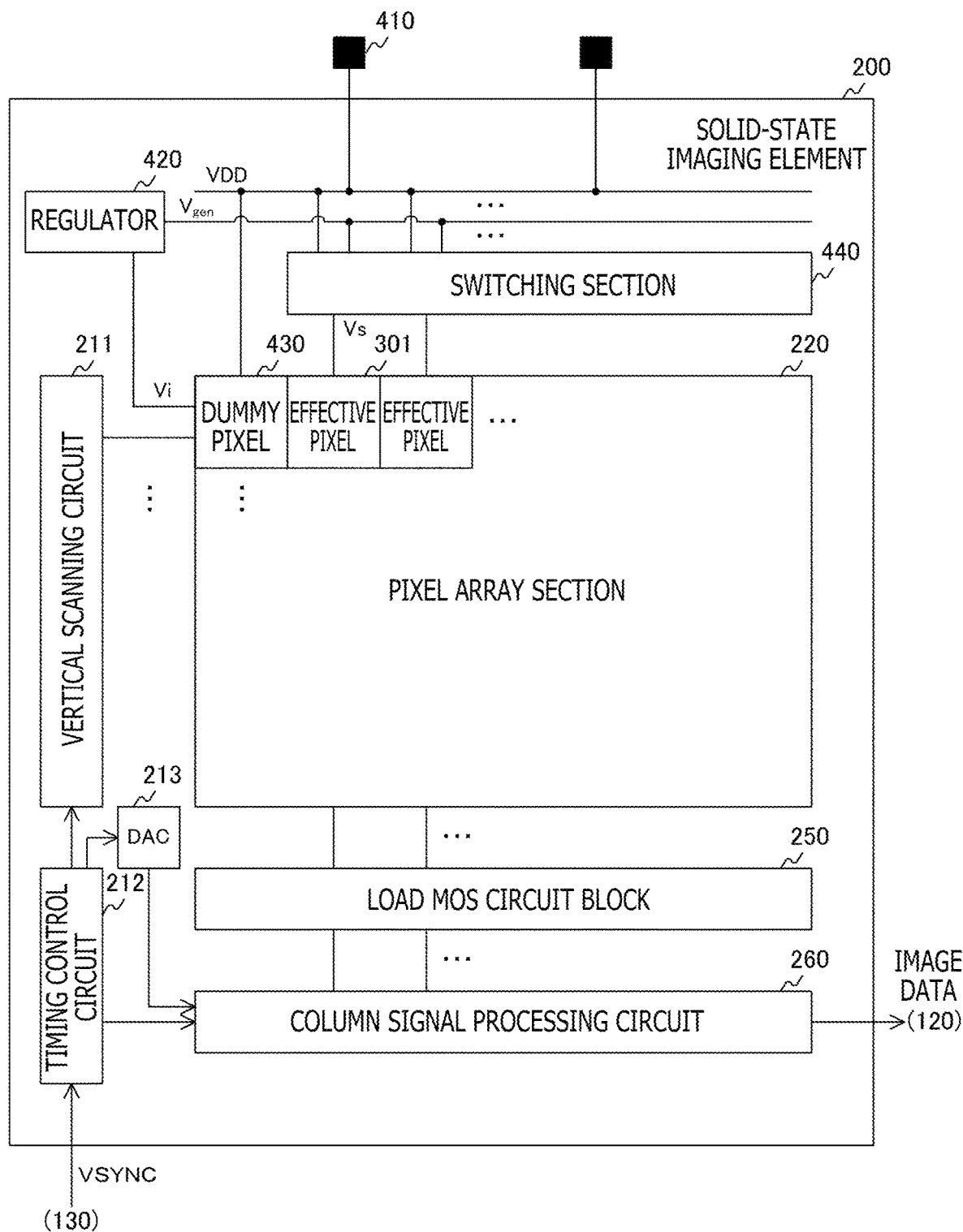
FIG. 32 is a block diagram depicting a configuration example of the solid-state imaging element in a seventh embodiment of the present technology.

FIG. 32 is a block diagram depicting a configuration example of the solid-state imaging element 200 in the seventh embodiment of the present technology. The solid-state imaging element 200 in the seventh embodiment is different from that in the first embodiment in that the solid-state imaging element 200 in the seventh embodiment further includes a regulator 420 and a switching section 440. In addition, a plurality of effective pixels 301 and a predetermined number of dummy pixels 430 are arrayed in the pixel array section 220 in the seventh embodiment. The dummy pixels 430 are arrayed around the region where the effective pixels 301 are arrayed.

In addition, the power supply voltage VDD is supplied to each of the dummy pixels 430, and the power supply voltage VDD and a source voltage Vs are supplied to each of the effective pixels 301. Signal lines for supplying the power supply voltages VDD to the effective pixels 301 are omitted in the figure. In addition, the power supply voltage VDD is supplied from a pad 410 outside the solid-state imaging element 200.

The regulator 420 is configured to generate a predetermined generation voltage $V_{gen}$ on the basis of an input potential Vi from the dummy pixel 430 and supply the predetermined generation voltage $V_{gen}$ to the switching section 440. The switching section 440 is configured to select either the power supply voltage VDD from the pad 410 or the generation voltage $V_{gen}$ from the regulator 420 and supply the selected one to each of the columns of the effective pixels 301 as the source voltage Vs.

FIG. 33 is a circuit diagram depicting a configuration example of the dummy pixel 430, the regulator 420, and the switching section 440 in the seventh embodiment of the present technology. "a" in the figure is a circuit diagram of the dummy pixel 430 and the regulator 420, and "b" in the figure is a circuit diagram of the switching section 440.

As illustrated in "a" in the figure, the dummy pixel 430 includes a reset transistor 431, an FD 432, an amplification transistor 433, and a current source transistor 434. The reset transistor 431 is configured to initialize the FD 432 according to a reset signal RST from the vertical scanning circuit 211. The FD 432 is configured to accumulate a charge and generate a voltage according to the electric charge amount. The amplification transistor 433 is configured to amplify the level of the voltage of the FD 432 and supply the voltage to the regulator 420 as an input voltage Vi.

In addition, sources of the reset transistor 431 and the amplification transistor 433 are connected to the power supply voltage VDD. The current source transistor 434 is connected to the drain of the amplification transistor 433. Under the control of the vertical scanning circuit 211, the current source transistor 434 supplies the current id1.

The regulator 420 includes a low pass filter 421, a buffer amplifier 422, and a capacitive element 423. The low pass filter 421 is configured to allow components in a low frequency band lower than a predetermined frequency in a signal with the input voltage Vi to pass as an output voltage Vj.

A non-inversion input terminal (+) of the buffer amplifier 422 receives input of the output voltage Vj. An inversion input terminal (−) of the buffer amplifier 422 is connected with an output terminal of the buffer amplifier 422. The capacitive element 423 is configured to hold, as $V_{gen}$, the voltage of the output terminal of the buffer amplifier 422. This $V_{gen}$ is supplied to the switching section 440.

As illustrated in "b" in the figure, the switching section 440 includes an inverter 441 and a plurality of switching circuits 442. Each of the switching circuits 442 is arranged for a column of the effective pixels 301.

The inverter 441 is configured to invert a switching signal SW from the timing control circuit 212. This inverter 441 supplies the inverted signal to each of the switching circuits 442.

Each switching circuit 442 is configured to select either the power supply voltage VDD or the generation voltage $V_{gen}$ and supply, as the source voltage Vs, the selected one to the corresponding column in the pixel array section 220. The switching circuit 442 includes switches 443 and 444. The switch 443 is configured to open and close a path between a node with the power supply voltage VDD and the corresponding column according to the switching signal SW. The switch 444 is configured to open and close a path between a node with the generation voltage $V_{gen}$ and the corresponding column according to the inverted signal of the switching signal SW.

Figure 34:
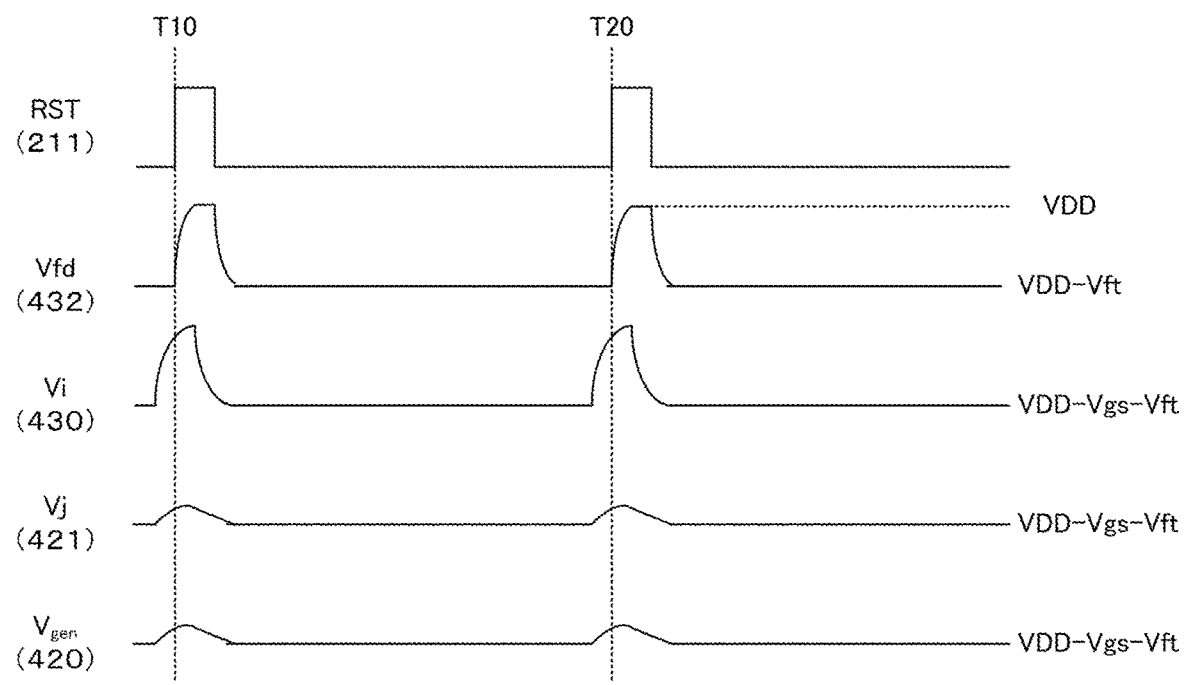
FIG. 34 is a timing chart depicting an example of operations of a dummy pixel and the regulator in the seventh embodiment of the present technology.

FIG. 34 is a timing chart depicting an example of operations of the dummy pixel 430 and the regulator 420 in the seventh embodiment of the present technology. At timing T10 immediately before readout of a row, the vertical scanning circuit 211 supplies the reset signal RST which is at the high level (here, with the power supply voltage VDD) to each of the dummy pixels 430. A potential Vfd of the FD 432 in the dummy pixel 430 is initialized to the power supply voltage VDD. Then, when the reset signal RST has been switched to the low level, the potential Vfd varies to VDD-Vft due to a reset feedthrough.

In addition, the input voltage Vi lowers to VDD-Vgs-Vsig after the resetting. Due to passage through the low pass filter 421, Vj and $V_{gen}$ become substantially constant voltages.

At and after timing T20 immediately before readout of the next row, similar control is performed row by row, and the predetermined generation voltage $V_{gen}$ is supplied.

Figure 35:
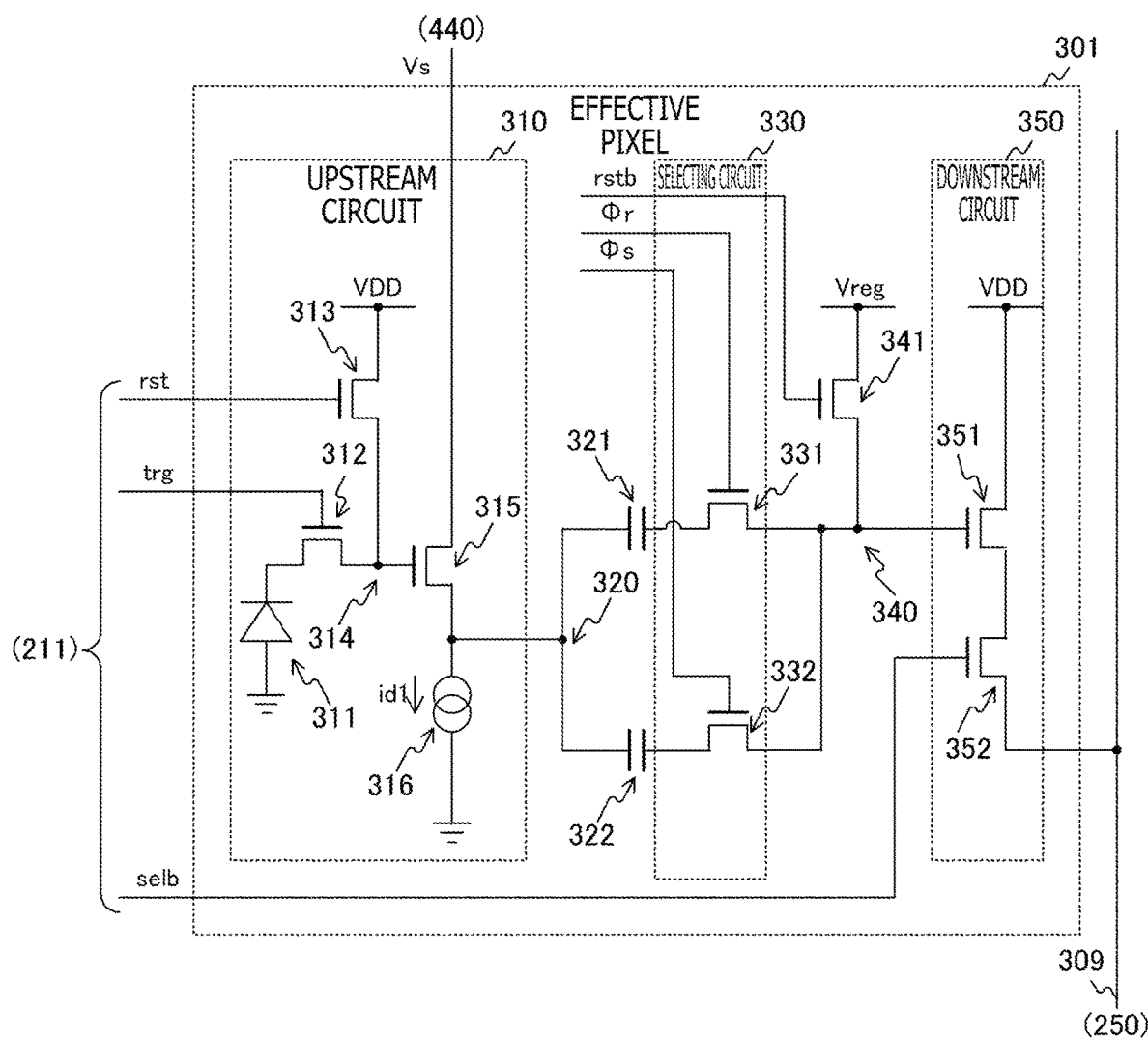
FIG. 35 is a circuit diagram depicting a configuration example of an effective pixel in the seventh embodiment of the present technology.

FIG. 35 is a circuit diagram depicting a configuration example of the effective pixel 301 in the seventh embodiment of the present technology. The circuit configurations of the effective pixels 301 are similar to those of the pixels 300 in the first embodiment except that the source voltage Vs from the switching section 440 is supplied to the source of the upstream amplification transistor 315.

Figure 36:
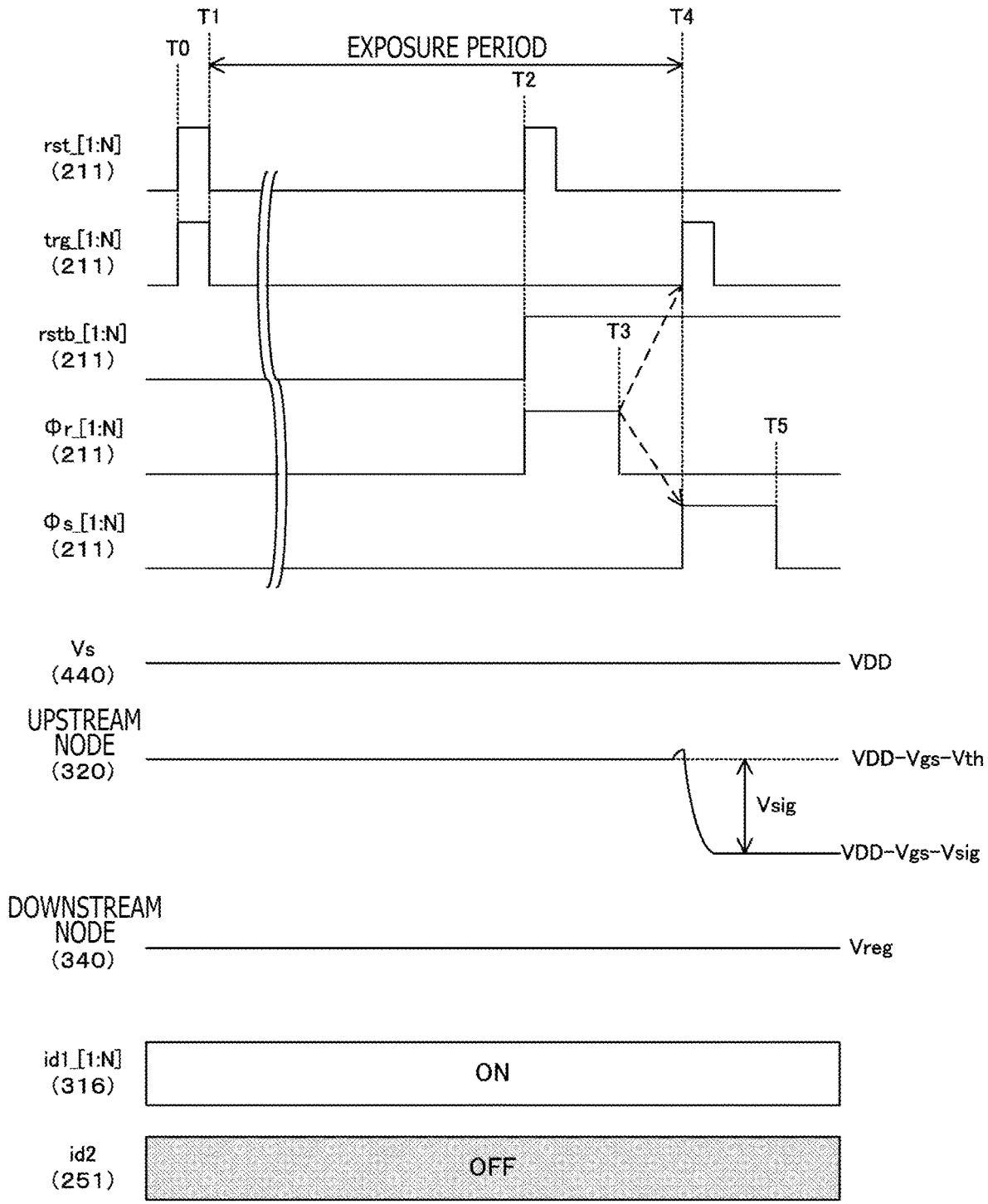
FIG. 36 is a timing chart depicting an example of the global shutter operation in the seventh embodiment of the present technology.

FIG. 36 is a timing chart depicting an example of the global shutter operation in the seventh embodiment of the present technology. In the seventh embodiment, when all the pixels are exposed simultaneously, the switching section 440 selects the power supply voltage VDD, and supplies the power supply voltage VDD as the source voltage Vs. In addition, the voltage of the upstream node lowers from VDD-Vgs-Vth to VDD-Vgs-Vsig at timing T4. Here, Vth is a threshold voltage of the transfer transistor 312.

Figure 37:
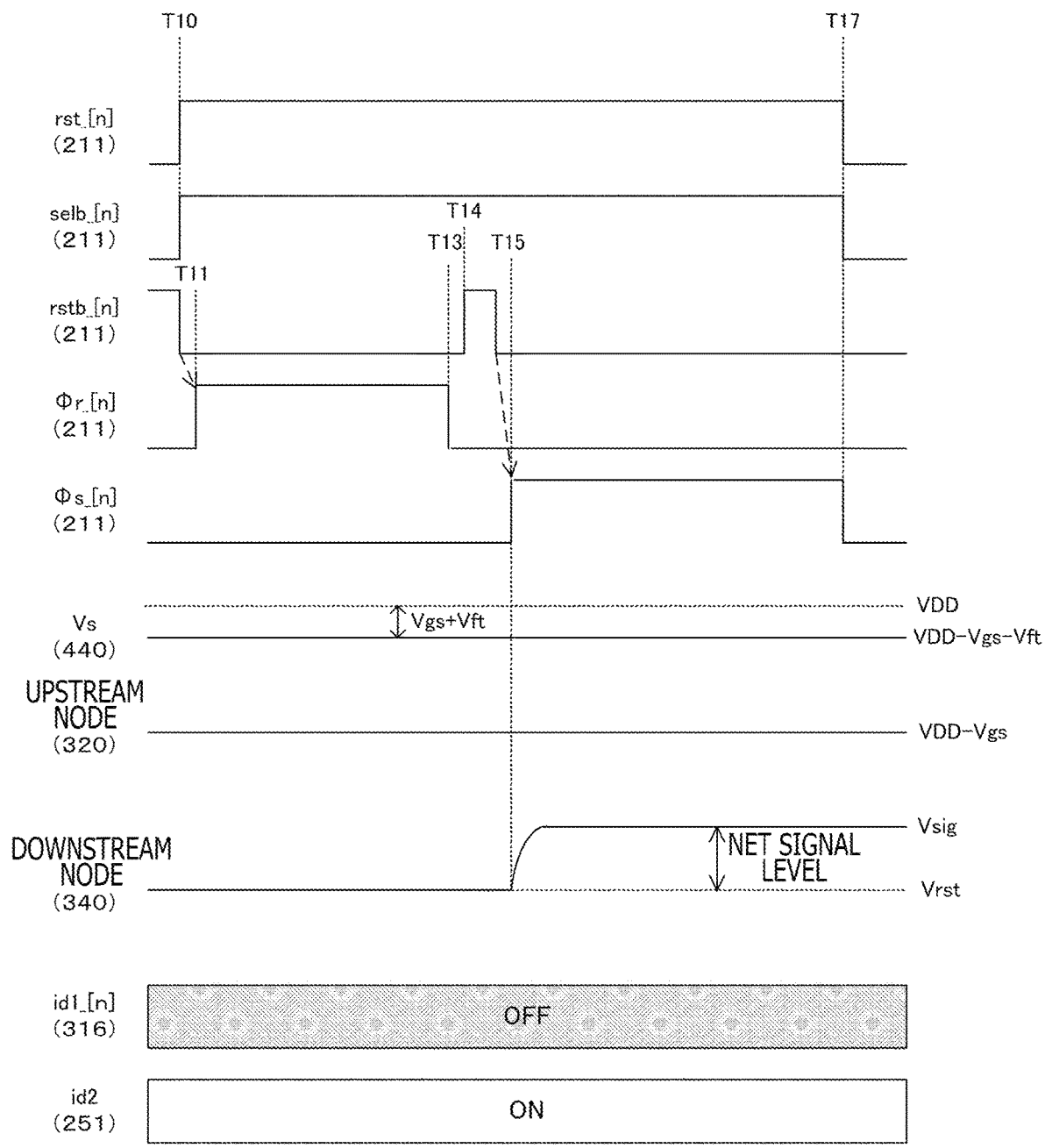
FIG. 37 is a timing chart depicting an example of the readout operation in the seventh embodiment of the present technology.

FIG. 37 is a timing chart depicting an example of the readout operation in the seventh embodiment of the present technology. In the seventh embodiment, at the time of readout, the switching section 440 selects the generation voltage $V_{gen}$, and supplies the generation voltage $V_{gen}$ as the source voltage Vs. This generation voltage $V_{gen}$ is adjusted to VDD-Vgs-Vft. In addition, in the seventh embodiment, the vertical scanning circuit 211 controls the current source transistors 316 of all the rows (all the pixels) to stop the supply of the current id1.

FIG. 38 is a figure for explaining effects in the seventh embodiment of the present technology. In the first embodiment, in row-by-row readout, the source followers (the upstream amplification transistors 315 and the current source transistors 316) of readout-subject pixels 300 are switched to the ON state. However, there is a risk with this drive method that circuit noise of the upstream source followers is propagated downstream (the capacitive elements, downstream source followers, or ADCs) and readout noise increases.

For example, in the first embodiment, kTC noise that is generated in pixels at the time of the global shutter operation is 450 (μVrms) as illustrated in the figure. In addition, noise that is generated in the upstream source followers (the upstream amplification transistors 315 and the current source transistors 316) at the time of row-by-row readout is 380 (μVrms). Noise that is generated at and after the downstream source followers is 160 (μVrms). Thus, the total noise is 610 (μVrms). In such a manner, in the first embodiment, the amount of contribution of the noise of the upstream source followers to the total value of noise is relatively large.

In order to reduce the noise of the upstream source followers, in the seventh embodiment, the voltage (Vs) that can be adjusted is supplied to the sources of the upstream source followers as described before. At the time of the global shutter (exposure) operation, the switching section 440 selects the power supply voltage VDD, and supplies the power supply voltage VDD as the source voltage Vs. Then, after the end of exposure, the switching section 440 switches the source voltage Vs to VDD-Vgs-Vft. In addition, the timing control circuit 212 switches the upstream current source transistors 316 to the ON state at the time of the global shutter (exposure) operation, and switches the upstream current source transistors 316 to the OFF state after the end of exposure.

With the control described above, as illustrated in FIG. 36 and FIG. 37, the potentials of the upstream nodes at the time of the global shutter operation and at the time of row-by-row readout match, and the PRNU can be ameliorated. In addition, since the upstream source followers are switched to the OFF state at the time of row-by-row readout, circuit noise of the source followers is not generated, and the circuit noise is 0 (μVrms), as illustrated in FIG. 38. Note that the upstream amplification transistors 315 among the upstream source followers are in the ON state.

Since the upstream source followers are switched to the OFF state at the time of readout according to the seventh embodiment of the present technology as described above, noise that is generated in the source followers can be reduced.

8. Eighth Embodiment

Whereas charges are converted to voltages at predetermined conversion efficiency in the first embodiment described above, it is difficult with this configuration to expand the dynamic range while suppressing lowering of the frame rate. The solid-state imaging element in the eighth embodiment is different from that in the first embodiment in that the conversion efficiency is switched at two levels pixel by pixel.

Figure 39:
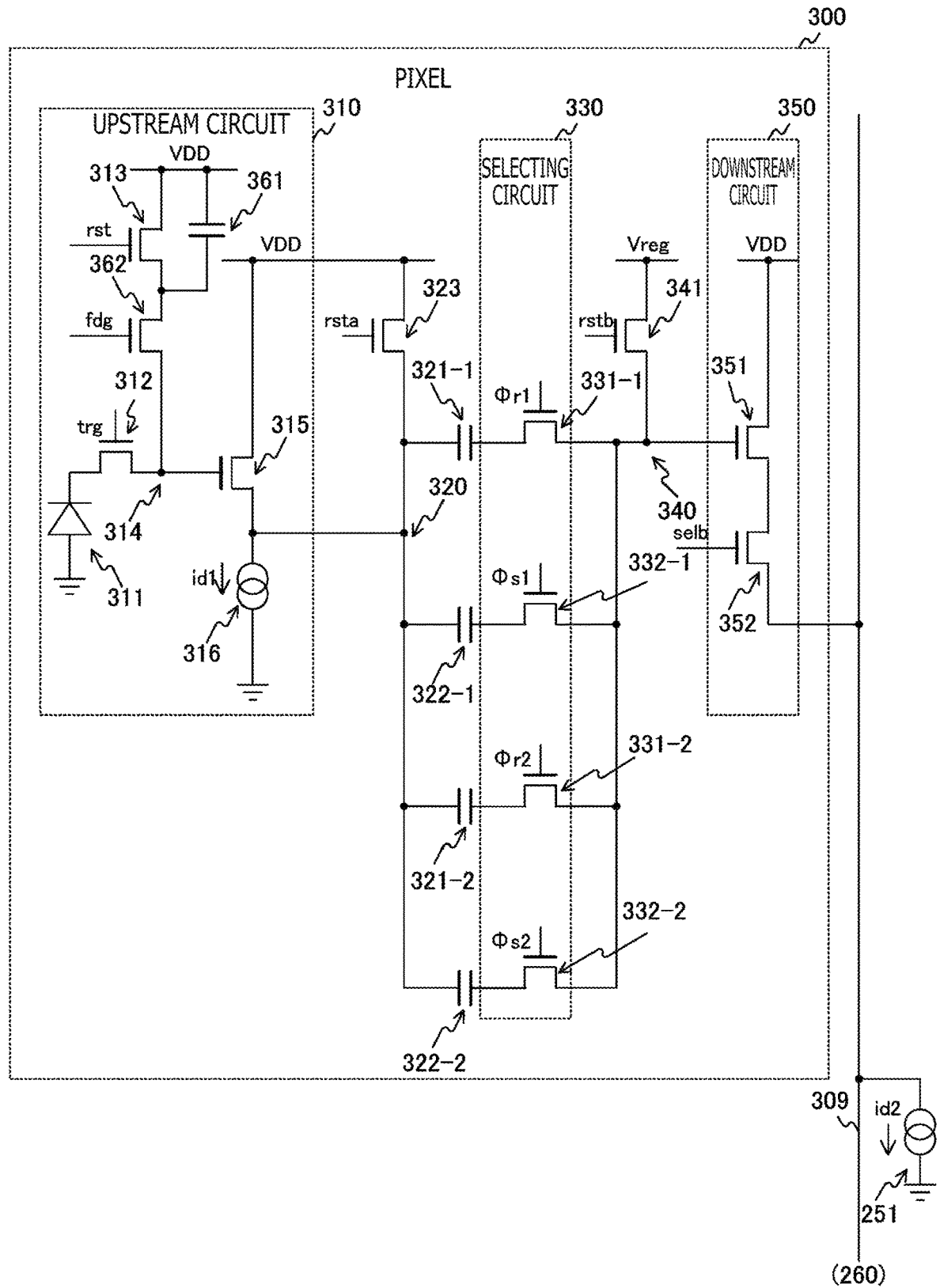
FIG. 39 is a circuit diagram depicting a configuration example of the pixel in an eighth embodiment of the present technology.

FIG. 39 is a circuit diagram depicting a configuration example of the pixel 300 in the eighth embodiment of the present technology. The pixels 300 in the eighth embodiment are different from those in the first embodiment in that each pixel 300 further includes an additional capacitance 361, a conversion efficiency control transistor 362, and the upstream reset transistor 323 and that the respective numbers of the capacitive elements and the selection transistors are doubled. Specifically, instead of the capacitive elements 321 and 322, capacitive elements 321-1 and 322-1 are arranged, and capacitive elements 321-2 and 322-2 are added. In addition, instead of the selection transistors 331 and 332, selection transistors 331-1 and 332-1 are arranged, and selection transistors 331-2 and 332-2 are added.

The conversion efficiency control transistor 362 is inserted between the FD reset transistor 313 and the FD 314. One end of the additional capacitance 361 is connected to the power supply voltage VDD, and the other end of the additional capacitance 361 is connected to a connection node between the FD reset transistor 313 and the conversion efficiency control transistor 362. In addition, according to a control signal fdg from the vertical scanning circuit 211, the conversion efficiency control transistor 362 opens and closes a path between the FD 314 and the additional capacitance 361.

By opening and closing the path between the FD 314 and the additional capacitance 361, the conversion efficiency control transistor 362 can control the conversion efficiency at the time when a charge is converted to a voltage. In a case where the conversion efficiency control transistor 362 is in the OFF state (i.e., in the opened state), a charge is converted to a voltage by the FD 314. On the other hand, in a case where the conversion efficiency control transistor 362 is in the ON state (i.e., in the closed state), the additional capacitance 361 is connected, and a charge is converted to a voltage by the additional capacitance 361 and the FD 314. Hence, the conversion efficiency in the case where the conversion efficiency control transistor 362 is in the OFF state is higher than that in the case where the conversion efficiency control transistor 362 is in the ON state. Hereinbelow, the higher conversion efficiency is referred to as an "HCG (High Conversion Gain)," and the lower conversion efficiency is referred to as an "LCG (Low Conversion Gain)."

In addition, the upstream reset transistor 323 in the eighth embodiment is configured to fix the level of the upstream node 320 at the power supply voltage VDD at the time of readout according to the upstream reset signal rsta.

One end of each of the capacitive elements 321-1, 322-1, 321-2, and 322-2 shares a connection to the upstream node 320. The selection transistor 331-1 is configured to open and close a path between the capacitive element 321-1 and the downstream node 340 according to a selection signal Φr1. The selection transistor 332-1 is configured to open and close a path between the capacitive element 322-1 and the downstream node 340 according to a selection signal Φs1. In addition, the selection transistor 331-2 is configured to open and close a path between the capacitive element 321-2 and the downstream node 340 according to a selection signal Φr2. The selection transistor 332-2 is configured to open and close a path between the capacitive element 322-2 and the downstream node 340 according to a selection signal Φs2.

For example, over an exposure period, the conversion efficiency control transistor 362 is in the OFF state (opened), and the conversion efficiency is controlled to be the HCG. The upstream amplification transistor 315 sequentially outputs, to the upstream node 320, a reset level and a signal level generated at the HCG. The selecting circuit 330 sequentially connects the capacitive elements 321-1 and 322-1 to the downstream node 340, and the reset level and the signal level are held at those capacitive elements.

Then, immediately before the end of the exposure period, the conversion efficiency control transistor 362 is switched to the ON (closed) state, and the conversion efficiency is controlled to be the LCG. The upstream amplification transistor 315 sequentially outputs, to the upstream node 320, a signal level and a reset level generated at the LCG. The selecting circuit 330 sequentially connects the capacitive elements 322-2 and 321-2 to the downstream node 340, and the signal level and the reset level are held at those capacitive elements.

Note that the capacitive elements 321-1, 322-1, 321-2, and 322-2 are examples of first, second, third, and fourth capacitive elements described in claims.

Since the selecting circuit 330 connects any of the four capacitive elements to the downstream node 340 as illustrated in the figure, one downstream reset transistor 341, one downstream circuit 350, and one vertical signal line 309 are sufficient for each column. Owing to this, miniaturization of pixels becomes easy as compared with the solid-state imaging element described in PTL 1 that requires four downstream circuits and four vertical signal lines for each column.

Note that a stacked structure can also be used as illustrated in FIG. 15 or FIG. 17. In this case, the additional capacitance 361 may be arranged on any of the upper pixel chip 201 and the lower pixel chip 202.

Figure 40:
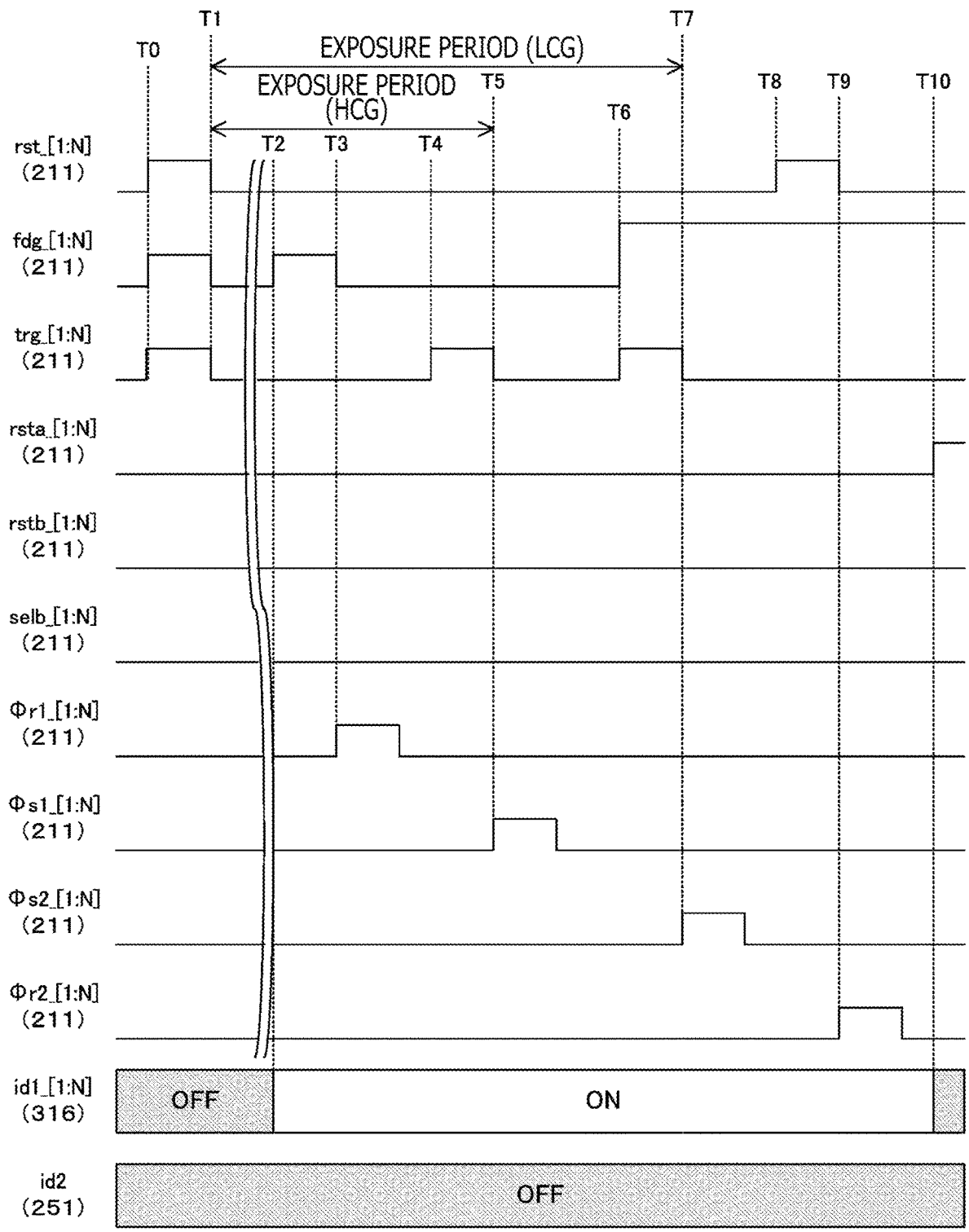
FIG. 40 is a timing chart depicting an example of the global shutter operation in the eighth embodiment of the present technology.

FIG. 40 is a timing chart depicting an example of the global shutter operation in the eighth embodiment of the present technology. From timing T0 immediately before the start of exposure to timing T1 after a lapse of a pulse period, the vertical scanning circuit 211 supplies the high-level FD reset signal rst, control signal fdg, and transfer signal trg to all the rows. As a result, exposure is started simultaneously in all the rows.

The vertical scanning circuit 211 supplies the high-level control signal fdg to all the rows in the period from timing T2 to timing T3, and supplies the high-level selection signal Φr1 to all the rows over the pulse period from timing T3. Since the control signal fdg is at the low level, reset levels corresponding to the HCG are sample-held.

Then, the vertical scanning circuit 211 supplies the high-level transfer signal trg to all the rows in the period from timing T4 to timing T5, and supplies the high-level selection signal Φs1 to all the rows over the pulse period from timing T5. As a result, signal levels corresponding to the HCG are sample-held. The period from timing T1 to timing T5 corresponds to an exposure period corresponding to the HCG.

Subsequently, at timing T6, the vertical scanning circuit 211 switches the control signal fdg for all the rows to the high level, and switches the conversion efficiency to the LCG. In the period from timing T6 to timing T7, the vertical scanning circuit 211 supplies the high-level transfer signal trg to all the rows, and supplies the high-level selection signal Φs2 to all the rows over the pulse period from timing T7. As a result, signal levels corresponding to the LCG are sample-held. The period from timing T1 to timing T7 corresponds to an exposure period corresponding to the LCG.

Then, the vertical scanning circuit 211 supplies the high-level FD reset signal rst to all the rows in the period from timing T8 to timing T9, and supplies the high-level selection signal Φr2 to all the rows over the pulse period from timing T9. As a result, reset levels corresponding to the LCG are sample-held.

In addition, the vertical scanning circuit 211 controls the current source transistors 316 in all the rows to supply the current id1 over the period from timing T2 to timing T10.

Figure 41:
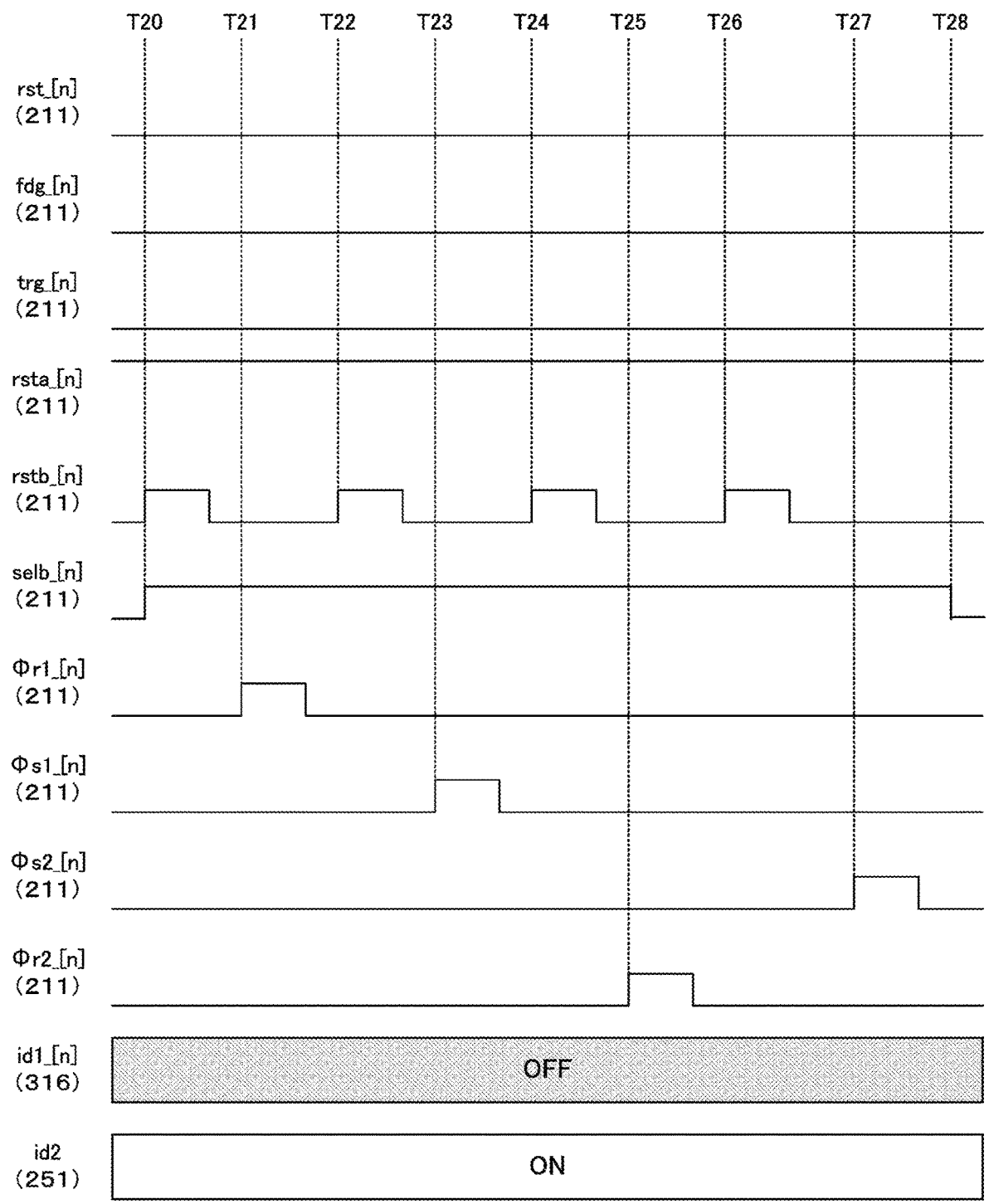
FIG. 41 is a timing chart depicting an example of the readout operation in the eighth embodiment of the present technology.

FIG. 41 is a timing chart depicting an example of the readout operation in the eighth embodiment of the present technology. Over a period of readout, the vertical scanning circuit 211 switches the FD reset signal rst, the control signal fdg, and the transfer signal trg for all the rows to the low levels, and switches the upstream reset signal rsta for all the rows to the high level.

According to the first embodiment, when a switched capacitor including the capacitive element 321-1 and the like and the selecting circuit 330 is driven, the FD 314 is fixed at the power supply voltage VDD at the time of sequential readout, and the upstream amplification transistor 315 fixes the upstream node 320 at the power supply voltage VDD. However, in a case of the pixel 300 provided with the additional capacitance 361, the pixel is in an accumulated state during sequential readout, and an effective charge is discharged from the photoelectric converting element 311 to the FD 314 in some cases. Accordingly, the FD 314 cannot be fixed at the power supply voltage VDD. Accordingly, the upstream reset transistor 323 that fixes the node 320 at the power supply voltage VDD during readout is necessary.

The vertical scanning circuit 211 switches the downstream selection signal selb for the n-th row to the high level over the readout period of the n-th row from timing T20 to timing T28. The vertical scanning circuit 211 supplies the high-level downstream reset signal rstb to the n-th row over the pulse period from timing T20, and supplies the high-level selection signal Φr1 over the pulse period from timing T21. As a result, reset levels corresponding to the HCG are read out. Then, the vertical scanning circuit 211 supplies the high-level downstream reset signal rstb to the n-th row over the pulse period from timing T22, and supplies the high-level selection signal Φs1 over the pulse period from timing T23. As a result, signal levels corresponding to the HCG are read out.

Subsequently, the vertical scanning circuit 211 supplies the high-level downstream reset signal rstb to the n-th row over the pulse period from timing T24, and supplies the high-level selection signal Φr2 over the pulse period from timing T25. As a result, reset levels corresponding to the LCG are read out. Then, the vertical scanning circuit 211 supplies the high-level downstream reset signal rstb to the n-th row over the pulse period from timing T26, and supplies the high-level selection signal Φs2 over the pulse period from timing T27. As a result, signal levels corresponding to the LCG are read out.

As illustrated in the figure, the same order of readout, i.e., reset levels and then signal levels, is used for both the HCG and the LCG. In addition, immediately before readout of each level, the downstream reset signal rstb erases the history of previous readout in the downstream nodes 340.

In addition, the timing control circuit 212 controls the load MOS transistors 251 in all the columns to supply the current id2 in a readout period of all the rows.

The downstream column signal processing circuit 260 performs CDS processing of determining the difference between a reset level corresponding to the HCG and a signal level corresponding to the HCG, and generates a digital signal corresponding to the HCG. In addition, the column signal processing circuit 260 performs CDS processing of determining the difference between a reset level corresponding to the LCG and a signal level corresponding to the HCG, and generates a digital signal corresponding to the LCG.

Here, as illustrated in FIG. 40, a length dT1 of an exposure period corresponding to the HCG and a length dT2 of an exposure period corresponding to the LCG are slightly different. Because of this, it is desirable that, according to a temporal difference therebetween, the column signal processing circuit 260 calibrate the digital signals. For example, the column signal processing circuit 260 multiplies the digital signal corresponding to the HCG by dT2/dT1. Alternatively, the column signal processing circuit 260 multiplies the digital signal corresponding to the LCG by dT1/dT2.

In addition, the column signal processing circuit 260 determines, for each pixel, whether or not the illuminance is greater than a predetermined value. Then, the column signal processing circuit 260 outputs a digital signal corresponding to the LCG as a pixel signal of the pixel in a case where the illuminance is high, and outputs a digital signal corresponding to the HCG as a pixel signal in a case where the illuminance is low. As a result, the dynamic range is expanded more than that in the first embodiment. In addition, since it is not necessary to capture images of two frames with conversion efficiency which is different for each frame, lowering of the frame rate can be suppressed.

Note that each of the third, fourth, fifth, and seventh embodiments can be applied to the eighth embodiment.

Since the selecting circuit 330 connects any of the four capacitive elements to the downstream node 340 according to the eighth embodiment of the present technology as described above, miniaturization of pixels becomes easier. In addition, since reset levels and signal levels are held with switched conversion efficiency, the dynamic range can be expanded while lowering of the frame rate is suppressed.

First Modification Example

Whereas the current source transistor 316 drives the upstream amplification transistor 315 in the eighth embodiment described above, this configuration increases variations of the current of the current source transistor 316. Because of this, there is a risk that settling of the upstream node 320 from the high level to the low level becomes slow and the responsiveness lowers. The solid-state imaging element 200 in the first modification example of the eighth embodiment is different from that in the eighth embodiment in that switches 363 and 364 for controlling the level of the upstream node 320 are provided.

Figure 42:
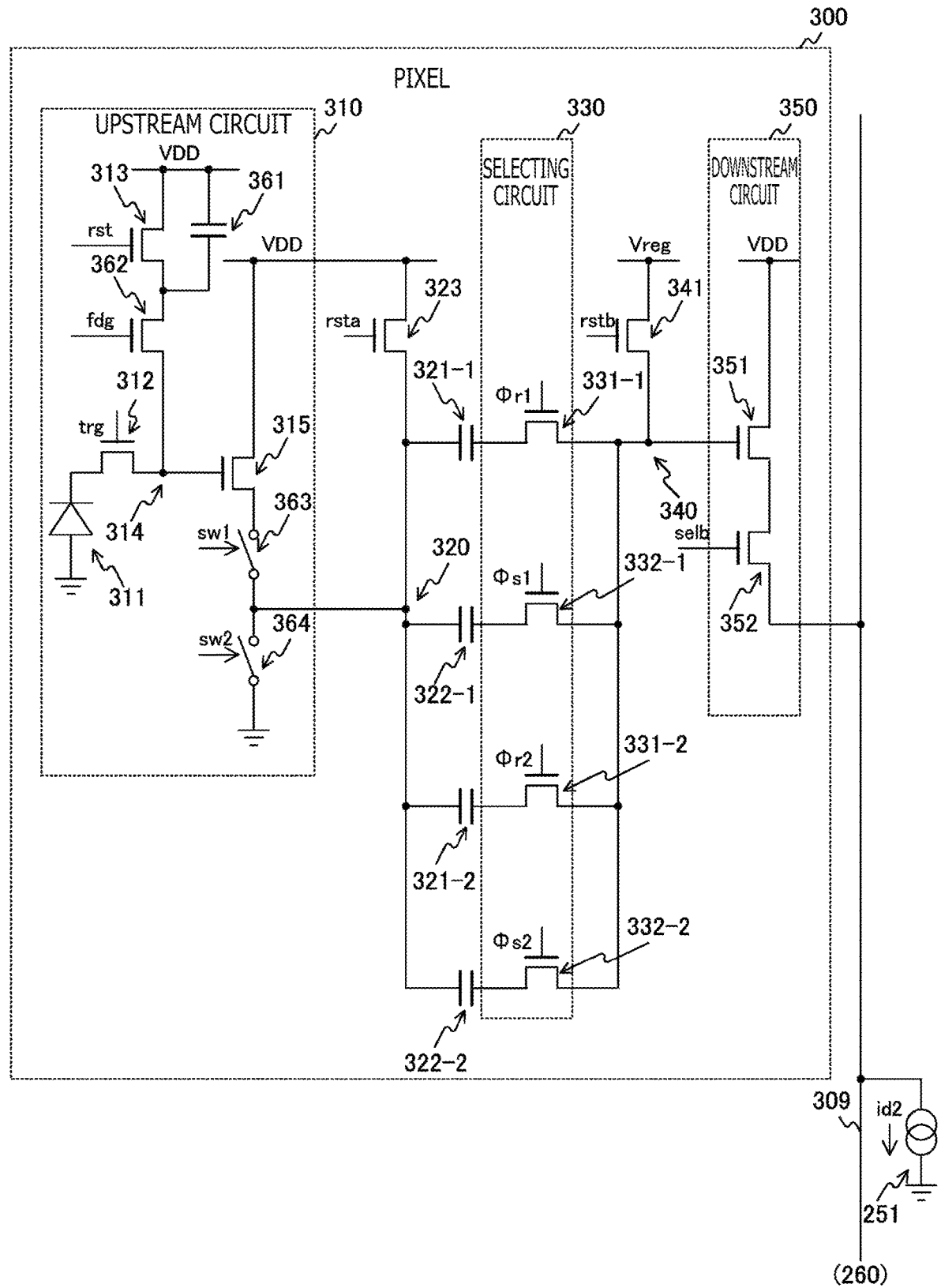
FIG. 42 is a circuit diagram depicting a configuration example of the pixel in a first modification example of the eighth embodiment of the present technology.

FIG. 42 is a circuit diagram depicting a configuration example of the pixel 300 in the first modification example of the eighth embodiment of the present technology. The pixels 300 in the first modification example of the eighth embodiment are different from those in the eighth embodiment in that each pixel 300 includes the switches 363 and 364 instead of the current source transistor 316.

The switch 363 is configured to open and close a path between the upstream amplification transistor 315 and the upstream node 320 according to a control signal sw1 from the vertical scanning circuit 211. The switch 364 is configured to open and close a path between the upstream node 320 and the ground terminal according to a control signal sw2 from the vertical scanning circuit 211. Note that the switches 363 and 364 are examples of first and second switches described in claims.

Hereinbelow, a scheme in which the current source transistor 316 drives the upstream amplification transistor 315 is referred to as "current drive." In addition, a scheme in which the switches 363 and 364 drive the upstream amplification transistor 315 is referred to as "precharge drive."

The vertical scanning circuit 211 can control the level of the upstream node 320 by switching the switches 363 and 364 to the ON state and the OFF state. As a result, it is possible to make settling of the upstream node 320 from the high level to the low level faster and ameliorate the responsiveness.

Since the vertical scanning circuit 211 performs precharge drive by switching the switches 363 and 364 to the ON state and the OFF state according to the first modification example of the eighth embodiment of the present technology as described above, the responsiveness can be ameliorated.

Second Modification Example

Whereas precharge drive is performed in the first modification example of the eighth embodiment described above, in this configuration, the upstream node 320 after being precharged to the low level is switched to the high-impedance state. Because of this, it takes time until the level of the upstream node 320 is stabilized, and the susceptibility to the influence of disturbance increases undesirably. The solid-state imaging element 200 in the second modification example of the eighth embodiment is different from that in the first modification example of the eighth embodiment in that the current source transistor 316 is added.

Figure 43:
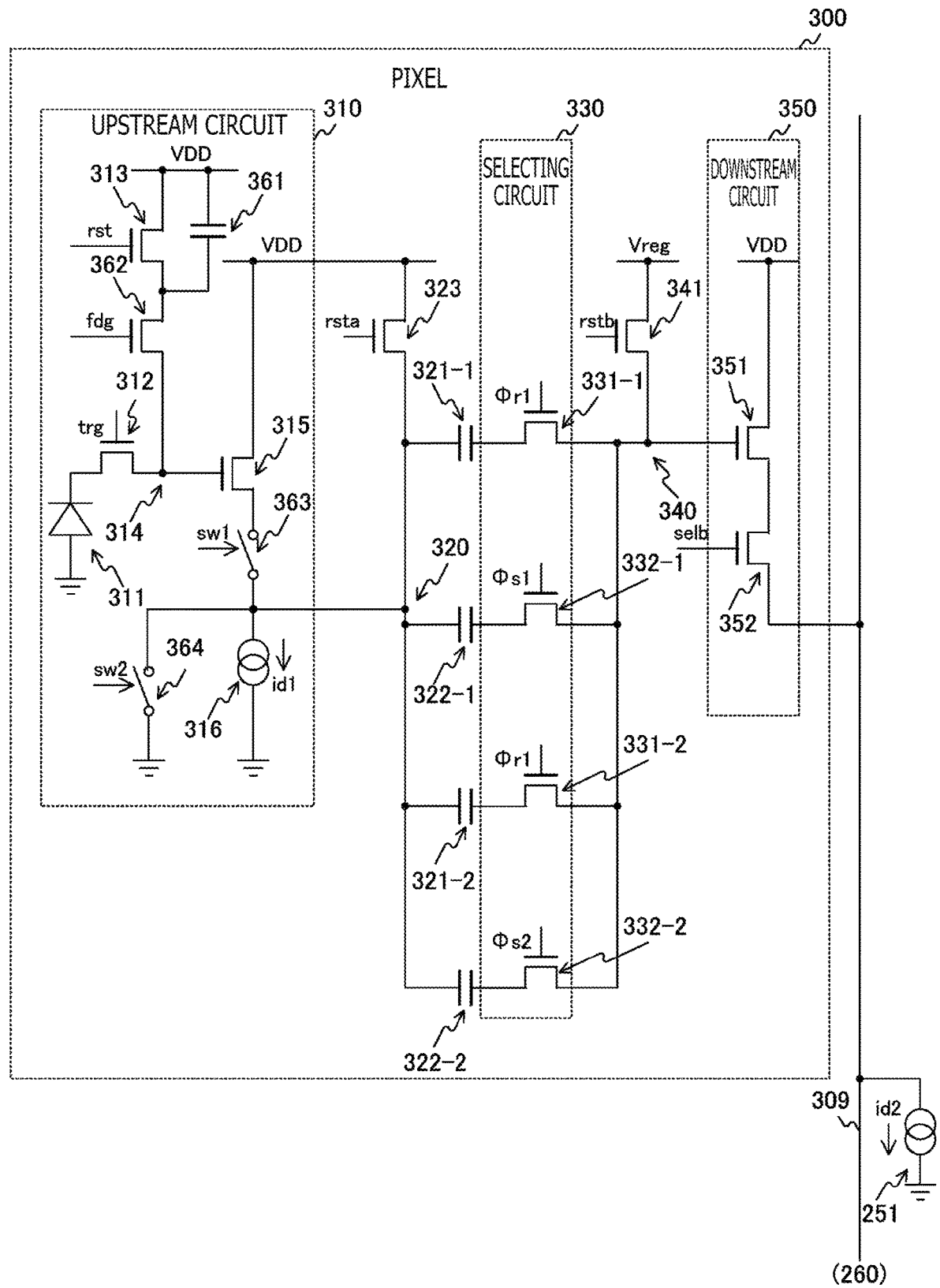
FIG. 43 is a circuit diagram depicting a configuration example of the pixel in a second modification example of the eighth embodiment of the present technology.

FIG. 43 is a circuit diagram depicting a configuration example of the pixel 300 in the second modification example of the eighth embodiment of the present technology. The pixels 300 in the second modification example of the eighth embodiment are different from those in the first modification example of the eighth embodiment in that each pixel 300 further includes the current source transistor 316.

By the addition of the current source transistor 316, settling at the time when the upstream node 320 after being precharged to the low level is switched to the high level becomes faster. Because of this, the influence of disturbance can be suppressed. Hereinbelow, a scheme in which driving is performed by the current source transistor 316 and the switches 363 and 364 is referred to as "precharge+current drive."

Since the vertical scanning circuit 211 is driven by the current source transistor 316 and the switches 363 and 364 according to the second modification example of the eighth embodiment of the present technology as described above, settling after precharge can be made faster.

FIG. 44 is a figure summarizing respective features of drive schemes of the upstream amplification transistor in the embodiments of the present technology. Since variations of currents are large in the case of current drive, there is a risk that settling of the upstream node 320 from the high level to the low level becomes slow. Since noise of the current source transistor 316 is absent in precharge drive, it accompanies less noise than in current drive, but the upstream node 320 after precharge is switched to the high-impedance state. Because of this, it takes time until the level of the upstream node 320 is stabilized, and the susceptibility to the influence of disturbance increases undesirably. In contrast to this, in precharge+current drive, settling after precharge can be made faster than in precharge drive.

Note that each of precharge drive and precharge+current drive can also be applied to each of the embodiments in addition to the eighth embodiment.

9. Ninth Embodiment

Whereas the photoelectric converting element 311 is connected only to the transfer transistor 312 in the eighth embodiment described above, there is a risk with this configuration that a charge overflows from the photoelectric converting element 311 to the FD 314 during sampling of the photoelectric converting element 311 at a reset level corresponding to the HCG. If the potential of the FD 314 keeps changing due to this overflow, a current for charging a corresponding capacitive element flows, an IR drop of VDD or Vreg occurs, and the pixel signal is changed undesirably, in some cases. The solid-state imaging element 200 in the ninth embodiment is different from that in the eighth embodiment in that each pixel 300 further includes the discharge transistor 317.

Figure 45:
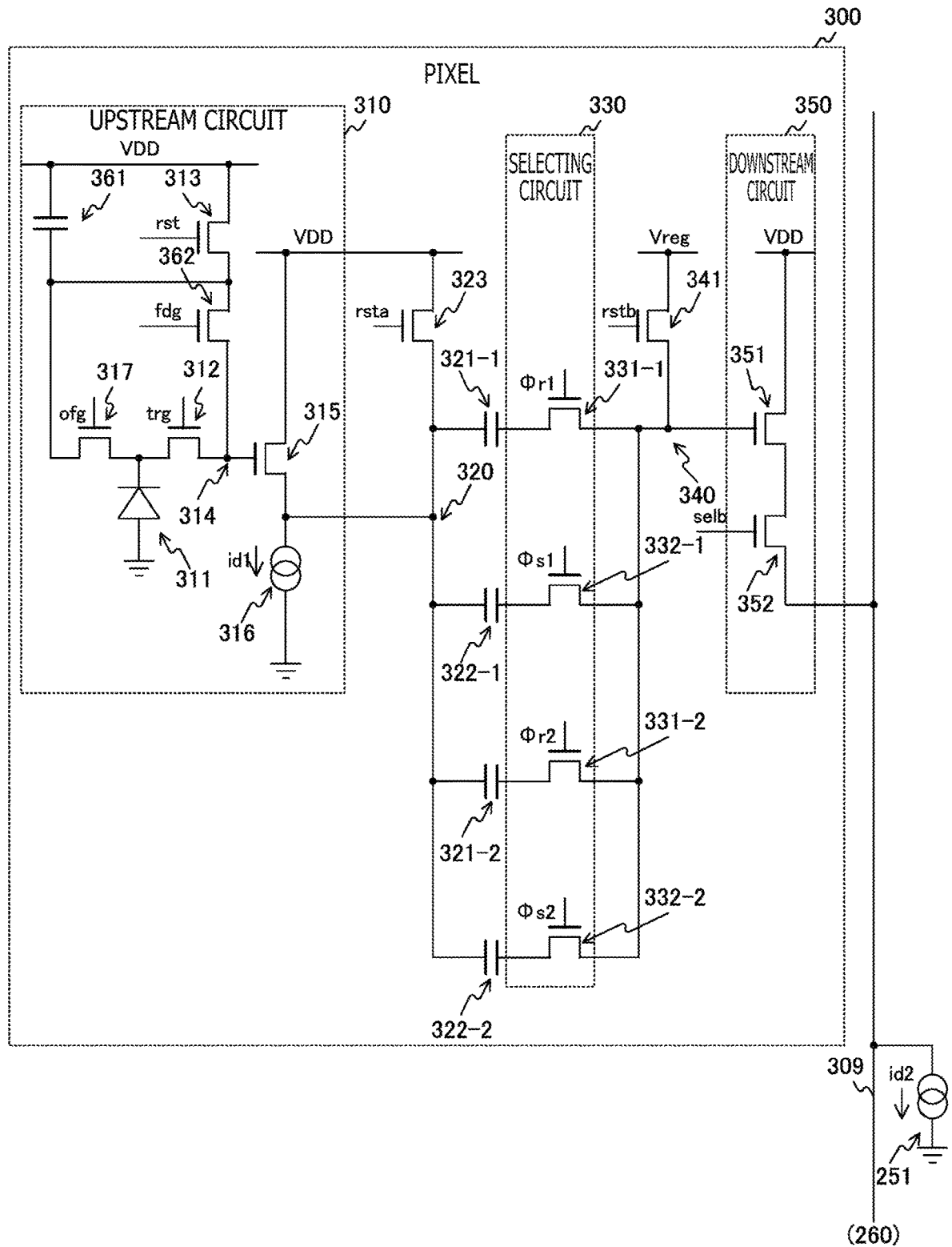
FIG. 45 is a circuit diagram depicting a configuration example of the pixel in a ninth embodiment of the present technology.

FIG. 45 is a circuit diagram depicting a configuration example of the pixel 300 in the ninth embodiment of the present technology. The pixels 300 in the ninth embodiment are different from those in the eighth embodiment in that the discharge transistor 317 is inserted between the photoelectric converting element 311 and a connection node between the conversion efficiency control transistor 362 and the additional capacitance 361. The discharge transistor 317 is configured to discharge a charge overflowing from the photoelectric converting element 311, according to the discharge signal ofg from the vertical scanning circuit 211.

Immediately after sample-holding of a reset level generated with the HCG, the vertical scanning circuit 211 controls the discharge transistor 317 to be in the ON state over a pulse period. As a result, a charge overflowing from the photoelectric converting element 311 after initialization is discharged from the discharge transistor 317 to a path to the additional capacitance 361, and accordingly, potential variations of the FD 314 due to the overflowing charge can be suppressed.

Figure 46:
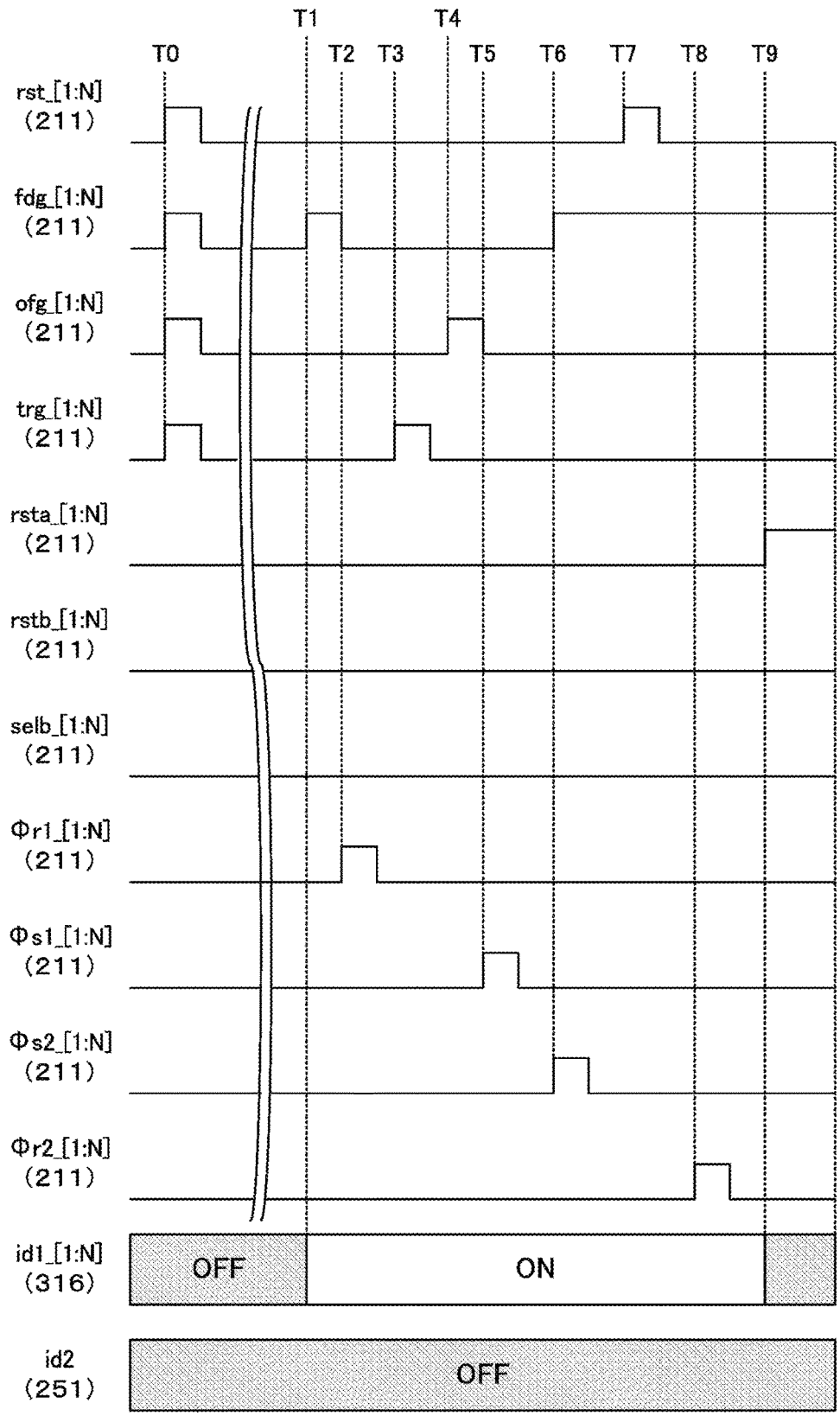
FIG. 46 is a timing chart depicting an example of the global shutter operation in the ninth embodiment of the present technology.

FIG. 46 is a timing chart depicting an example of the global shutter operation in the ninth embodiment of the present technology. Over the pulse period from timing t3 immediately after reset levels generated with the HCG are sampled, the vertical scanning circuit 211 supplies the high-level transfer signal trg to all the rows. Over the pulse period from timing t4 immediately after the supply of the high-level transfer signal trg, the vertical scanning circuit 211 supplies the high-level discharge signal ofg to all the rows. By starting charge transfer to the FD 314 and the additional capacitance 361 according to the discharge signal ofg immediately after transfer of a charge corresponding to the HCC in such a manner, the difference between exposure time in the HCG and the LCG can be reduced.

Figure 47:
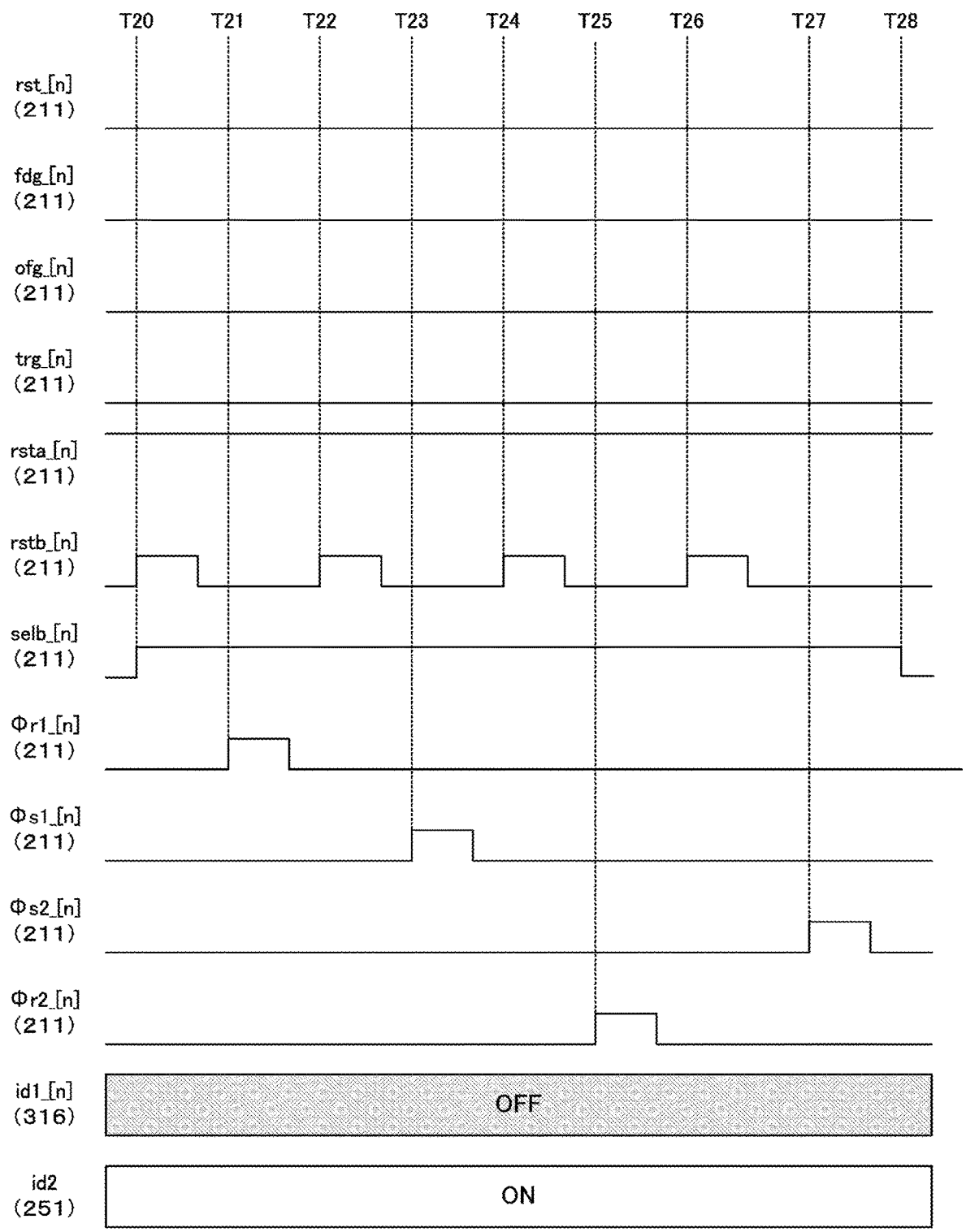
FIG. 47 is a timing chart depicting an example of the readout operation in the ninth embodiment of the present technology.

FIG. 47 is a timing chart depicting an example of the readout operation in the ninth embodiment of the present technology. As illustrated in the figure, the discharge signal ofg is controlled to be at the low level over a readout period.

Since the discharge transistor 317 discharges a charge overflowing from the photoelectric converting element 311 to the path to the additional capacitance 361 according to the ninth embodiment of the present technology in such a manner, potential variations of the FD 314 due to the overflowing charge can be suppressed.

10. Tenth Embodiment

The conversion efficiency is switched between two levels in the eighth embodiment described above. However, there is a difference between the SNR (Signal-Noise Ratio) immediately before the conversion efficiency is switched and the SNR immediately after the conversion efficiency is switched, and it is difficult with the two levels to reduce the stepwise difference between the SNRs at the juncture. The solid-state imaging element 200 in the tenth embodiment is different from that in the eighth embodiment in that the conversion efficiency is switched among three levels.

Figure 48:
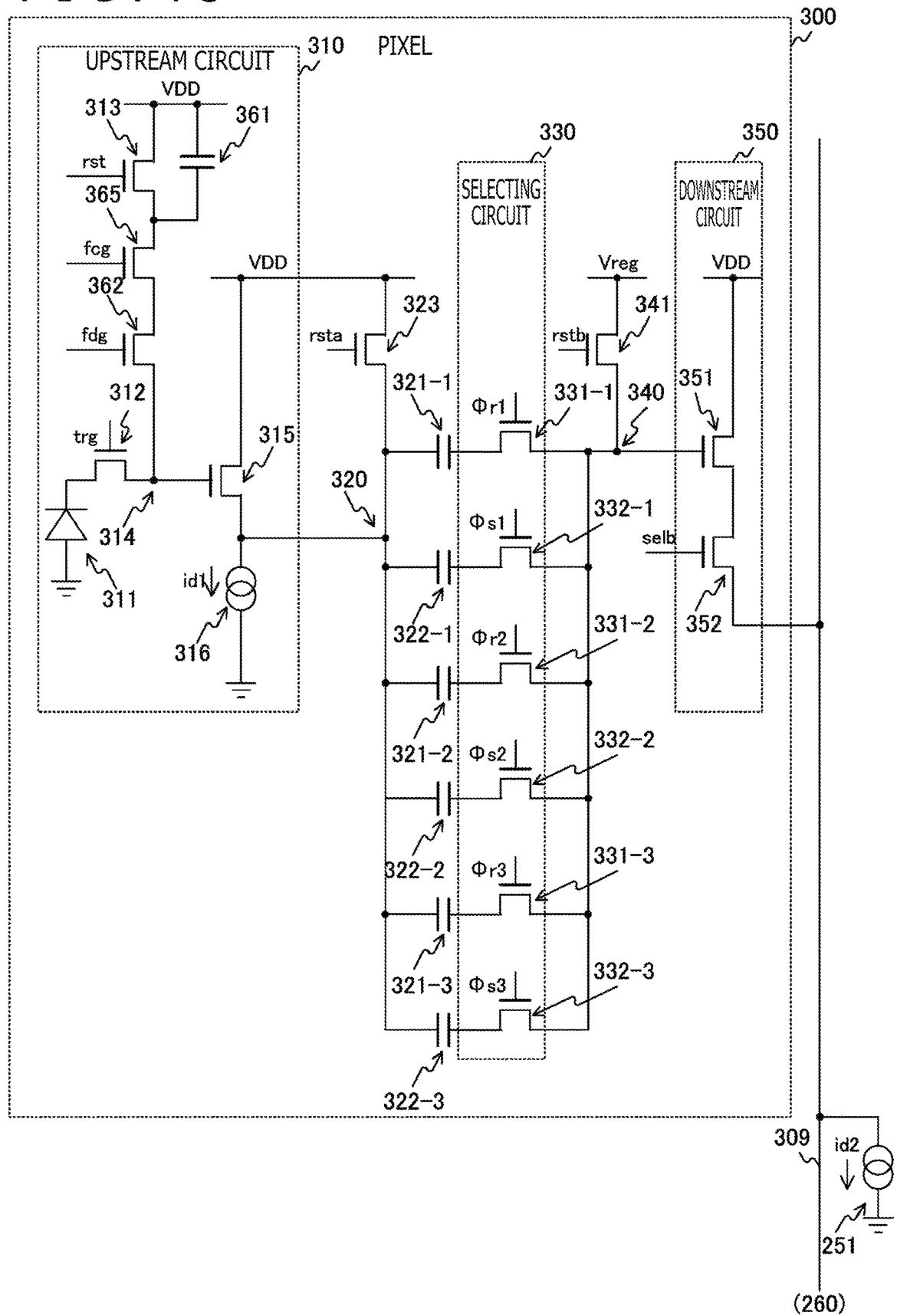
FIG. 48 is a circuit diagram depicting a configuration example of the pixel in a tenth embodiment of the present technology.

FIG. 48 is a circuit diagram depicting a configuration example of the pixel 300 in the tenth embodiment of the present technology. The pixels 300 in the tenth embodiment are different from those in the eighth embodiment in that each pixel 300 further includes a conversion efficiency control transistor 365, capacitive elements 321-3 and 322-3, and selection transistors 331-3 and 332-3.

The conversion efficiency control transistor 365 is inserted between the conversion efficiency control transistor 362 and the additional capacitance 361, and receives, at its gate, input of a control signal fcg from the vertical scanning circuit 211. Note that the conversion efficiency control transistors 362 and 365 are examples of first and second conversion efficiency control transistors described in claims.

In a case where only the conversion efficiency control transistor 362 among the conversion efficiency control transistors 362 and 365 is in the ON state, the conversion efficiency is lower than in a case where both the conversion efficiency control transistors 362 and 365 are in the OFF state. In addition, in a case where both the conversion efficiency control transistors 362 and 365 are in the ON state, the conversion efficiency is lower than in a case where only the conversion efficiency control transistor 362 is in the ON state. In such a manner, the conversion efficiency is controlled to be at any of the three levels. It is supposed that the highest conversion efficiency in the three levels is the HCG and the lowest conversion efficiency in the three levels is the LCG. In addition, the conversion efficiency between the HCG and the LCG is referred to as an "MCG (Middle Conversion Gain)." Since there are two junctures by switching the conversion efficiency among the three levels as compared with the case where the conversion efficiency is switched between the two levels, the step between SNRs per position can be reduced.

One end of each of the capacitive elements 321-3 and 322-3 shares a connection to the upstream node 320. The selection transistor 331-3 is configured to open and close a path between the capacitive element 321-3 and the downstream node 340 according to a selection signal Φr3. The selection transistor 332-3 is configured to open and close a path between the capacitive element 322-3 and the downstream node 340 according to a selection signal Φs3.

Note that the capacitive elements 321-3 and 322-3 are examples of fifth and sixth capacitive elements described in claims.

In addition, whereas the conversion efficiency is switched among the three levels, the conversion efficiency can also be switched among four or more levels. In a case where the conversion efficiency is switched among four or more levels, it is sufficient if additional capacitances or conversion efficiency control transistors are added according to the number of levels.

Figure 49:
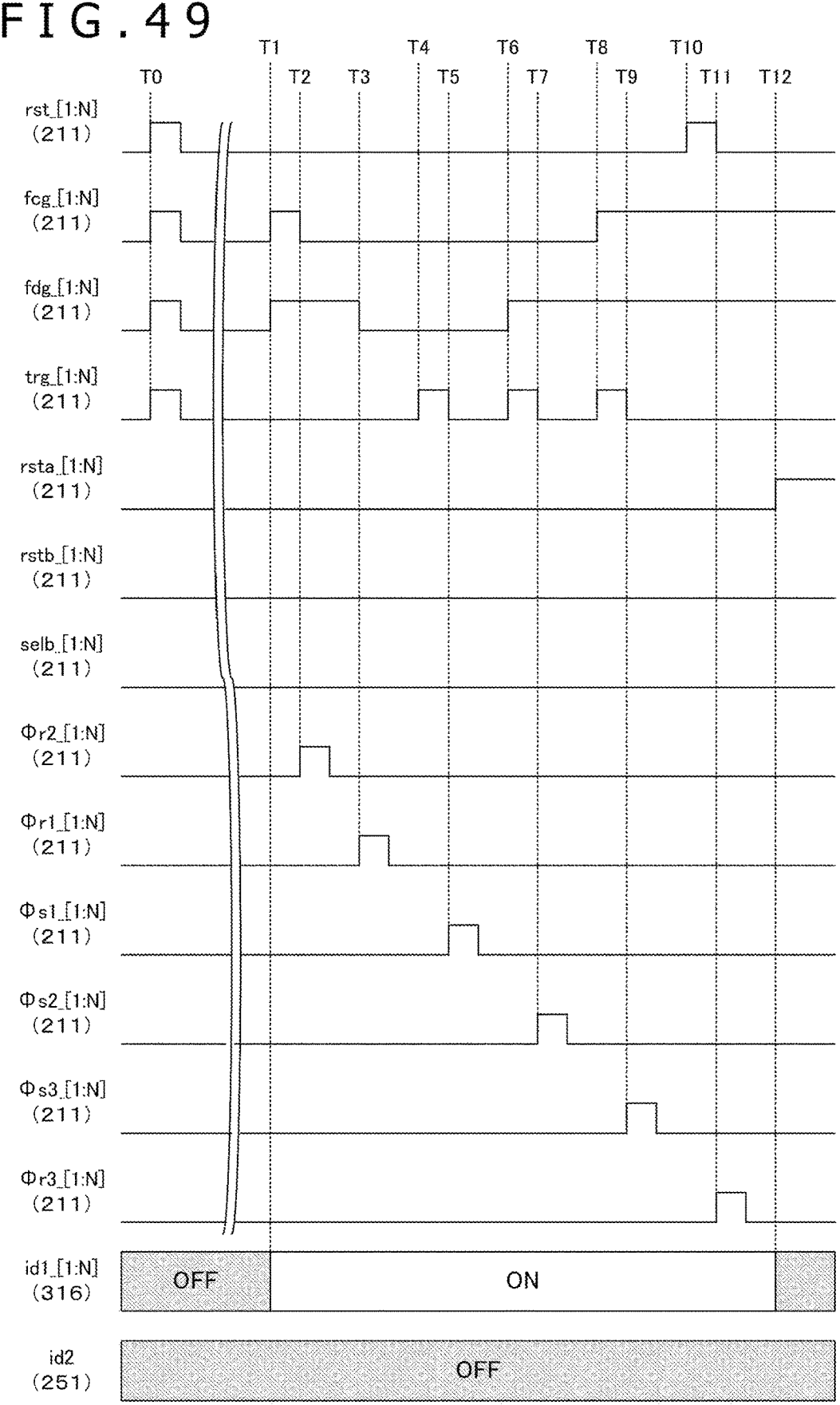
FIG. 49 is a timing chart depicting an example of the global shutter operation in the tenth embodiment of the present technology.

FIG. 49 is a timing chart depicting an example of the global shutter operation in the tenth embodiment of the present technology. The vertical scanning circuit 211 supplies the high-level FD reset signal rst, control signal fcg, control signal fdg, and transfer signal trg to all the rows over the pulse period from timing T0 immediately before the start of exposure. As a result, exposure is started simultaneously in all the rows.

The vertical scanning circuit 211 switches the control signals fcg and fdg for all the rows to the high levels at timing T1, and switches the control signal fcg for all the rows to the low level at timing T2. In addition, the vertical scanning circuit 211 supplies the high-level selection signal Φr2 to all the rows over the pulse period from timing T2. Since only the control signal fdg is at the high level, reset levels corresponding to the MCG are sample-held.

The vertical scanning circuit 211 switches the control signal fdg for all the rows to the low level at timing T3, and supplies the high-level selection signal Φr1 to all the rows over a pulse period. Since the control signals fcg and fdg are at the low levels, reset levels corresponding to the HCG are sample-held.

The vertical scanning circuit 211 supplies the high-level transfer signal trg to all the rows in the period from timing T4 to timing T5, and supplies the high-level selection signal Φs1 to all the rows over the pulse period from timing T5. As a result, signal levels corresponding to the HCG are sample-held.

The vertical scanning circuit 211 switches the control signal fdg for all the rows to the high level at timing T6. Then, the vertical scanning circuit 211 supplies the high-level transfer signal trg to all the rows in the period from timing T6 to timing T7, and supplies the high-level selection signal Φs2 to all the rows over the pulse period from timing T7. As a result, signal levels corresponding to the MCG are sample-held.

The vertical scanning circuit 211 switches the control signal fcg for all the rows to the high level at timing T8. Then, the vertical scanning circuit 211 supplies the high-level transfer signal trg to all the rows in the period from timing T8 to timing T9, and supplies the high-level selection signal Φs3 to all the rows over the pulse period from timing t9. Since the control signals fcg and fdg are at the high levels, signal levels corresponding to the LCG are sample-held.

The vertical scanning circuit 211 supplies the high-level FD reset signal rst to all the rows in the period from timing T10 to timing T11, and supplies the high-level selection signal Φr3 to all the rows over the pulse period from timing T11. As a result, reset levels corresponding to the LCG are sample-held.

In addition, the vertical scanning circuit 211 controls the current source transistors 316 in all the rows to supply the current id1 over the period from timing T1 to timing T12.

Figure 50:
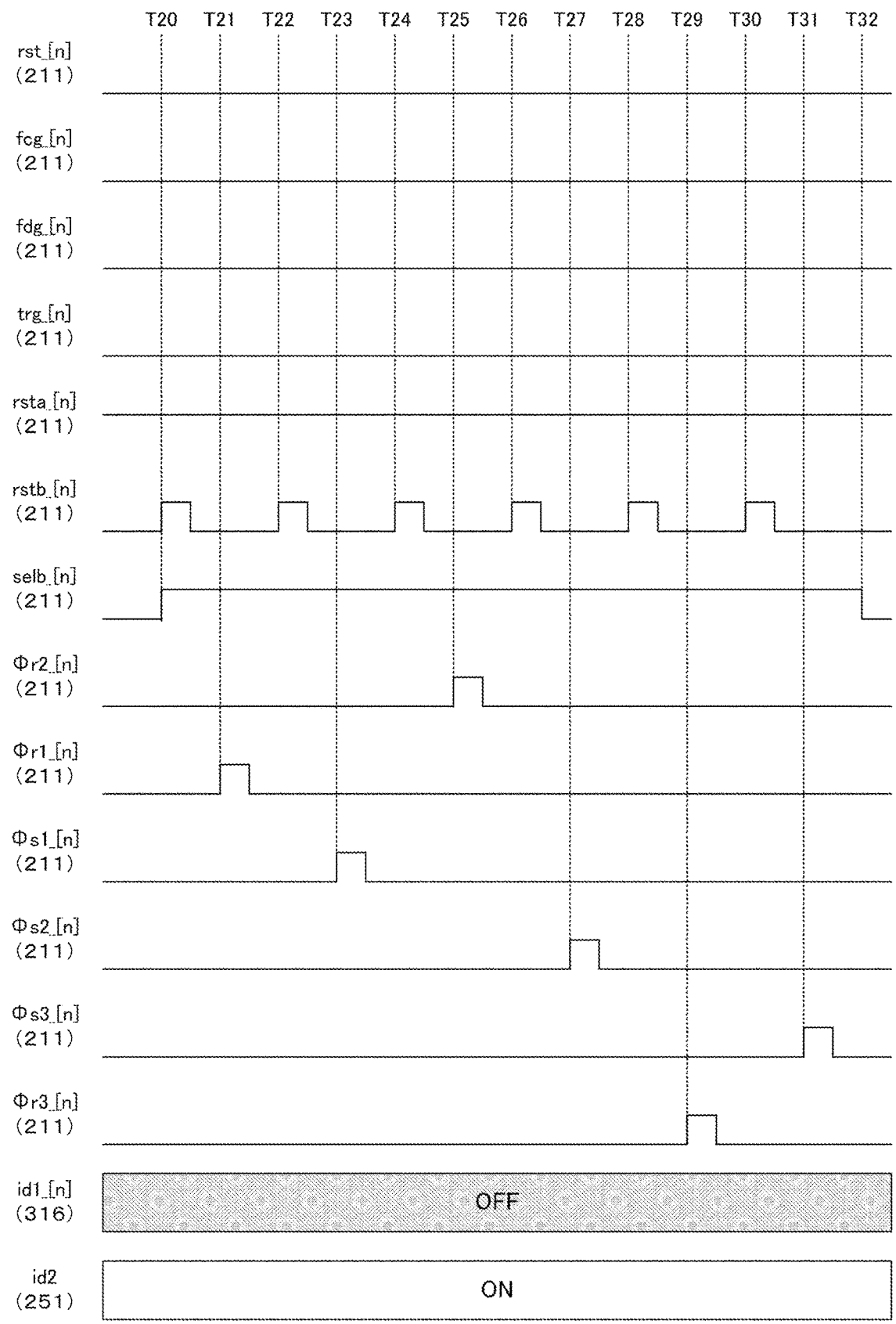
FIG. 50 is a timing chart depicting an example of the readout operation in the tenth embodiment of the present technology.

FIG. 50 is a timing chart depicting an example of the readout operation in the tenth embodiment of the present technology. Over a period of readout, the vertical scanning circuit 211 switches the FD reset signal rst, the control signal fcg, the control signal fdg, and the transfer signal trg for all the rows to the low levels, and switches the upstream reset signal rsta for all the rows to the high level.

The vertical scanning circuit 211 switches the downstream selection signal selb for the n-th row to the high level over the readout period of the n-th row from timing T20 to timing T32. According to the selection signals Φr1, Φs1, Φr2, and Φs2, reset levels and signal levels corresponding to the HCG and reset levels and signal levels corresponding to the MCG are read out.

The vertical scanning circuit 211 supplies the high-level downstream reset signal rstb to the n-th row over the pulse period from timing T28, and supplies the high-level selection signal Φr3 over the pulse period from timing T29. As a result, reset levels corresponding to the LCG are read out. Then, the vertical scanning circuit 211 supplies the high-level downstream reset signal rstb to the n-th row over the pulse period from timing t30, and supplies the high-level selection signal Φs3 over the pulse period from timing T31. As a result, signal levels corresponding to the LCG are read out.

Since the conversion efficiency is switched among the three levels by the conversion efficiency control transistors 362 and 365 according to the tenth embodiment of the present technology as described above, the steps between the SNRs at the junctures can be reduced as compared to the case where the conversion efficiency is switched between the two levels.

11. Eleventh Embodiment

Whereas the photoelectric converting element 311 is connected only to the transfer transistor 312 in the tenth embodiment described above, there is a risk with this configuration that a charge overflows from the photoelectric converting element 311 to the FD 314 during sampling of the photoelectric converting element 311 at a reset level corresponding to the HCG. The solid-state imaging element 200 in the eleventh embodiment is different from that in the tenth embodiment in that each pixel 300 further includes the discharge transistor 317.

Figure 51:
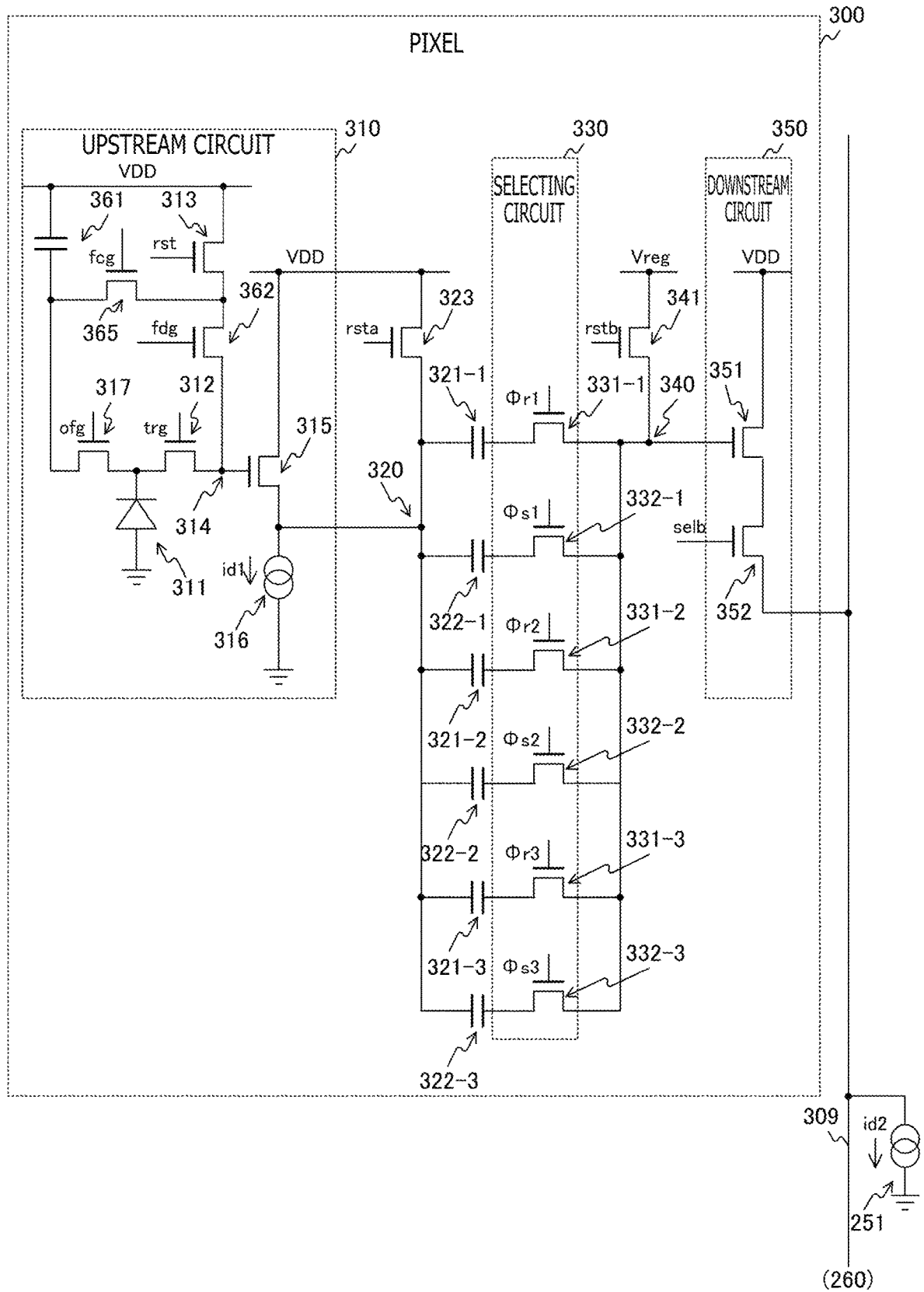
FIG. 51 is a circuit diagram depicting a configuration example of the pixel in an eleventh embodiment of the present technology.

FIG. 51 is a circuit diagram depicting a configuration example of the pixel 300 in the eleventh embodiment of the present technology. The pixels 300 in the eleventh embodiment are different from those in the tenth embodiment in that the discharge transistor 317 is inserted between the photoelectric converting element 311 and a connection node between the conversion efficiency control transistor 365 and the additional capacitance 361.

Figure 52:
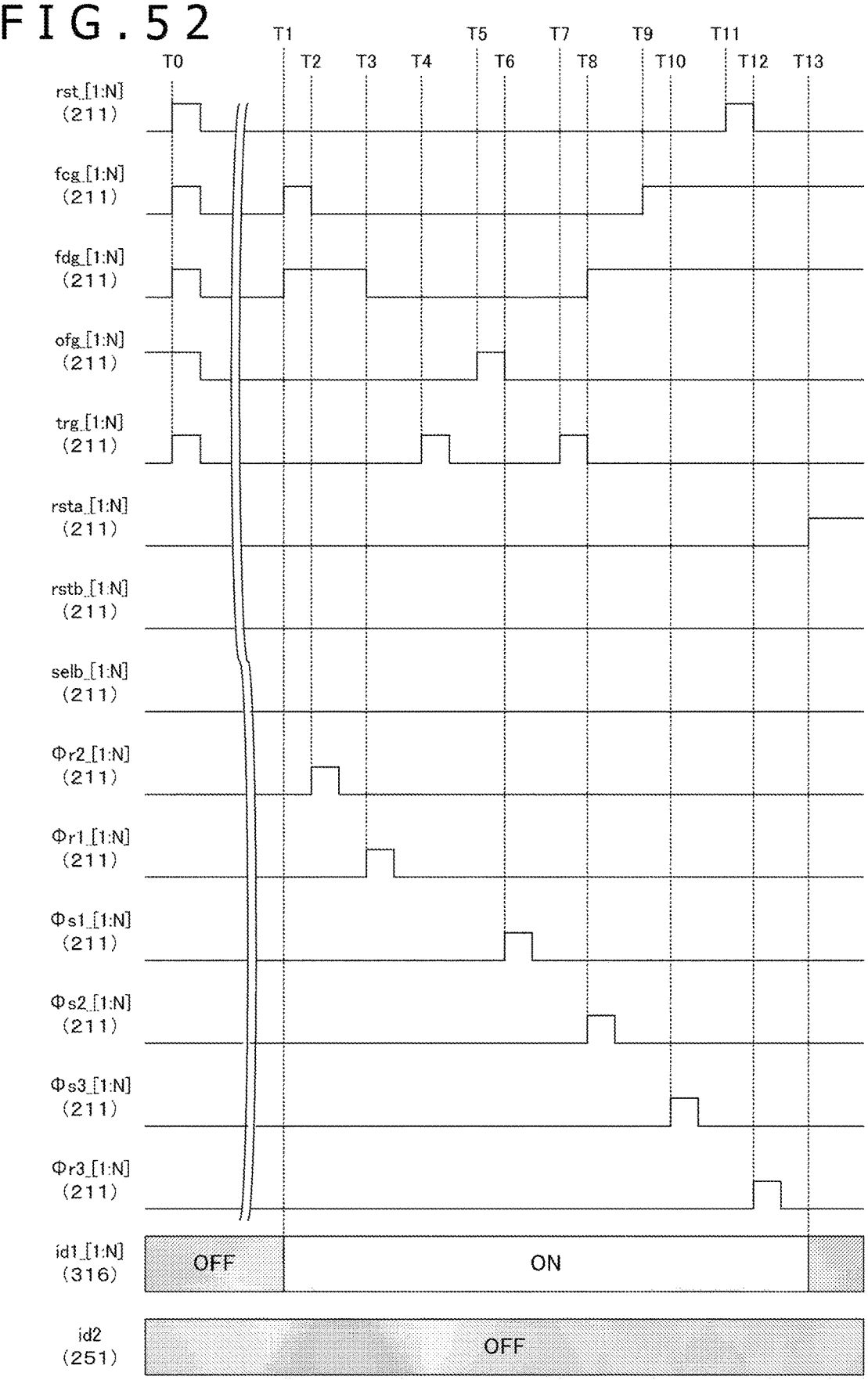
FIG. 52 is a timing chart depicting an example of the global shutter operation in the eleventh embodiment of the present technology.

FIG. 52 is a timing chart depicting an example of the global shutter operation in the eleventh embodiment of the present technology. Over the pulse period from timing T4 immediately after reset levels generated with the HCG are sampled, the vertical scanning circuit 211 supplies the high-level transfer signal trg to all the rows. Over the pulse period from timing T5 immediately after the supply of the high-level transfer signal trg, the vertical scanning circuit 211 supplies the high-level discharge signal ofg to all the rows.

Figure 53:
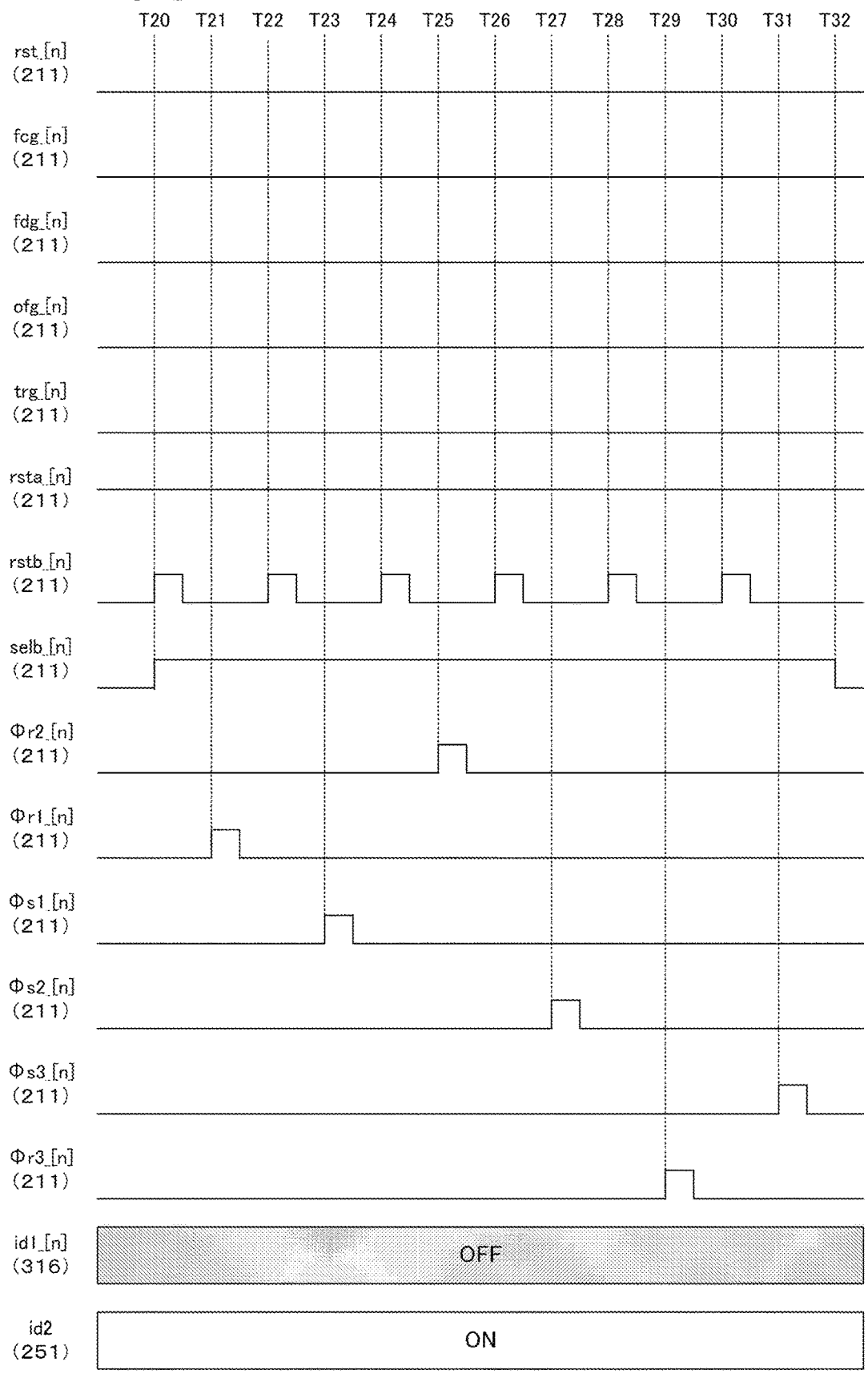
FIG. 53 is a timing chart depicting an example of the readout operation in the eleventh embodiment of the present technology.

FIG. 53 is a timing chart depicting an example of the readout operation in the eleventh embodiment of the present technology. As illustrated in the figure, the discharge signal ofg is controlled to be at the low level over a readout period.

Since the discharge transistor 317 discharges a charge overflowing from the photoelectric converting element 311 to the path to the additional capacitance 361, according to the eleventh embodiment of the present technology as described above, potential variations of the FD 314 due to the overflowing charge can be suppressed.

12. Twelfth Embodiment

In the eighth embodiment described above, the conversion efficiency is switched between the two levels, and a reset level and a signal level of each of the HCG and the LCG are held at the four capacitive elements in a pixel. However, this configuration requires the four capacitive elements for each pixel, and the pixel area size becomes greater than in a case where there are two capacitive elements, undesirably. The solid-state imaging element 200 in the twelfth embodiment is different from that in the eighth embodiment in that a short circuit transistor that outputs a reset level and a signal level at the time when the conversion efficiency is low is added and in that the number of capacitive elements is reduced.

Figure 54:
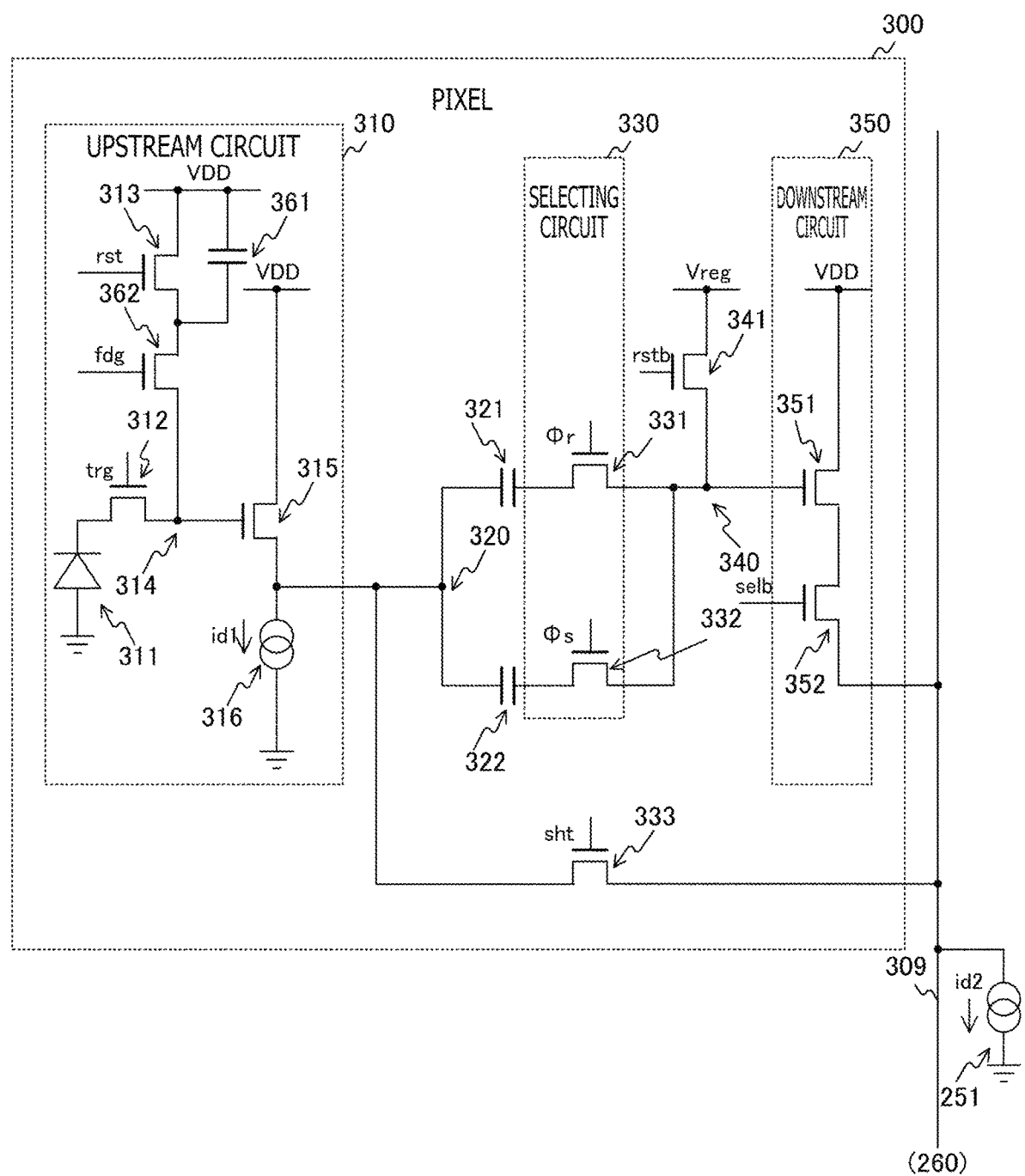
FIG. 54 is a circuit diagram depicting a configuration example of the pixel in a twelfth embodiment of the present technology.

FIG. 54 is a circuit diagram depicting a configuration example of the pixel 300 in the twelfth embodiment of the present technology. Each pixel 300 in the twelfth embodiment includes the upstream circuit 310, the capacitive elements 321 and 322, the selection transistors 331 and 332, a short circuit transistor 333, the downstream reset transistor 341, and the downstream circuit 350. In the twelfth embodiment, the circuit configurations of the upstream circuit 310 and the downstream circuit 350 are similar to those in the eighth embodiment. In addition, the connection configuration of each of the capacitive elements 321 and 322, the selection transistors 331 and 332, and the downstream reset transistor 341 is similar to that in the eighth embodiment.

The short circuit transistor 333 is configured to open and close a path between the output node (the upstream node 320) of the upstream amplification transistor 315 and the output node of the downstream selection transistor 352 according to a control signal sht from the vertical scanning circuit 211.

Figure 55:
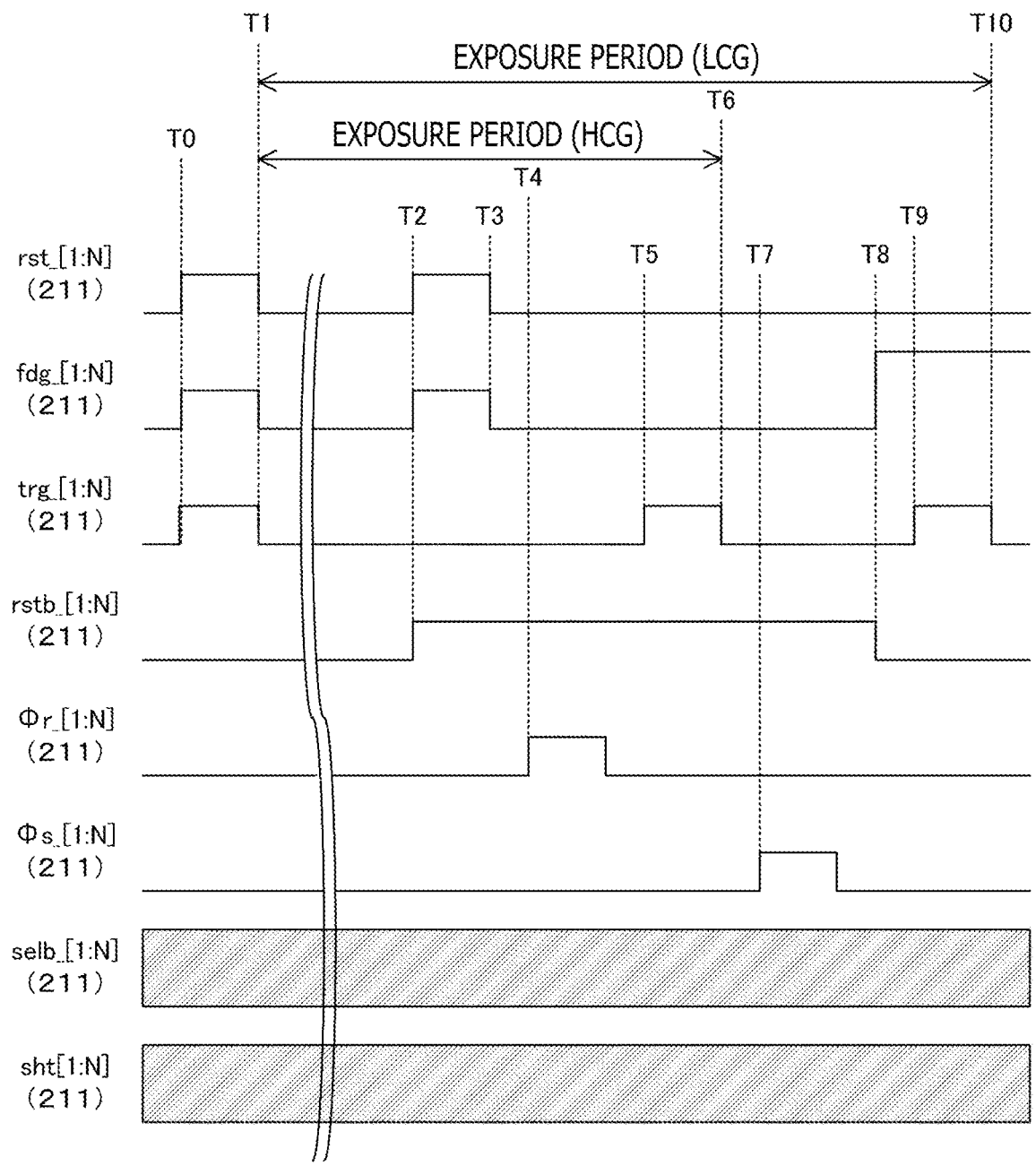
FIG. 55 is a timing chart depicting an example of the global shutter operation in the twelfth embodiment of the present technology.

FIG. 55 is a timing chart depicting an example of the global shutter operation in the twelfth embodiment of the present technology. From timing T0 immediately before the start of exposure to timing T1 after a lapse of a pulse period, the vertical scanning circuit 211 supplies the high-level FD reset signal rst, control signal fdg, and transfer signal trg to all the rows. As a result, exposure is started simultaneously in all the rows.

The vertical scanning circuit 211 switches the downstream reset signal rstb for all the rows to the high level at timing T2, and supplies the high-level FD reset signal rst and control signal fdg to all the rows in the period from timing T2 to timing T3. As a result, FD resetting is performed for all the pixels. Then, the vertical scanning circuit 211 supplies the high-level selection signal Φr to all the rows over the pulse period from timing T4. Since the control signal fdg is at the low level, reset levels corresponding to the HCG are sample-held at the capacitive elements 321 of all the pixels.

Then, the vertical scanning circuit 211 supplies the high-level transfer signal trg to all the rows in the period from timing T5 to timing T6, and supplies the high-level selection signal Φs to all the rows over the pulse period from timing T7. As a result, signal levels corresponding to the HCG are sample-held at the capacitive elements 322 of all the pixels. The period from timing T1 to timing T6 corresponds to an exposure period corresponding to the HCG.

Subsequently, at timing T8, the vertical scanning circuit 211 switches the downstream reset signal rstb to the low level while switching the control signal fdg for all the rows to the high level, and switches the conversion efficiency to the LCG. In the period from timing T9 to timing T10, the vertical scanning circuit 211 supplies the high-level transfer signal trg to all the rows. As a result, signal levels corresponding to the LCG are held at the FDs 314 of all the pixels. The period from timing T1 to timing T10 corresponds to an exposure period corresponding to the LCG.

Note that the downstream selection signal selb and the control signal sht in an exposure period may be at either the high level or the low level. In the figure, shaded portions represent that levels do not matter.

As illustrated in the figure, the vertical scanning circuit 211 causes FD resetting to be performed at timing T2 to timing T3 immediately before the end of exposure of an exposure period corresponding to the HCG, and causes the capacitive elements 321 to hold reset levels corresponding to the HCG, while switching the conversion efficiency control transistors 362 to the opened state. In addition, the vertical scanning circuit 211 causes charges to be transferred at timing T5 to timing T6 at the end of exposure of an exposure period corresponding to the HCG, while switching the conversion efficiency control transistors 362 to the opened state, and causes the capacitive elements 322 to hold signal levels corresponding to the HCG. Then, the vertical scanning circuit 211 causes charges to be transferred at timing T9 to timing T10 at the end of exposure of an exposure period corresponding to the LCG, while switching the conversion efficiency control transistors 362 to the closed state, and causes the FDs 314 to hold signal levels corresponding to the LCG.

Figure 56:
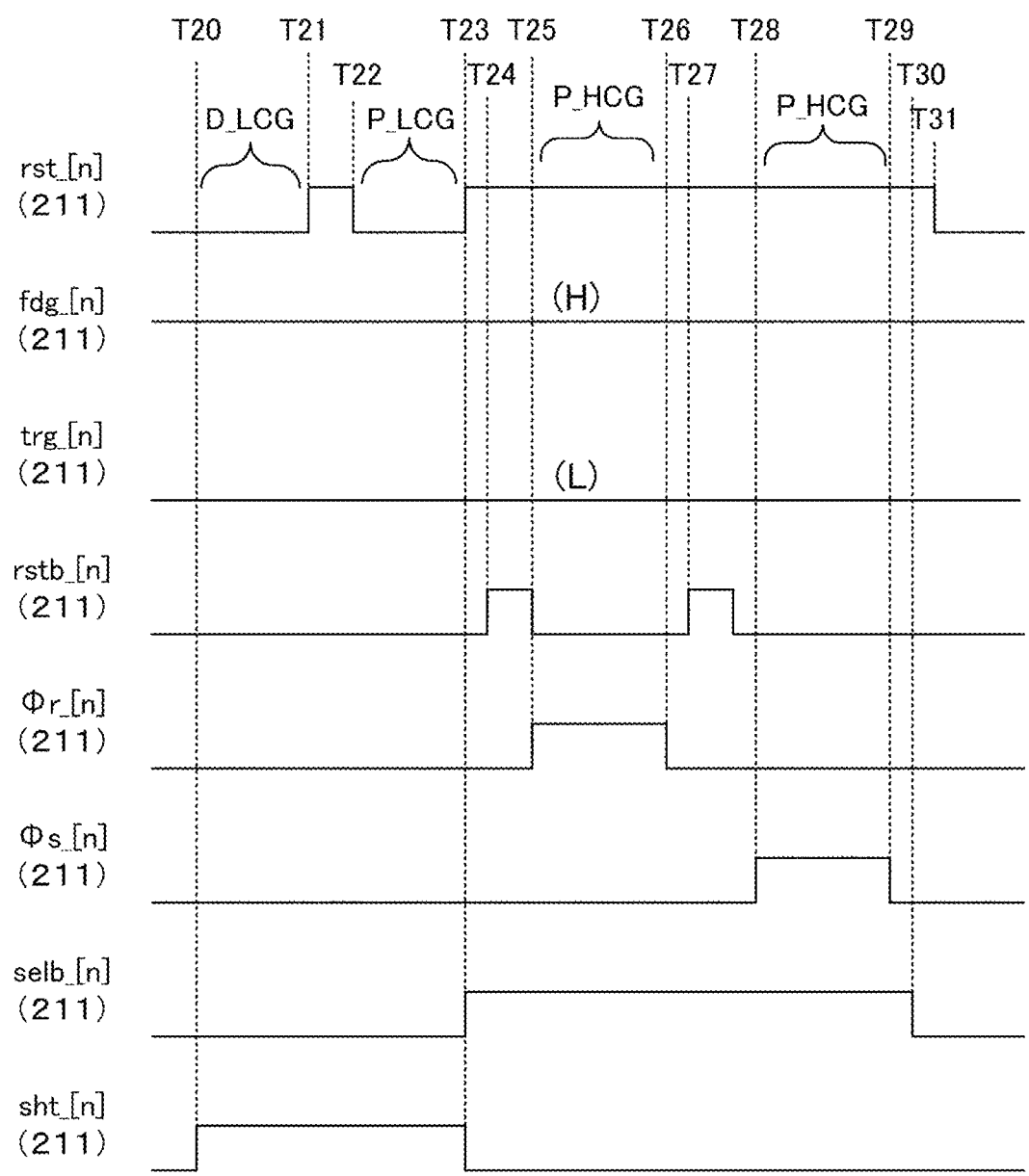
FIG. 56 is a timing chart depicting an example of the readout operation in the twelfth embodiment of the present technology.

FIG. 56 is a timing chart depicting an example of the readout operation in the twelfth embodiment of the present technology. Over a period of readout, the vertical scanning circuit 211 switches the transfer signal trg for all the rows to the low level while switching the control signal fdg to the high level.

In the period from timing T20 to timing T23 in the readout period of n rows from timing T20 to timing T31, the vertical scanning circuit 211 switches the control signal sht for the n-th row to the high level while switching the downstream selection signal selb to the low level. As a result, the short circuit transistors 333 are switched to the closed state, and the output nodes (the upstream nodes 320) of the upstream amplification transistors 315 and the output nodes of the downstream selection transistors 352 are short-circuited.

Then, the vertical scanning circuit 211 supplies the high-level FD reset signal FD to the n-th row in the period from timing T21 to timing T22. As a result, the n-th row is FD-reset, and reset levels corresponding to the LCG are generated. In the period from timing T20 to timing T21, signal levels corresponding to the LCG held at the FDs 314 are output to the ADCs 261 and read out. In addition, in the period from timing T22 to timing T23 after the FD resetting, reset levels corresponding to the LCG are output to the ADCs 261 and read out.

Next, at timing T23, the vertical scanning circuit 211 switches the FD reset signal to the high level, and switches the control signal sht to the low level. As a result, the short circuit transistors 333 are switched to the opened state. In addition, in the period from timing T23 to timing T30, the vertical scanning circuit 211 switches the downstream selection signal selb for the n-th row to the high level.

Then, the vertical scanning circuit 211 supplies the high-level downstream reset signal rstb to the n-th row over the pulse period from timing T24, and supplies the high-level selection signal Φr over the period from timing T25 to timing T26. As a result, reset levels corresponding to the HCG are output to the ADCs 261 and read out. Then, the vertical scanning circuit 211 supplies the high-level downstream reset signal rstb to the n-th row over the pulse period from timing T27, and supplies the high-level selection signal Φs over the period from timing T28 to timing T29. As a result, signal levels corresponding to the HCG are output to the ADCs 261 and read out. The vertical scanning circuit 211 switches the FD reset signal rst for the n-th row back to the low level at timing T31.

As illustrated in the figure, the vertical scanning circuit 211 switches the short circuit transistors 333 to the closed state in a readout period, and causes signal levels corresponding to the LCG to be output to the ADCs 261. In addition, the vertical scanning circuit 211 causes FD resetting to be performed at timing T21 to timing T22 while switching the short circuit transistors 333 to the closed state, and causes reset levels corresponding to the LCG to be output to the ADCs 261. Then, the vertical scanning circuit 211 causes the reset levels and the signal levels corresponding to the HCG to be sequentially output to the ADCs 261 while switching the short circuit transistors 333 to the opened state.

The global shutter operation is realized by a voltage domain scheme in which capacitive elements downstream of FDs are caused to hold voltages in the first embodiment, and the dual gain of the HCG and the LCG is realized further in the eighth embodiment. However, four capacitive elements for sampling have to be mounted for each pixel in the eighth embodiment, and the pixel area size becomes greater than in the first embodiment undesirably.

In contrast to this, since the short circuit transistors 333 are added in the twelfth embodiment, reset levels and signal levels corresponding to the LCG can be read out via the transistors. Because of this, capacitive elements for holding reset levels and signal levels corresponding to the LCG become unnecessary, and two capacitive elements can be omitted per pixel. As a result, the pixel area size can be made smaller than in the eighth embodiment while the global shutter scheme and the dual gain are realized with the voltage domain scheme.

Note that the short circuit transistors 333 in the twelfth embodiment can also be added to the circuits in the ninth, tenth, and eleventh embodiments. Also in this case, capacitive elements can similarly be reduced.

Since the short circuit transistors 333 are added according to the twelfth embodiment of the present technology as described above, capacitive elements for holding reset levels and signal levels corresponding to the LCG become unnecessary, and the pixel area size can be reduced.

First Modification Example

Whereas the conversion efficiency is switched between the two levels in twelfth embodiment described above, it is also possible to adopt a configuration in which the conversion efficiency is not switched. The solid-state imaging element 200 in the first modification example of the twelfth embodiment is different from that in the twelfth embodiment in that the conversion efficiency is fixed.

Figure 57:
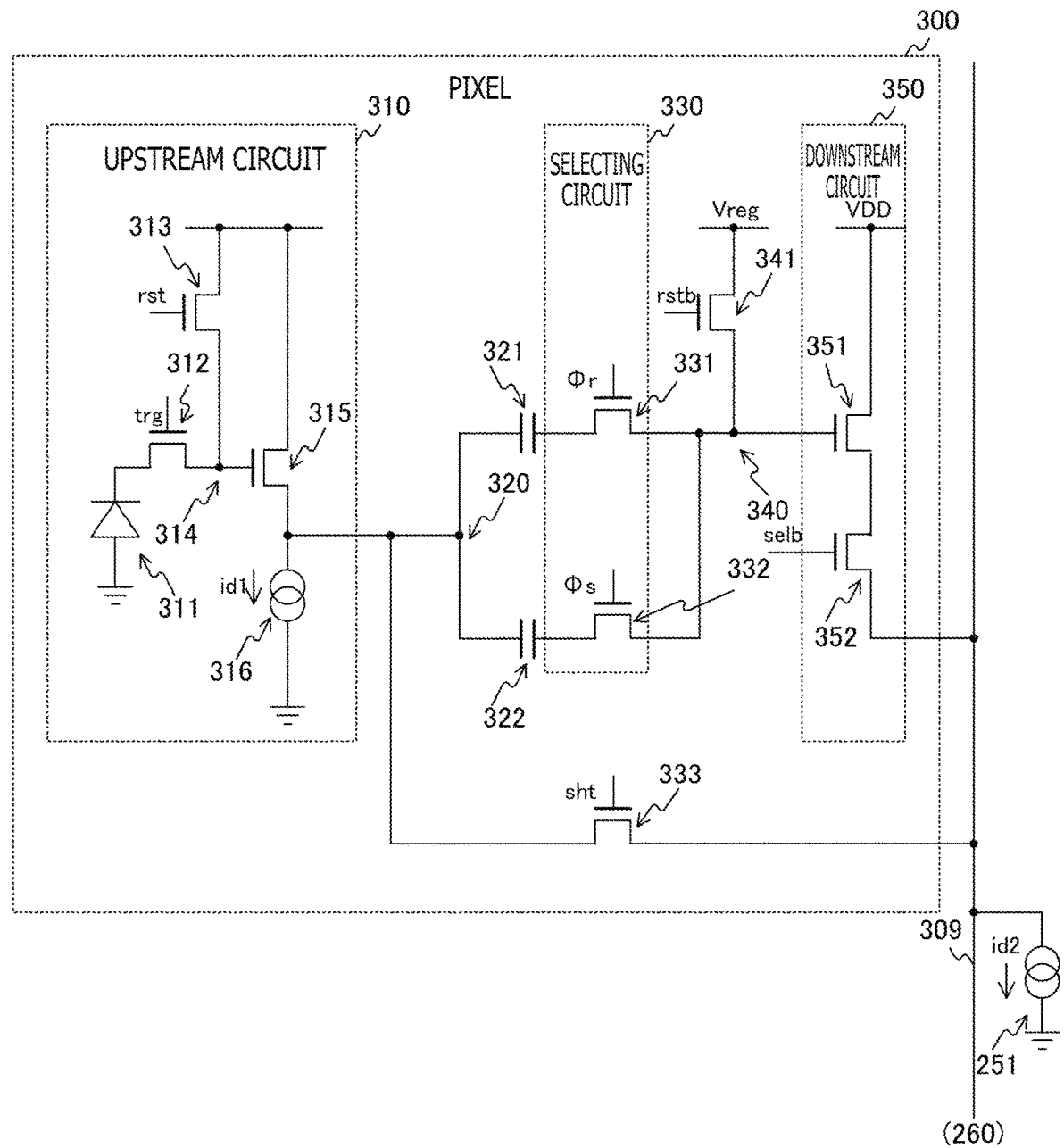
FIG. 57 is a circuit diagram depicting a configuration example of the pixel in a first modification example of the twelfth embodiment of the present technology.

FIG. 57 is a circuit diagram depicting a configuration example of the pixel 300 in the first modification example of the twelfth embodiment of the present technology. The pixels 300 in the first modification example of the twelfth embodiment are different from those in the twelfth embodiment in that the additional capacitance 361 and the conversion efficiency control transistor 362 are not provided in the upstream circuit 310.

The vertical scanning circuit 211 can perform exposure control by any of the global shutter scheme and the rolling shutter scheme. Further, the vertical scanning circuit 211 can switch the short circuit transistors 333 to the opened state, and cause pixel signals at the time of exposure to be output by the global shutter scheme. In addition, the vertical scanning circuit 211 can switch the short circuit transistors 333 to the closed state, and cause pixel signals at the time of exposure to be output by the rolling shutter scheme.

Figure 58:
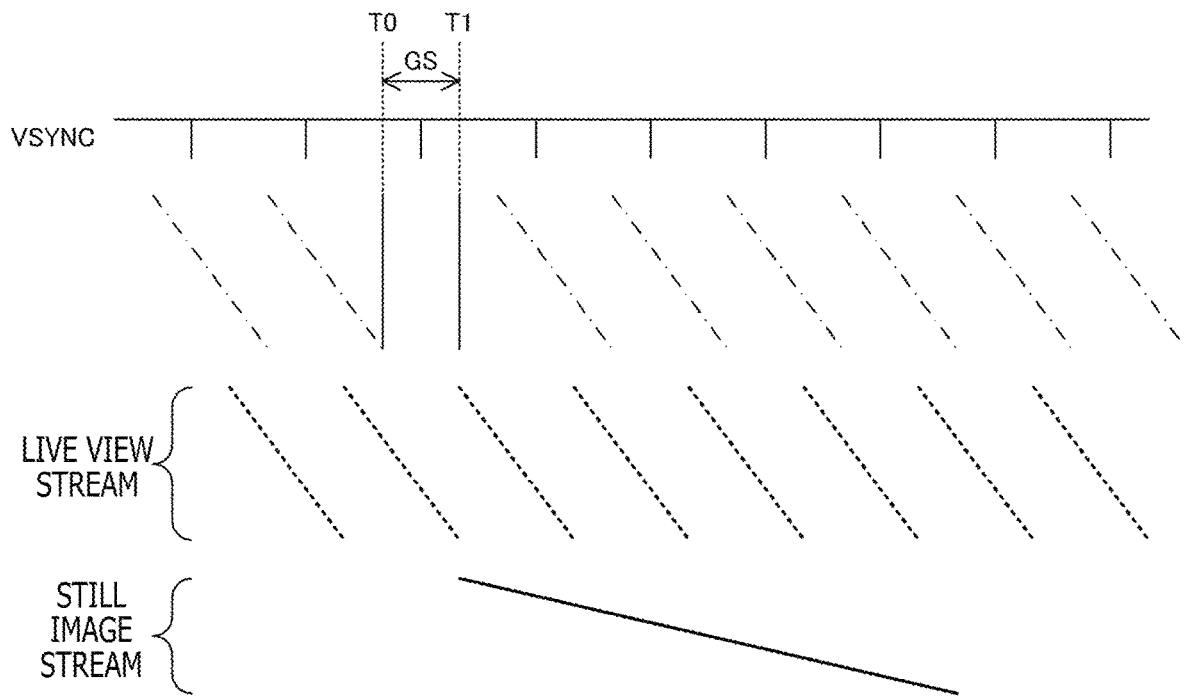
FIG. 58 is a timing chart depicting an example of an operation of the solid-state imaging element in the first modification example of the twelfth embodiment of the present technology.

FIG. 58 is a timing chart depicting an example of an operation of the solid-state imaging element 200 in the first modification example of the twelfth embodiment of the present technology. In the figure, dash-dotted lines represent timings at the starts of exposure and the ends of exposure by the rolling shutter scheme.

The vertical scanning circuit 211 performs exposure control by the rolling shutter scheme in synchronization with a vertical scanning signal VSYNC in the period that is before timing T0. In addition, the vertical scanning circuit 211 sequentially drives rows while thinning out some rows every time exposure is performed by the rolling shutter scheme, and the column signal processing circuit 260 reads out pixel signals while thinning out some columns. As a result, a live view stream including low-resolution image data in which rows and columns are thinned out is generated. Thick dotted lines in the figure represent readout timings of the live view stream. In a period that is before timing T0, the short circuit transistors 333 are controlled to be in the closed state.

During output of the live view stream, the vertical scanning circuit 211 performs exposure control by the global shutter scheme in the period from timing T0 to timing T1. Then, a reset level and a signal level are sample-held for each pixel.

Then, at and after timing T1, the vertical scanning circuit 211 sequentially drives all the rows, and the column signal processing circuit 260 reads out pixel signals from each row. As a result, a still image stream including high-resolution image data in which pixel signals of all the pixels are arrayed without being thinned out is generated. This high-resolution image data is held at an SRAM (Static Random Access Memory) or the like. A thick solid line in the figure represents readout timings of a still image stream. In this readout period of the still image stream, the short circuit transistor 333 is controlled to be in the opened state, and reset levels and signal levels are read out from the capacitive elements 321 and 322.

In addition, during output of the still image output stream, the column signal processing circuit 260 generates image data in which rows and columns in still-image image data are thinned out, and outputs live view streams in parallel. Although the same rows or columns are read out in live view streams multiple times in this period in some cases, the same signals can be read out repeatedly nondestructively since reset levels and signal levels are sample-held for each pixel. After the still image stream is output, the short circuit transistors 333 are controlled to be in the closed state, and only live view streams are output.

Figure 59:
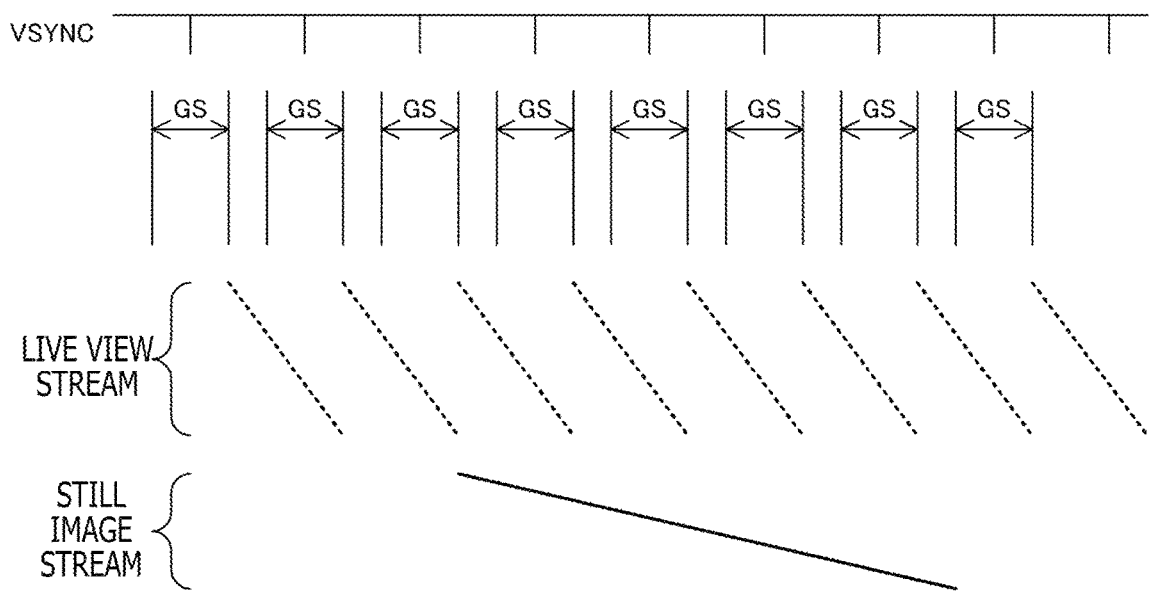
FIG. 59 is a timing chart depicting an example of an operation of the solid-state imaging element in a second comparative example.

It is supposed here as a comparative example that a charge domain scheme in which analog memories are added upstream of FDs and charges are held at the analog memories is used. In this comparative example, when a still image stream is to be generated during live view streams, exposure control is performed by the global shutter scheme repeatedly in synchronization with the vertical scanning signal VSYNC as illustrated in FIG. 59. Then, rows are selected sequentially, and pixel signals are read out. Note that, since pixels cannot sample-hold pixel signals in the comparative example, data of live view streams needs to be held at an SRAM or the like while the live view streams are output. Further, the solid-state imaging element 200 needs to read out rows or columns that are thinned out from the live streams, merge them with pixel signals held at the SRAM, and generate a still image stream. In such a manner, in the comparative example, when a still image stream is to be generated during live view streams, the live streams also need to be held at the SRAM in addition to the still image stream.

In contrast to this, in the first modification example of the twelfth embodiment in which the short circuit transistors 333 are added in the voltage domain scheme, it becomes unnecessary to hold a live stream in an SRAM, and the capacity of the SRAM can be reduced.

Since the short circuit transistors 333 are added to the pixels 300 of the voltage domain scheme according to the first modification example of the twelfth embodiment of the present technology in such a manner, the capacity of a SRAM can be reduced as compared with the charge domain scheme.

Second Modification Example

Whereas the selection transistors 331 and 332 are arranged for each pixel in the first modification example of the twelfth embodiment described above, the number of transistors in a pixel is preferably reduced further. The solid-state imaging element 200 in the second modification example of the twelfth embodiment is different from that in the first modification example of the twelfth embodiment in that a sample transistor 334 is provided instead of the selection transistors 331 and 332.

Figure 60:
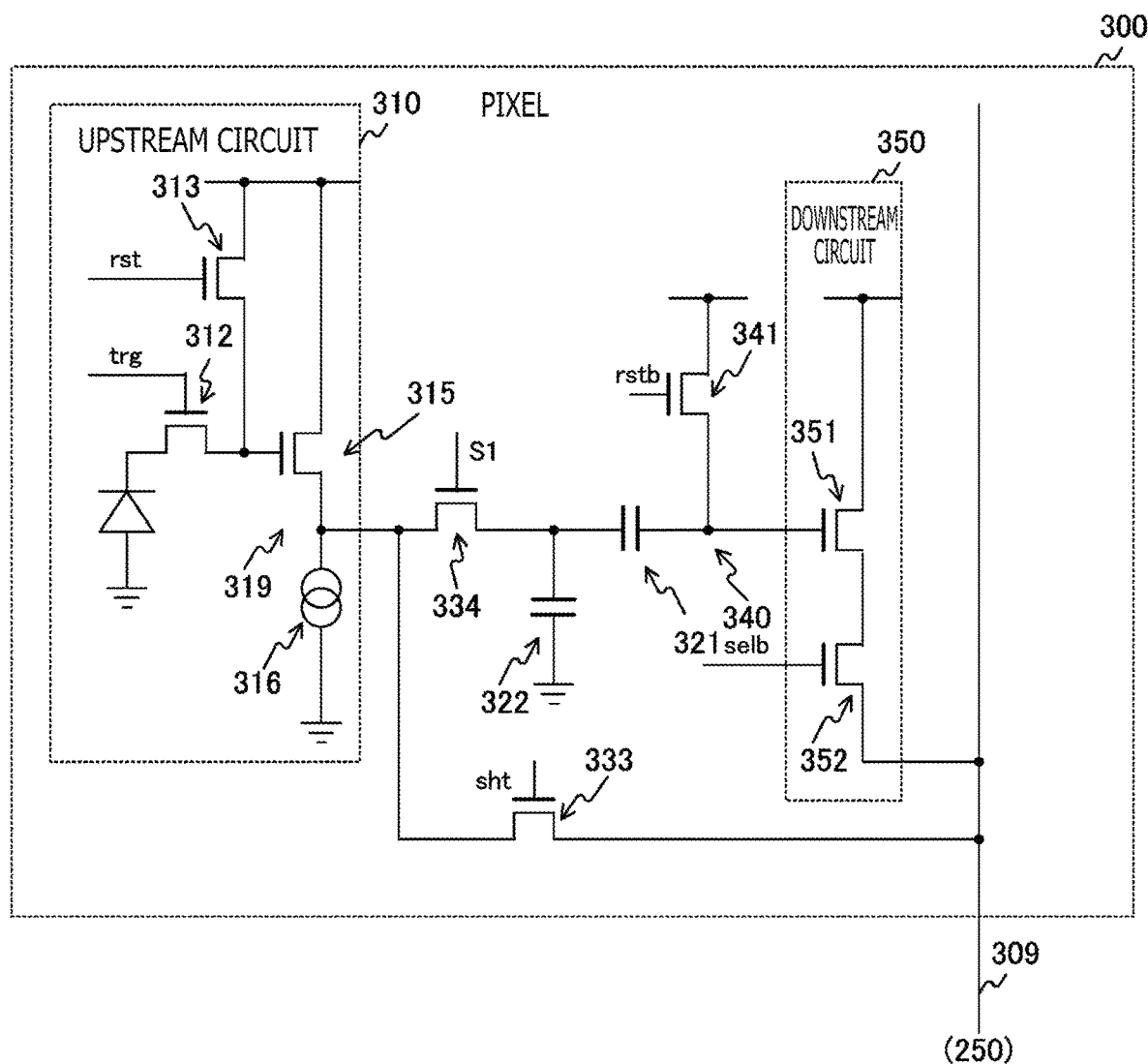
FIG. 60 is a circuit diagram depicting a configuration example of the pixel in a second modification example of the twelfth embodiment of the present technology.

FIG. 60 is a circuit diagram depicting a configuration example of the pixel 300 in the second modification example of the twelfth embodiment of the present technology. In the second modification example of the twelfth embodiment, the sample transistor 334 is arranged instead of the selection transistors 331 and 332. In addition, the sample transistor 334 and the capacitive element 321 are connected in series between the upstream circuit 310 and the downstream circuit 350. The capacitive element 322 is inserted between a connection node between the sample transistor 334 and the capacitive element 321 and the ground terminal. By providing the sample transistor 334 instead of the selection transistors 331 and 332, the number of transistors can be reduced.

As for the circuit in the figure, control described in "Jae-kyu Lee, et al., A 2.1e-Temporal Noise and −105 dB Parasitic Light Sensitivity Backside-Illuminated 2.3 μm-Pixel Voltage-Domain Global Shutter CMOS Image Sensor Using High-Capacity DRAM Capacitor Technology, ISSCC 2020" can be referred to for reference.

Since the sample transistor 334 is provided instead of the selection transistors 331 and 332 in the solid-state imaging element 200 in the second modification example of the twelfth embodiment of the present technology as described above, the number of transistors can be reduced.

Third Modification Example

Whereas the selection transistors 331 and 332 are inserted in parallel between the capacitive elements 321 and 322 and the downstream node 340 in the first modification example of the twelfth embodiment described above, these transistors can also be connected in series. The solid-state imaging element 200 in the third modification example of the twelfth embodiment is different from that in the first modification example of the twelfth embodiment in that the selection transistors 331 and 332 are connected in series.

Figure 61:
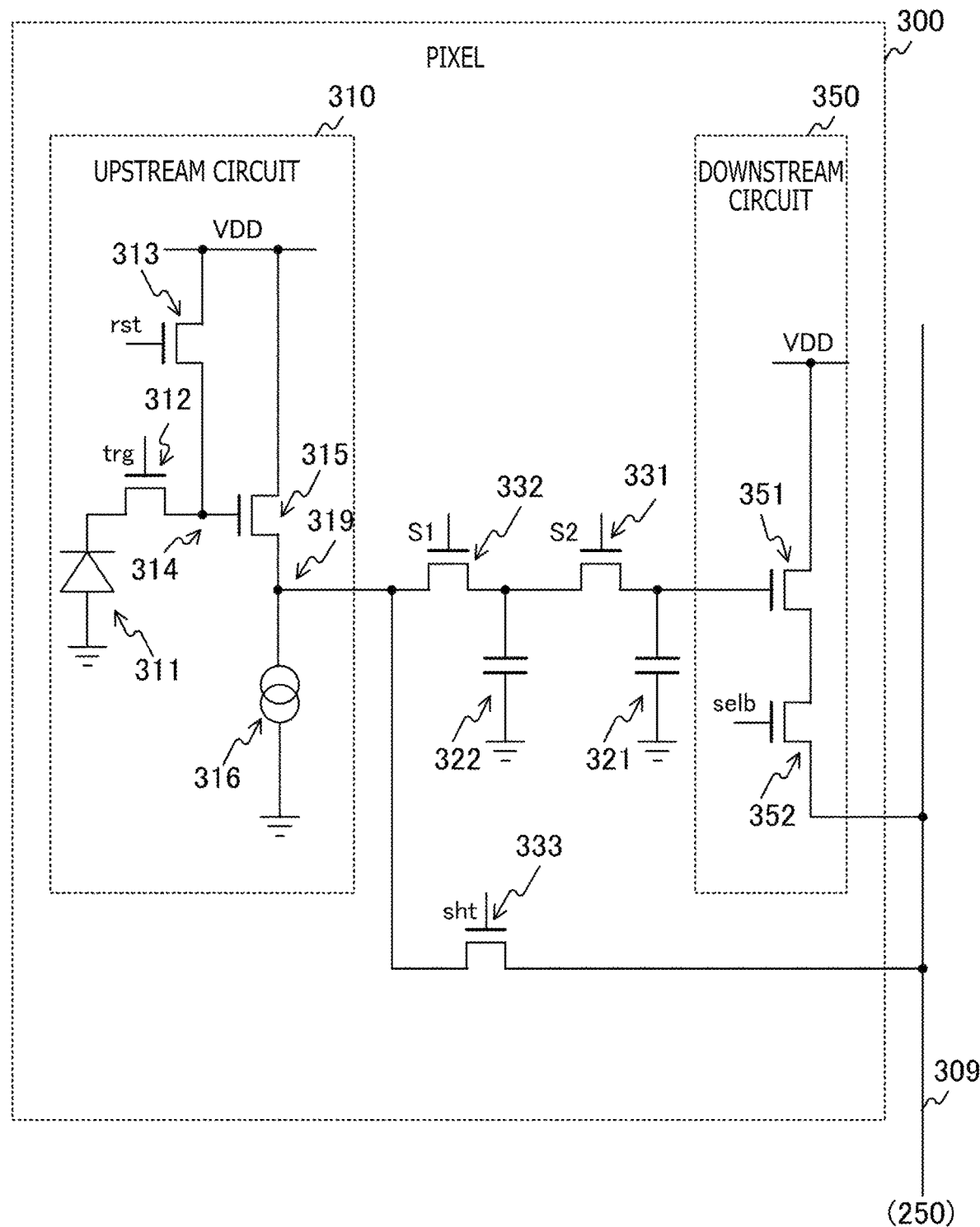
FIG. 61 is a circuit diagram depicting a configuration example of the pixel in a third modification example of the twelfth embodiment of the present technology.

FIG. 61 is a circuit diagram depicting a configuration example of the pixel 300 in the third modification example of the twelfth embodiment of the present technology. In the third modification example of the twelfth embodiment, the selection transistors 332 and 331 are connected in series between the upstream circuit 310 and the downstream circuit 350. In addition, the capacitive element 322 is inserted between a connection node between the selection transistors 332 and 331 and the ground terminal. The capacitive element 321 is inserted between a connection node between the selection transistor 331 and the downstream circuit 350 and the ground terminal. In addition, the downstream reset transistor 341 is not arranged.

Details of a method of controlling the circuit in the figure are described in "Chen Xu et al., A Stacked Global-Shutter CMOS Imager with SC-Type Hybrid-GS Pixel and Self-Knee Point Calibration Single-Frame HDR and On-Chip Binarization Algorithm for Smart Vision Applications ISSCC2019.," for example.

Since the selection transistors 331 and 332 are connected in series according to the third modification example of the twelfth embodiment of the present technology as described above, the downstream reset transistor 341 can be omitted.

Fourth Modification Example

In the first modification example of the twelfth embodiment described above, the selection transistors 331 and 332 are inserted between the capacitive elements 321 and 322 and the downstream circuit 350. This circuit configuration is not the sole example, and the selection transistors 331 and 332 can also be inserted between the upstream circuit 310 and the capacitive elements 321 and 322. The solid-state imaging element 200 in the fourth modification example of the twelfth embodiment is different from that in the first modification example of the twelfth embodiment in that the selection transistors 331 and 332 are inserted between the upstream circuit 310 and the capacitive elements 321 and 322.

Figure 62:
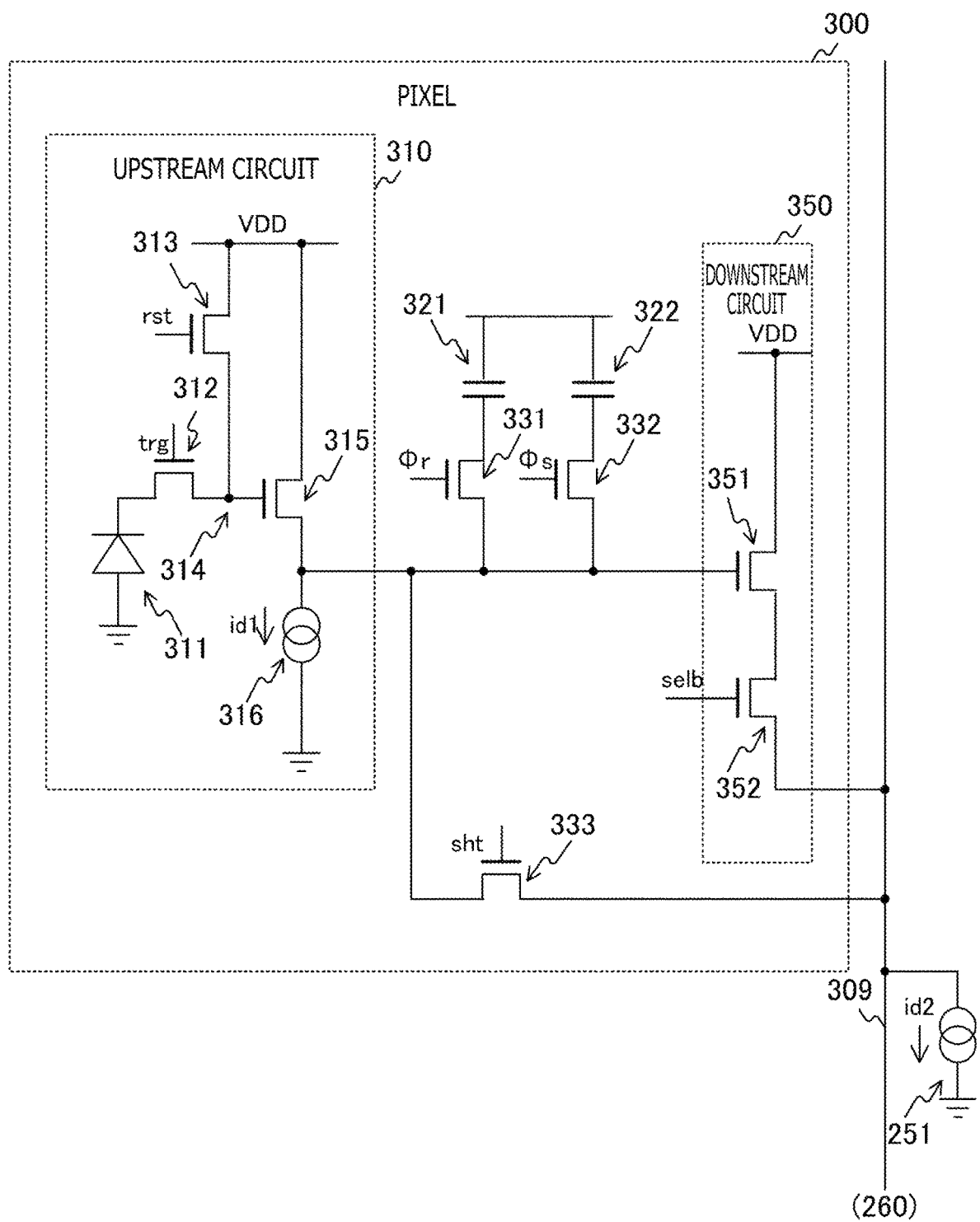
FIG. 62 is a circuit diagram depicting a configuration example of the pixel in a fourth modification example of the twelfth embodiment of the present technology.

FIG. 62 is a circuit diagram depicting a configuration example of the pixel 300 in the fourth modification example of the twelfth embodiment of the present technology. In the third modification example of the twelfth embodiment, the output node of the upstream circuit 310 is connected to the input node of the downstream circuit 350. In addition, the selection transistor 331 is inserted between the upstream circuit 310 and the capacitive element 321, and the selection transistor 332 is inserted between the upstream circuit 310 and the capacitive element 322. In addition, one end of the capacitive element 321 is connected to the selection transistor 331, and the other end of the capacitive element 321 is connected to a node with a predetermined voltage. One end of the capacitive element 322 is connected to the selection transistor 332, and the other end of the capacitive element 322 is connected to a node with a predetermined voltage.

In addition, the downstream reset transistor 341 is not arranged. The method of controlling the circuit in the figure is similar to that in the first modification example of the twelfth embodiment.

Since the selection transistors 331 and 332 are inserted between the upstream circuit 310 and the capacitive elements 321 and 322 according to the fourth modification example of the twelfth embodiment of the present technology as described above, the downstream reset transistor 341 can be omitted.

13. Examples of Application to Mobile Bodies

The technology according to the present disclosure (present technology) can be applied to various products. For example, the technology according to the present disclosure may be realized as a device to be mounted on any type of a mobile body such as an automobile, an electric automobile, a hybrid electric automobile, a motorcycle, a bicycle, a personal mobility, an airplane, a drone, a ship, or a robot.

Figure 63:
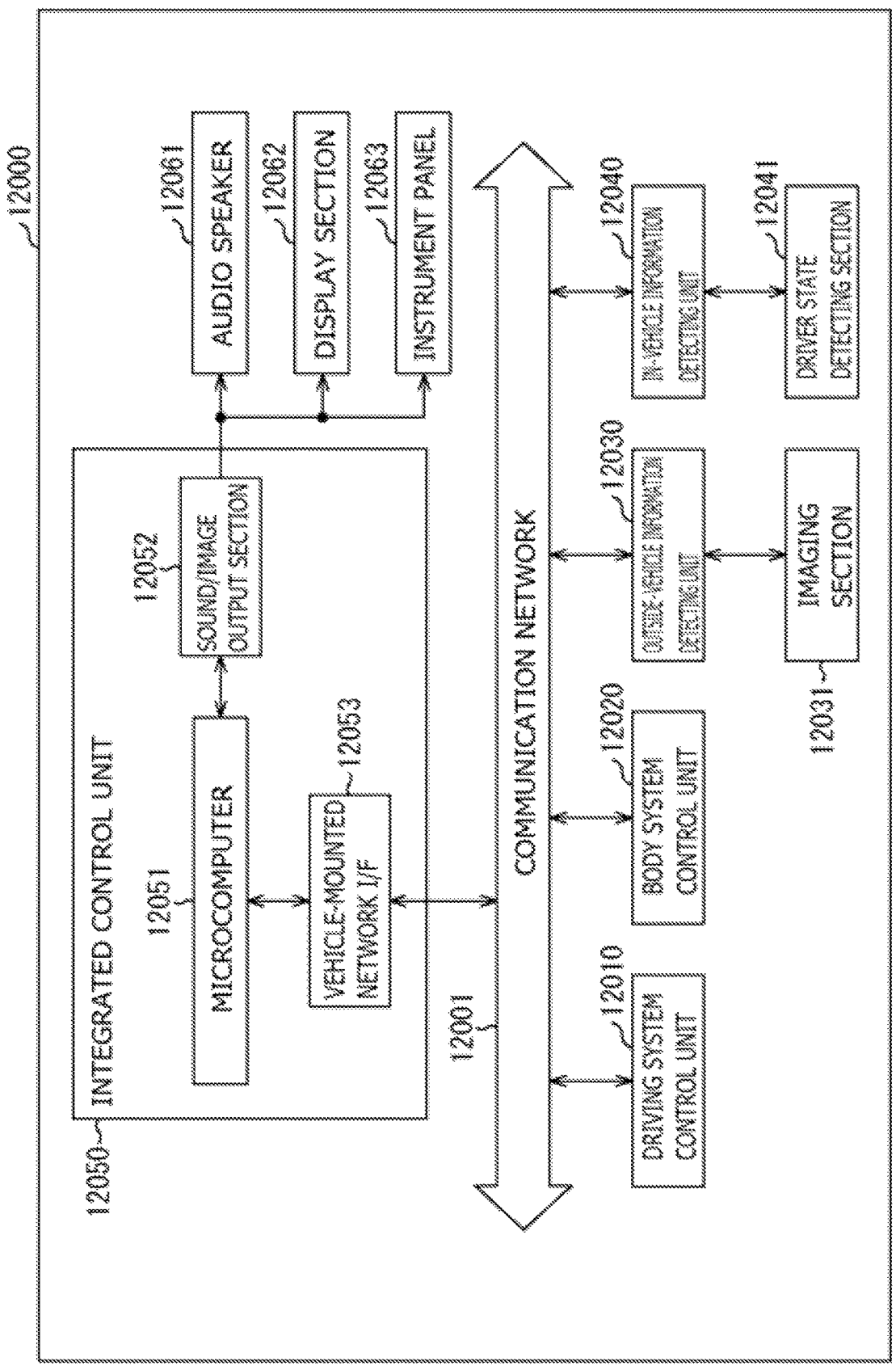
FIG. 63 is a block diagram depicting an example of schematic configuration of a vehicle control system.

FIG. 63 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 63, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 63, an audio speaker 12061, a display section 12062, and an instrument panel 12063 are illustrated as the output device. The display section 12062 may, for example, include at least one of an on-board display and a head-up display.

Figure 64:
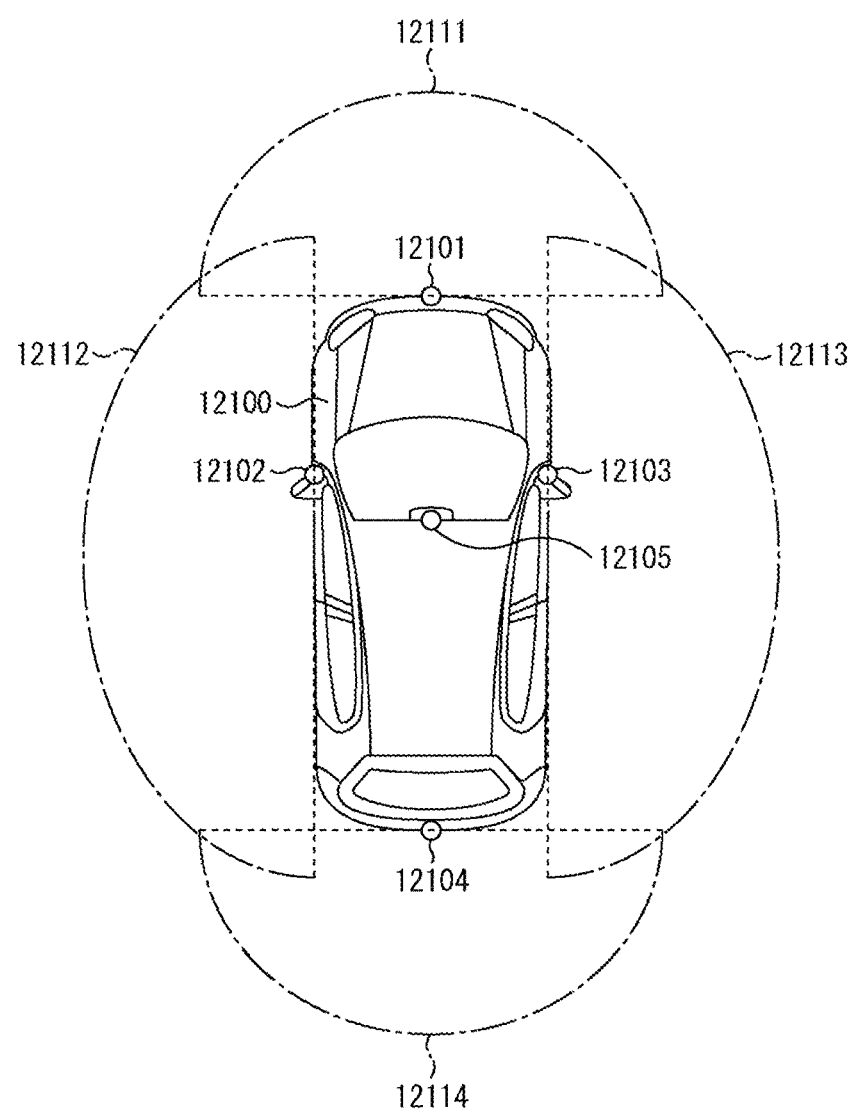
FIG. 64 is a diagram of assistance in explaining an example of installation positions of an outside-vehicle information detecting section and an imaging section.

FIG. 64 is a diagram depicting an example of the installation position of the imaging section 12031.

In FIG. 64, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 64 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of vehicle control systems to which the technology according to the present disclosure can be applied has been explained thus far. The technology according to the present disclosure can be applied to the imaging section 12031 in the configuration explained above. Specifically, for example, the imaging device 100 in FIG. 1 can be applied to the imaging section 12031. By applying the technology according to the present disclosure to the imaging section 12031, captured images which have less kTC noise, and are easier to see can be obtained. Therefore, it becomes possible to mitigate the fatigue of a driver.

Note that the embodiments described above are depicted as examples for embodying the present technology, and matters in the embodiments and invention specifying matters in claims are correlated, respectively. Similarly, invention specifying matters in claims and matters in the embodiments of the present technology that are given names which are identical to those of the invention specifying matters are correlated, respectively. Note that the present technology is not limited to the embodiments but and be embodied by making various modifications to the embodiments within the scope not departing from the gist thereof.

Note that effects described in the present specification are illustrated merely as examples and are not the sole examples, and there may also be other effects.

Note that the present technology can also adopt configurations as the ones below.

(1)

A solid-state imaging element including:

a conversion efficiency control transistor that controls conversion efficiency at a time of conversion of a charge into a voltage by opening and closing a path between a floating diffusion layer and an additional capacitance;

an upstream amplification transistor that amplifies the voltage generated from the charge with the conversion efficiency and outputs the voltage to an upstream node;

a plurality of capacitive elements that hold the output voltage;

a selecting circuit that connects any of the plurality of capacitive elements to a downstream node; and a downstream circuit that reads out and outputs the held voltage via the downstream node.

(2)

The solid-state imaging element according to (1) above, in which the voltage is at any of a first reset level, a first signal level, a second reset level, and a second signal level, and the plurality of capacitive elements include a first capacitive element that holds the first reset level, a second capacitive element that holds the first signal level, a third capacitive element that holds the second reset level, and a fourth capacitive element that holds the second signal level.

(3)

The solid-state imaging element according to (2) above, further including:

a photoelectric converting element; and a discharge transistor that discharges a charge overflowing from the photoelectric tube element, in which the discharge transistor is inserted between a connection node between the conversion efficiency control transistor and the additional capacitance and the photoelectric converting element.

(4)

The solid-state imaging element according to (1) above, in which the conversion efficiency control transistor includes first and second conversion efficiency control transistors inserted between the additional capacitance and the floating diffusion layer, the voltage is at any of a first reset level, a first signal level, a second reset level, a second signal level, a third reset level, and a third signal level, and the plurality of capacitive elements include a first capacitive element that holds the first reset level, a second capacitive element that holds the first signal level, a third capacitive element that holds the second reset level, a fourth capacitive element that holds the second signal level, a fifth capacitive element that holds the third reset level, and a sixth capacitive element that holds the third signal level.

(5)

The solid-state imaging element according to (4) above, further including:

a photoelectric converting element; and a discharge transistor that discharges a charge overflowing from the photoelectric converting element, in which the discharge transistor is inserted between a connection node between the first conversion efficiency control transistor and the additional capacitance and the photoelectric converting element.

(6)

The solid-state imaging element according to any one of (1) to (5) above, further including:

a current source transistor that supplies a predetermined current to the upstream amplification transistor.

(7)

The solid-state imaging element according to (6) above, further including:

a first switch that opens and closes a path between the upstream node and the upstream amplification transistor; and a second switch that opens and closes a path between the upstream node and a predetermined ground terminal.

(8)

The solid-state imaging element according to (7) above, further including:

a current source transistor that supplies a predetermined current to the upstream amplification transistor via the first switch.

(9)

The solid-state imaging element according to any one of (1) to (8) above, further including:

a photoelectric converting element;

an upstream transfer transistor that transfers a charge from the photoelectric converting element to the floating diffusion layer; and a first reset transistor that initializes the floating diffusion layer, in which
one end of each of the plurality of capacitive elements shares a connection to the upstream node, and the other end of each of the plurality of capacitive elements is connected to the selecting circuit.

(10)
The solid-state imaging element according to (9) above, further including:
a switching section that adjusts a source voltage to be supplied to a source of the upstream amplification transistor; and
a current source transistor connected to a drain of the upstream amplification transistor, in which
the current source transistor transitions to an OFF state from an ON state after an end of an exposure period.

(11)
The solid-state imaging element according to (10) above, in which the switching section supplies, as the source voltage, a predetermined power supply voltage in the exposure period, and supplies, as the source voltage, a generation voltage different from the power supply voltage after the end of the exposure period.

(12)
The solid-state imaging element according to (11) above, in which a difference between the power supply voltage and the generation voltage substantially matches a sum of a variation amount caused by a reset feedthrough of the first reset transistor and a gate-source voltage of the upstream amplification transistor.

(13)
The solid-state imaging element according to (9) above, in which,
at a predetermined exposure start timing, the upstream transfer transistor transfers the charge to the floating diffusion layer, and the first reset transistor initializes the photoelectric converting element along with the floating diffusion layer, and
at a predetermined exposure end timing, the upstream transfer transistor transfers the charge to the floating diffusion layer.

(14)
The solid-state imaging element according to any one of (1) to (13) above, further including:
a digital signal processing section that adds together a pair of consecutive frames, in which
the plurality of capacitive elements include first and second capacitive elements,
the voltage is at any of a reset level and a signal level, and,
in an exposure period of one of the pair of frames, the selecting circuit causes one of the first and second capacitive elements to hold the reset level, and thereafter causes the other of the first and second capacitive elements to hold the signal level, and, in an exposure period of the other of the pair of frames, the selecting circuit causes the other of the first and second capacitive elements to hold the reset level, and thereafter causes the one of the first and second capacitive elements to hold the signal level.

(15)
The solid-state imaging element according to any one of (1) to (14) above, further including:
an analog-to-digital converter that converts the output voltage to a digital signal.

(16)
The solid-state imaging element according to (15) above, in which the analog-to-digital converter includes
a comparator that compares a level of a vertical signal line which transfers the voltage and a predetermined ramp signal and that outputs a comparison result, and
a counter that performs counting with a count over a period until the comparison result is inverted and that outputs the digital signal representing the count.

(17)
The solid-state imaging element according to (16) above, in which
the comparator includes
a comparing section that compares levels of a pair of input terminals and outputs a comparison result, and
an input side selector that selects any one of the vertical signal line and a node with a predetermined reference voltage and connects the selected one to one of the pair of input terminals, in which
the ramp signal is input to one of the pair of input terminals.

(18)
The solid-state imaging element according to (17) above, further including:
a control section that determines whether or not illuminance is higher than a predetermined value on the basis of the comparison result and that outputs a determination result;
a CDS (Correlated Double Sampling) processing section that executes a correlated double sampling process on the digital signal; and
an output side selector that outputs any of the digital signal on which the correlated double sampling process has been executed and a digital signal with a predetermined value, on the basis of the determination result.

(19)
The solid-state imaging element according to (1) above, further including:
a short circuit transistor that opens and closes a path between the upstream node and an output node of the downstream circuit, in which
the plurality of capacitive elements include first and second capacitive elements.

(20)
The solid-state imaging element according to (19) above, further including:
a vertical scanning circuit that, immediately before an end of a first exposure period, initializes the floating diffusion layer, causes the first capacitive element to hold the voltage as a first reset level while switching the conversion efficiency control transistor to an opened state, causes a charge to be transferred and the second capacitive element to hold the voltage as a first signal level at the end of the first exposure period while switching the conversion efficiency control transistor to the opened state, and causes a charge to be transferred and the floating diffusion layer to hold the voltage as a second signal level at an end of a second exposure period while switching the conversion efficiency control transistor to a closed state.

(21)
The solid-state imaging element according to (20) above, further including:
an analog-to-digital converter, in which
the vertical scanning circuit switches the short circuit transistor to a closed state in a readout period and causes the second signal level to be output to the analog-to-digital converter, initializes the floating diffusion layer and causes the voltage to be output to the analog-to-digital converter as a second reset level while switching the short circuit transistor to the closed state, and causes the first reset level and the first signal level to be output sequentially to the analog-to-digital converter while switching the short circuit transistor to an opened state.

(22)
An imaging device including:
a conversion efficiency control transistor that controls conversion efficiency at a time of conversion of a charge into a voltage by opening and closing a path between a floating diffusion layer and an additional capacitance;
an upstream amplification transistor that amplifies the voltage generated from the charge with the conversion efficiency and outputs the voltage to an upstream node;
a plurality of capacitive elements that hold the output voltage;
a selecting circuit that connects any of the plurality of capacitive elements to a downstream node;
a downstream circuit that reads out and outputs the held voltage via the downstream node; and
a signal processing circuit that processes a signal with the voltage.

(23)
A solid-state imaging element control method including:
a conversion efficiency control procedure of controlling conversion efficiency at a time of conversion of a charge into a voltage by opening and closing a path between a floating diffusion layer and an additional capacitance;
an upstream amplification procedure of amplifying the voltage generated from the charge with the conversion efficiency and outputting the voltage to an upstream node;
a selecting procedure of connecting any of a plurality of capacitive elements that hold the output voltage to a downstream node; and
a downstream procedure of sequentially reading out and outputting the voltage held at the plurality of capacitive elements, via the downstream node.

REFERENCE SIGNS LIST

100: Imaging device
110: Imaging lens
120: Recording section
130: Imaging control section
200: Solid-state imaging element
201: Upper pixel chip
202: Lower pixel chip
203: Circuit chip
211: Vertical scanning circuit
212: Timing control circuit
213: DAC
220: Pixel array section
221: Upper pixel array section
222: Lower pixel array section
250: Load MOS circuit block
251: Load MOS transistor
260: Column signal processing circuit
261, 270: ADC
262, 290: Digital signal processing section
271: Counter
280: Comparator
281, 292: Selector
282, 283, 321, 321-1 to 321-3, 322, 322-1 to 322-3: Capacitive element
284, 286: Auto zero switch
285: Comparing section
291: CDS processing section
300: Pixel
301: Effective pixel
310: Upstream circuit
311: Photoelectric converting element
312: Transfer transistor
313: FD reset transistor
314: FD
315: Upstream amplification transistor
316: Current source transistor
317: Discharge transistor
323: Upstream reset transistor
324: Upstream selection transistor
330: Selecting circuit
331, 332, 331-1 to 331-3, 332-1 to 332-3: Selection transistor
333: Short circuit transistor
334: Sample transistor
341: Downstream reset transistor
350: Downstream circuit
351: Downstream amplification transistor
352: Downstream selection transistor
361: Additional capacitance
362, 365: Conversion efficiency control transistor
363, 364: Switch
420: Regulator
421: Low pass filter
422: Buffer amplifier
423: Capacitive element
430: Dummy pixel
431: Reset transistor
432: FD
433: Amplification transistor
434: Current source transistor
440: Switching section
441: Inverter
442: Switching circuit
443, 444: Switch
12031: Imaging section

The invention claimed is:

1. A solid-state imaging element comprising:
a conversion efficiency control transistor that controls conversion efficiency at a time of conversion of a charge into a voltage by opening and closing a path between a floating diffusion layer and an additional capacitance;
an upstream amplification transistor that amplifies the voltage generated from the charge with the conversion efficiency and outputs the voltage to an upstream node;
a plurality of capacitive elements that hold the output voltage;
a selecting circuit that connects any of the plurality of capacitive elements to a downstream node; and
a downstream circuit that reads out and outputs the held voltage via the downstream node.

2. The solid-state imaging element according to claim 1, wherein
the voltage is at any of a first reset level, a first signal level, a second reset level, and a second signal level, and
the plurality of capacitive elements include a first capacitive element that holds the first reset level, a second capacitive element that holds the first signal level, a third capacitive element that holds the second reset level, and a fourth capacitive element that holds the second signal level.

3. The solid-state imaging element according to claim 2, further comprising:
a photoelectric converting element; and
a discharge transistor that discharges a charge overflowing from the photoelectric converting element, wherein
the discharge transistor is inserted between a connection node between the conversion efficiency control transistor and the additional capacitance and the photoelectric converting element.

4. The solid-state imaging element according to claim 1, wherein
the conversion efficiency control transistor includes first and second conversion efficiency control transistors inserted between the additional capacitance and the floating diffusion layer,
the voltage is at any of a first reset level, a first signal level, a second reset level, a second signal level, a third reset level, and a third signal level, and
the plurality of capacitive elements include a first capacitive element that holds the first reset level, a second capacitive element that holds the first signal level, a third capacitive element that holds the second reset level, a fourth capacitive element that holds the second signal level, a fifth capacitive element that holds the third reset level, and a sixth capacitive element that holds the third signal level.

5. The solid-state imaging element according to claim 4, further comprising:
a photoelectric converting element; and
a discharge transistor that discharges a charge overflowing from the photoelectric converting element, wherein
the discharge transistor is inserted between a connection node between the first conversion efficiency control transistor and the additional capacitance and the photoelectric converting element.

6. The solid-state imaging element according to claim 1, further comprising:
a current source transistor that supplies a predetermined current to the upstream amplification transistor.

7. The solid-state imaging element according to claim 6, further comprising:
a first switch that opens and closes a path between the upstream node and the upstream amplification transistor; and
a second switch that opens and closes a path between the upstream node and a predetermined ground terminal.

8. The solid-state imaging element according to claim 7, further comprising:
a current source transistor that supplies a predetermined current to the upstream amplification transistor via the first switch.

9. The solid-state imaging element according to claim 1, further comprising:
a photoelectric converting element;
an upstream transfer transistor that transfers a charge from the photoelectric converting element to the floating diffusion layer; and
a first reset transistor that initializes the floating diffusion layer, wherein
one end of each of the plurality of capacitive elements shares a connection to the upstream node, and the other end of each of the plurality of capacitive elements is connected to the selecting circuit.

10. The solid-state imaging element according to claim 9, further comprising:
a switching section that adjusts a source voltage to be supplied to a source of the upstream amplification transistor; and
a current source transistor connected to a drain of the upstream amplification transistor, wherein
the current source transistor transitions to an OFF state from an ON state after an end of an exposure period.

11. The solid-state imaging element according to claim 10, wherein the switching section supplies, as the source voltage, a predetermined power supply voltage in the exposure period, and supplies, as the source voltage, a generation voltage different from the power supply voltage after the end of the exposure period.

12. The solid-state imaging element according to claim 11, wherein a difference between the power supply voltage and the generation voltage substantially matches a sum of a variation amount caused by a reset feedthrough of the first reset transistor and a gate-source voltage of the upstream amplification transistor.

13. The solid-state imaging element according to claim 9, wherein,
at a predetermined exposure start timing, the upstream transfer transistor transfers the charge to the floating diffusion layer, and the first reset transistor initializes the photoelectric converting element along with the floating diffusion layer, and
at a predetermined exposure end timing, the upstream transfer transistor transfers the charge to the floating diffusion layer.

14. The solid-state imaging element according to claim 1, further comprising:
a digital signal processing section that adds together a pair of consecutive frames, wherein
the plurality of capacitive elements include first and second capacitive elements,
the voltage is at any of a reset level and a signal level, and,
in an exposure period of one of the pair of frames, the selecting circuit causes one of the first and second capacitive elements to hold the reset level, and thereafter causes the other of the first and second capacitive elements to hold the signal level, and, in an exposure period of the other of the pair of frames, the selecting circuit causes the other of the first and second capacitive elements to hold the reset level, and thereafter causes the one of the first and second capacitive elements to hold the signal level.

15. The solid-state imaging element according to claim 1, further comprising:
an analog-to-digital converter that converts the output voltage to a digital signal.

16. The solid-state imaging element according to claim 15, wherein
the analog-to-digital converter includes
a comparator that compares a level of a vertical signal line which transfers the voltage and a predetermined ramp signal and that outputs a comparison result, and
a counter that performs counting with a count over a period until the comparison result is inverted and that outputs the digital signal representing the count.

17. The solid-state imaging element according to claim 16, wherein
the comparator includes
a comparing section that compares levels of a pair of input terminals and outputs a comparison result, and an input side selector that selects any one of the vertical signal line and a node with a predetermined reference voltage and connects the selected one to one of the pair of input terminals, wherein the ramp signal is input to one of the pair of input terminals.

18. The solid-state imaging element according to claim 17, further comprising:

a control section that determines whether or not illuminance is higher than a predetermined value on a basis of the comparison result and that outputs a determination result;

a CDS (Correlated Double Sampling) processing section that executes a correlated double sampling process on the digital signal; and an output side selector that outputs any of the digital signal on which the correlated double sampling process has been executed and a digital signal with a predetermined value, on a basis of the determination result.

19. The solid-state imaging element according to claim 1, further comprising:

a short circuit transistor that opens and closes a path between the upstream node and an output node of the downstream circuit, wherein the plurality of capacitive elements include first and second capacitive elements.

20. The solid-state imaging element according to claim 19, further comprising:

a vertical scanning circuit that, immediately before an end of a first exposure period, initializes the floating diffusion layer, causes the first capacitive element to hold the voltage as a first reset level while switching the conversion efficiency control transistor to an opened state, causes a charge to be transferred and the second capacitive element to hold the voltage as a first signal level at the end of the first exposure period while switching the conversion efficiency control transistor to the opened state, and causes a charge to be transferred and the floating diffusion layer to hold the voltage as a second signal level at an end of a second exposure period while switching the conversion efficiency control transistor to a closed state.

21. The solid-state imaging element according to claim 20, further comprising:

an analog-to-digital converter, wherein the vertical scanning circuit switches the short circuit transistor to a closed state in a readout period and causes the second signal level to be output to the analog-to-digital converter, initializes the floating diffusion layer and causes the voltage to be output to the analog-to-digital converter as a second reset level while switching the short circuit transistor to the closed state, and causes the first reset level and the first signal level to be output sequentially to the analog-to-digital converter while switching the short circuit transistor to an opened state.

22. An imaging device comprising:

a conversion efficiency control transistor that controls conversion efficiency at a time of conversion of a charge into a voltage by opening and closing a path between a floating diffusion layer and an additional capacitance;

an upstream amplification transistor that amplifies the voltage generated from the charge with the conversion efficiency and outputs the voltage to an upstream node;

a plurality of capacitive elements that hold the output voltage;

a selecting circuit that connects any of the plurality of capacitive elements to a downstream node;

a downstream circuit that reads out and outputs the held voltage via the downstream node; and a signal processing circuit that processes a signal with the voltage.

23. A solid-state imaging element control method comprising:

a conversion efficiency control procedure of controlling conversion efficiency at a time of conversion of a charge into a voltage by opening and closing a path between a floating diffusion layer and an additional capacitance;

an upstream amplification procedure of amplifying the voltage generated from the charge with the conversion efficiency and outputting the voltage to an upstream node;

a selecting procedure of connecting any of a plurality of capacitive elements that hold the output voltage to a downstream node; and a downstream procedure of sequentially reading out and outputting the voltage held at the plurality of capacitive elements, via the downstream node.

* * * * *